United States Patent
Moorman, III et al.

(10) Patent No.: US 7,940,899 B2
(45) Date of Patent: May 10, 2011

(54) FRAUD DETECTION, RISK ANALYSIS AND COMPLIANCE ASSESSMENT

(75) Inventors: John C. Moorman, III, Dyer, IN (US); Dhruv Chawla, Chicago, IL (US); Brian M. Castelli, New York, NY (US); Amy T. Leigh, Chicago, IL (US); Subramanian Sivaramakrishnan, Allen, TX (US); Vorapong Sutanont, Chicago, IL (US); Sanjay Subramanian, Gaithersburg, MD (US); Bennett R. Davis, Alexandria, VA (US); Olufemi Tairu, Orange, NJ (US); Mehul Patel, Parsippany, NJ (US); John W. Dennis, New York, NY (US)

(73) Assignee: PricewaterhouseCoopers LLP, New York, NY (US)

(*) Notice: Subject to any disclaimer, the term of this patent is extended or adjusted under 35 U.S.C. 154(b) by 1160 days.

(21) Appl. No.: 11/545,021

(22) Filed: Oct. 6, 2006

(65) Prior Publication Data
US 2008/0086409 A1    Apr. 10, 2008

(51) Int. Cl.
*H04M 1/64* (2006.01)
*G06Q 40/00* (2006.01)

(52) U.S. Cl. .......... 379/88.19; 379/127.03; 705/38; 705/39

(58) Field of Classification Search ............ 348/150; 379/88.19, 127.03; 705/26, 38, 39, 44, 64; 707/703; 709/224; 713/155
See application file for complete search history.

(56) References Cited

U.S. PATENT DOCUMENTS

| | | | |
|---|---|---|---|
| 5,659,731 A * | 8/1997 | Gustafson | 1/1 |
| 6,310,943 B1 * | 10/2001 | Kowalski | 379/127.03 |
| 6,925,468 B1 * | 8/2005 | Bobbitt et al. | 707/703 |
| 7,089,208 B1 * | 8/2006 | Levchin et al. | 705/39 |
| 7,539,746 B2 * | 5/2009 | Bankier et al. | 709/224 |
| 7,546,312 B1 * | 6/2009 | Xu et al. | 1/1 |
| 7,742,984 B2 * | 6/2010 | Mohsenzadeh | 705/39 |
| 2002/0029193 A1 * | 3/2002 | Ranjan et al. | 705/39 |
| 2004/0006523 A1 | 1/2004 | Coker | |
| 2004/0064401 A1 * | 4/2004 | Palaghita et al. | 705/38 |
| 2004/0117316 A1 * | 6/2004 | Gillum | 705/64 |
| 2005/0046697 A1 * | 3/2005 | VanCleave et al. | 348/150 |
| 2005/0222931 A1 | 10/2005 | Mamou | |
| 2006/0282660 A1 * | 12/2006 | Varghese et al. | 713/155 |
| 2007/0100744 A1 * | 5/2007 | Wu et al. | 705/38 |
| 2007/0185782 A1 * | 8/2007 | Shooks et al. | 705/26 |
| 2007/0260538 A1 * | 11/2007 | Deaton et al. | 705/39 |
| 2008/0086409 A1 * | 4/2008 | Moorman et al. | 705/38 |
| 2009/0327133 A1 * | 12/2009 | Aharoni et al. | 705/44 |

* cited by examiner

*Primary Examiner* — Gerald Gauthier
(74) *Attorney, Agent, or Firm* — Fish & Richardson P.C.

(57) ABSTRACT

Techniques using data matching and clustering algorithms are disclosed to aid investigators in detecting potentially fraudulent activity, performing risk analysis or assessing compliance with applicable regulations.

102 Claims, 52 Drawing Sheets

| Physical Name | Data Type | Notes |
|---|---|---|
| MDM0 ID | NUMBER | Primary Key from MDM1 |
| SOURCE_ENTITY_NUMBER | VARCHAR2(50) | Source System Customer #, Vendor # or Employee # Hotlist ID Concatenated with the ERP source instance |
| ENTITY_TYPE | VARCHAR2(2) | Customer, Vendor, Employee, Hotlist |
| CDM_TABLE | VARCHAR2(30) | Source Table from CDM: Customer Address, Customer Name etc |
| CDM_TABLE_ENTITY_ID | NUMBER | Key from the CDM table that identifies the entity |
| CDM_REF_TYPE | VARCHAR2(25) | Types of Customer Address e.g. Mailing, Billing etc. |
| NAME_PREFIX | VARCHAR2(25) | Name Prefix, Mr., Mrs., Dr. etc. |
| NAME_FIRST | VARCHAR2(100) | First Name |
| NAME_MIDDLE | VARCHAR2(55) | Middle Name |
| NAME_LAST | VARCHAR2(100) | Last Name |
| NAME_SUFFIX_MAT | VARCHAR2(25) | Name Maturity Suffix, Jr, Snt etc. |
| NAME_SUFFIX_OTH | VARCHAR2(25) | Name Suffix Other, Phd, CPA etc. |
| NAME_ATTENTION_TO | VARCHAR2(255) | Att, c/o etc - where these values exist in the source system as separate fields. |
| NAME_FULL_NAME1 | VARCHAR2(255) | Full Name of Person/Company/Ambiguous Entity |
| NAME_FULL_NAME2 | VARCHAR2(255) | Full Name of Person/Company/Ambiguous Entity |
| TAX_ID | VARCHAR2(30) | Tax Number e.g. VAT number |
| GOVT_ID | VARCHAR2(30) | Government ID |
| GOVT_ID_TYPE | VARCHAR2(50) | Government ID Type e.g. SSN, UK CRO |
| GENDER | VARCHAR2(1) | Gender of Person |
| HIRE_DATE | DATE | Hire Date of Person |
| TERMINATION_DATE | DATE | Termination Date of Person |
| BIRTH_DATE | DATE | Birth Date of Person |
| USERNAME_GUID | VARCHAR2(20) | GUID of Employee |
| EMAIL_ADDR1 | VARCHAR2(50) | Email Address 1 |
| EMAIL_ADDR2 | VARCHAR2(50) | Email Address 2 |
| DUNS_ENT_NUM | VARCHAR2(9) | Entity DUNS Number |
| ACCOUNT_NUM | VARCHAR2(20) | Account Number e.g. Bank Account Number |
| ACCOUNT_TYPE | VARCHAR2(30) | Account Type e.g. Bank Account |
| ADDR_LINE1 | VARCHAR2(100) | Address Line 1 |
| ADDR_LINE2 | VARCHAR2(100) | Address Line 2 |
| ADDR_LINE3 | VARCHAR2(100) | Address Line 3 |
| ADDR_LINE4 | VARCHAR2(100) | Address Line 4 |
| CITY | VARCHAR2(100) | Locality e.g. City, Town etc |
| STATE | VARCHAR2(100) | Region e.g. State, County |
| POSTAL_CODE | VARCHAR2(20) | Postal Code |
| COUNTRY | VARCHAR2(100) | Country |
| PHONE_OFFICE | VARCHAR2(30) | Office Phone Number |
| PHONE_MOBILE | VARCHAR2(30) | Mobile Phone Number |
| PHONE_HOME | VARCHAR2(30) | Home Phone Number |
| PHONE_FAX | VARCHAR2(30) | Fax Number |
| PHONE_OTHER1 | VARCHAR2(30) | Other Phone Number 1 |
| PHONE_OTHER2 | VARCHAR2(30) | Other Phone Number 2 |

FIG. 4A

| Physical Name | Data Type | Notes |
|---|---|---|
| MDM1 ID | NUMBER | Primary Key from MDM1 |
| MDM0 ID | NUMBER | Foreign Key from MDM0 |
| SOURCE_ENTITY_NUMBER | VARCHAR2(50) | Source System Customer #, Vendor # or Employee # Hotlist ID Concatenated with the ERP source instance |
| ENTITY_TYPE | VARCHAR2(2) | Customer, Vendor, Employee, Hotlist |
| CDM_TABLE | VARCHAR2(30) | Source Table from CDM: Customer Address, Customer Name etc |
| CDM_TABLE_ENTITY_ID | NUMBER | Key from the CDM table that identifies the entity |
| CDM_REF_TYPE | VARCHAR2(25) | Types of Customer Address e.g. Mailing, Billing etc. |
| NAME | VARCHAR2(255) | Full Name of Person/Company/Ambiguous Entity |
| TAX_ID | VARCHAR2(30) | Tax Number e.g. VAT number |
| GOVT_ID | VARCHAR2(30) | Government ID |
| GOVT_ID_TYPE | VARCHAR2(50) | Government ID Type e.g. SSN, UK CRO |
| GENDER | VARCHAR2(1) | Gender of Person |
| HIRE_DATE | DATE | Hire Date of Person |
| TERMINATION_DATE | DATE | Termination Date of Person |
| BIRTH_DATE | DATE | Birth Date of Person |
| USERNAME_GUID | VARCHAR2(20) | GUID of Employee |
| EMAIL_ADDR1 | VARCHAR2(50) | Email Address 1 |
| EMAIL_ADDR2 | VARCHAR2(50) | Email Address 2 |
| DUNS_ENT_NUM | VARCHAR2(9) | Entity DUNS Number |
| ACCOUNT_NUM | VARCHAR2(20) | Account Number e.g. Bank Account Number |
| ACCOUNT_TYPE | VARCHAR2(30) | Account Type e.g. Bank Account |
| ADDR_LINE1 | VARCHAR2(100) | Address Line 1 |
| ADDR_LINE2 | VARCHAR2(100) | Address Line 2 |
| ADDR_LINE3 | VARCHAR2(100) | Address Line 3 |
| ADDR_LINE4 | VARCHAR2(100) | Address Line 4 |
| CITY | VARCHAR2(100) | Locality e.g. City, Town etc |
| STATE | VARCHAR2(100) | Region e.g. State, County |
| POSTAL_CODE | VARCHAR2(20) | Postal Code |
| COUNTRY | VARCHAR2(100) | Country |
| PHONE_OFFICE | VARCHAR2(30) | Office Phone Number |
| PHONE_MOBILE | VARCHAR2(30) | Mobile Phone Number |
| PHONE_HOME | VARCHAR2(30) | Home Phone Number |
| PHONE_FAX | VARCHAR2(30) | Fax Number |
| PHONE_OTHER1 | VARCHAR2(30) | Other Phone Number 1 |
| PHONE_OTHER2 | VARCHAR2(30) | Other Phone Number 2 |
| MDM2_NAME_ID | NUMBER | MDM2 NAME ID |
| MDM2_ADDRESS_ID | NUMBER | MDM2_ADDRESS_ID |

FIG. 4B

| | PHONE_OFFICE | COUNT | LENGTH |
|---|---|---|---|
| 1 | | 51032 | |
| 2 | 0 | 3 | 1 |
| 3 | 037456336 | 2 | 9 |
| 4 | 06-564911 | 2 | 9 |
| 5 | 065190500 | 2 | 9 |
| 6 | 054150202 | 2 | 9 |
| 7 | 040225596 | 2 | 9 |
| 8 | 0963/9621 | 2 | 9 |
| 9 | 010/562993 | 2 | 10 |

FIG. 4C

| | PATTERN | EXAMPLE | COUNT |
|---|---|---|---|
| 1 | | | 51032 |
| 59 | nnnnnnnnnn | 0102511284 | 454 |
| 54 | nnnn/nnnnnn | 0121/339004 | 347 |
| 58 | nnnnnnnnn | 010261609 | 220 |
| 60 | nnn/nnnnnnn | 010/2465281 | 170 |
| 61 | nnn/nnnnnn | 010/218031 | 155 |
| 53 | nnnn/nnnnn | 0122/49023 | 122 |
| 39 | nn/nnnnnnn | 02/2134838 | 69 |
| 38 | nn/nnnnnnnn | 02/22470109 | 47 |

FIG. 4D

| | VALUE | COUNT |
|---|---|---|
| 1 | AKA | 1999 |
| 2 | DBA | 1999 |
| 3 | ATTENTION | 1999 |
| 4 | C/O | 111 |
| 5 | FKA | 1999 |

FIG. 4F

| | Address1 Flag | Address2 Flag | Address3 Flag | Address4 Flag | City Flag | State Flag | Postal Code Flag | Country Flag | Count |
|---|---|---|---|---|---|---|---|---|---|
| 1 | Y | N | N | N | Y | Y | Y | N | 39088 |
| 2 | Y | N | N | N | Y | Y | Y | Y | 7061 |
| 3 | N | N | N | N | N | N | N | N | 6574 |
| 4 | Y | Y | N | N | Y | Y | Y | Y | 94 |
| 5 | N | N | N | N | Y | Y | Y | Y | 20 |
| 6 | Y | N | N | N | Y | Y | N | Y | 7 |
| 7 | Y | Y | N | N | Y | N | N | N | 6 |
| 8 | Y | N | N | N | N | Y | Y | Y | 2 |
| 9 | N | N | N | N | Y | N | Y | N | 1 |
| 10 | Y | N | N | N | N | Y | Y | Y | 1 |
| 11 | Y | N | N | N | Y | Y | Y | N | 1 |
| 12 | N | N | N | N | Y | Y | Y | N | 1 |

FIG. 4E

| | MDM0_ID | ADDR_LINE1 | ADDR_LINE2 | ADDR_LINE3 | ADDR_LINE4 | VALUE |
|---|---|---|---|---|---|---|
| 1 | 434147 | VIA DEL COMMERCIO, 69 C/O SAN BIAGIO | | | | C/O |
| 2 | 435266 | VIALE BORRI, 133 C/O CDC | | | | C/O |
| 3 | 435965 | P.ZZA PRIMAVERA C/O CENTRO MORRA | | | | C/O |
| 4 | 434627 | PIAZZA RANGONE, 1 C/O MUNICIPIO | | | | C/O |
| 5 | 435181 | VIALE EUROPA, 77 C/O VILLA STABIA | | | | C/O |
| 6 | 435883 | VIA ROSOLINO PILO, 115 C/O CDC | | | | C/O |
| 7 | 435912 | VIA PIPPO RIZZOGLIO, 8 C/O CDC | | | | C/O |
| 8 | 434778 | C/O OSPEDALE SAN MARTINO | | | | C/O |
| 9 | 434466 | VIA MATTEOTTI, 1/A C/O C BENESSERE | | | | C/O |
| 10 | 441065 | PIAZZA S ANTONIO, 2 C/O OSPEDALE | | | | C/O |

FIG. 4G

| Physical Name | Data Type | Notes |
|---|---|---|
| MDM2_ID (PK) | NUMBER | MDM2 ID |
| ENTITY_TYPE (PK) | VARCHAR2(2) | Customer, Vendor, Employee, Hotlist |
| PROPERTY_TYPE (PK, FK) | VARCHAR2(50) | Property Type from Property table |
| NAME_TYPE | VARCHAR2(50) | Person, Organization |
| COL 1 | VARCHAR2(255) | Column 1 |
| COL 2 | VARCHAR2(225) | Column 2 |
| COL 3 | VARCHAR2(255) | Column 3 |
| COL 4 | VARCHAR2(255) | Column 4 |
| COL 5 | VARCHAR2(255) | Column 5 |
| COL 6 | VARCHAR2(255) | Column 6 |
| COL 7 | VARCHAR2(255) | Column 7 |
| COL 8 | VARCHAR2(255) | Column 8 |
| COL 9 | VARCHAR2(255) | Column 9 |
| COL 10 | VARCHAR2(255) | Column 10 |
| COL 11 | VARCHAR2(255) | Column 11 |
| COL 12 | VARCHAR2(255) | Column 12 |
| COL 13 | VARCHAR2(255) | Column 13 |
| COL 14 | VARCHAR2(255) | Column 14 |
| COL 15 | VARCHAR2(255) | Column 15 |
| COL 16 | VARCHAR2(255) | Column 16 |
| COL 17 | VARCHAR2(255) | Column 17 |
| COL 18 | VARCHAR2(255) | Column 18 |
| COL 19 | VARCHAR2(255) | Column 19 |
| COL 20 | VARCHAR2(255) | Column 20 |
| COL 21 | VARCHAR2(255) | Column 21 |
| COL 22 | VARCHAR2(255) | Column 22 |
| COL 23 | VARCHAR2(255) | Column 23 |
| COL 24 | VARCHAR2(255) | Column 24 |
| COL 25 | VARCHAR2(255) | Column 25 |
| MDM3_NAME_ID | NUMBER | MDM3_NAME ID - based on parsed values |
| MDM3_ADDRESS_ID | NUMBER | MDM3_ADDRESS ID - based on parsed values |

FIG. 4H

| External | Internal | # Org Words | Suggestions |
|---|---|---|---|
| Organization | Organization | N/A | Organization |
| Organization | Ambiguous | N/A | Organization |
| Ambiguous | Organization | N/A | Organization |
| Person | Organization | >1 | Organization |
| Person | Organization | =1 | Review: High and Medium indicate high, medium probability that the name is an Org name. Low means more detailed review of a name is required |
| Person | Ambiguous | N/A | Person |
| Ambiguous | Ambiguous | N/A | Review: High and Medium indicate high, medium probability that the name is an Org name. Low means more detailed review of a name is required |

FIG. 4I

PRICEWATERHOUSECOOPERS ⓘ | eFDT subledger *  Comment | Contact Us | Log Off

Welcome Dhruv

▽ Forensic Data Handling | ▷ Accounting Cycles | ▷ Fraud Investigations

Client
Project
User
Report  ▲

Project Name ▽
NSR FCPA Investigation

Custom Report Administration

Active ▼

☐ Accounts Payable                                                                       Yes  No
　▶ Days Payable Outstanding Terms and Working Capital Analysis (DPO)    ⊙   ○
　▶ Disbursements within a Specified Range and Approval Limit              ⊙   ○
　▶ Round Dollar Disbursements                                              ⊙   ○
　▶ Segregation of Duties - Disbursement and Vendor Master File            ⊙   ○
　▶ Vendor Discount Analysis                                                ⊙   ○
　▶ Vendor Master File Controls and Maintenance                            ⊙   ○
☐ Payroll                                                                  Yes  No
　▶ Employee Expenses over (X) Amount                                       ⊙   ○
☐ Revenue                                                                  Yes  No
　▶ Credit Memo Analysis - Customer                                         ⊙   ○
　▶ Credit Memo Analysis - Reason Code                                      ⊙   ○
　▶ Credit Memo Analysis by Creator                                         ⊙   ○
　▶ Customer Master File Controls and Maintenance                          ⊙   ○
　▶ Days Sale Outstanding by Terms and Working Capital Analysis (DSO)      ⊙   ○
　▶ Percentage of Customer Returns Compared to Customer Sales (by Customer) ⊙   ○
　▶ Segregation of Duties - Sales Orders and Customer Master File          ⊙   ○
　▶ Top Customer Cash Receipts/Payments Analysis (80/20 Rule)              ⊙   ○
　▶ Unauthorized Price Changes                                              ⊙   ○
　▶ Unusual Customer Trends (Based on Sales and Return Amounts)            ⊙   ○
　▶ Working Capital Analysis on Customer Receipts                          ⊙   ○

High Risk Reports ▼
[Check All]  [Submit]

FIG. 7

NSP FCPA Investigation
Report Name: Duplicate on Invoice Number, Invoice Date and Payment Amount
Report Description: This analysis will identify possible duplicate vendor disbursements that have matching invoice numbers, invoice dates, and payment amounts. This analysis will contain invoice and user information and could be used to potentially identify check tampering.
Accounting Cycle: Accounts Payable
Fraud Scheme: Fraudulent Disbursements
Generated Date: 5/25/2006 11:26
UserName: Dhruv Chawla
Record Count: 340

| Vendor Number | Vendor Name | Invoice Number | Invoice Date | Payment Amount | Check Number | Check Date |
|---|---|---|---|---|---|---|
| | | | | | | |

FIG. 9A

NSP FCPA Investigation
Report Name: Vendors With No Addresses Listed
Report Description: Extract vendors with no address
Accounting Cycle: Accounts Payable
Fraud Scheme: Fraudulent Disbursements
Generated Date: 5/25/2006 11:26
User Name: Dhruv Chawla
Record Count: 2594

| Vendor Number | Vendor Name | Address | City | State |
|---|---|---|---|---|
| | | | | |

FIG. 9B

NSP FCPA Investigation

Report Name: Vendors With No Terms Listed
Report Description: Extract vendors with no terms
Accounting Cycle: Accounts Payable
Fraud Scheme: Fraudulent Disbursements
Generated Date: 5/25/2006 11:26
User Name: Dhruv Chawla
Record Count: 1684

| Vendor Number | Vendor Name | Address | City | State |
|---|---|---|---|---|
| | | | | |

FIG. 9C

NSP FCPA Investigation

Report Name: Zero Dollar and Negative Disbursements
Report Description: This Analysis will provide a list of zero dollar and negative vendor payments and their respective information. This Analysis will provide insight into how many Zero Dollar and Negative Disbursements there are and the possible Billing Schemes that could result from such payments.
Accounting Cycle: Accounts Payable
Fraud Scheme: Fraudulent Disbursements
Generated Date: 5/25/2006 11:32
User Name: Dhruv Chawla
Record Count: 2755

| Payment Type | Check Number | Check Date | Check Amount | Currency Code | Vendor Number | Employee Number |
|---|---|---|---|---|---|---|
| | | | | | | |

FIG. 9D

NSP FCPA Investigation

Report Name: Vendors with Only One Payment
Report Description: This analysis will provide list of all vendors which have only one payment made in the check register file. This could be identified as a ¿one-off¿ payment.
Accounting Cycle: Accounts Payable
Fraud Scheme: Fraudulent Disbursements
Generated Date: 5/25/2006 11:33
User Name: Dhruv Chawla
Record Count: 1104

| Vendor Number | Vendor Name | Address | City | State |
|---|---|---|---|---|
| | | | | |

PRICEWATERHOUSECOPERS ® | eFDT subledger *  Comment | Contact Us | Log Off

Welcome Dhruv

| Projects | ▷ Forensic Data Handling | ▷ Accounting Cycles | ▷ Fraud Investigations |

Reports — Standard Analysis Reports... ▸ | Custom Analysis Reports... ▸

Report Scoring

Project Name ▽
Test Project 1

Custom Analysis Reports                                                Level 1 ▼

Report Name ▽
Top Customer Cash
Receipts/Payments Analysis
(80/20 Rule)

Fraud Scheme ▽
Fraudulent Statements

Analysis ▽
This analysis will identify
customers that comprise 80%
of the total number of cash
receipts/payments and 80% of
the dollar value of cash
receipts/payments, as an
indication of where
management should focus
credit and collections efforts.
By highlighting these particular
customers, management is
able to identify opportunities
for improving DSO by reducing
terms or enforcing compliance
with terms. Additionally,
invoice consolidation
opportunities are identified for
low dollar, high volume
customers. This report will
allow the user to drill down to
what exact customers make
up the top 80% number of
invoices along with 80% of the
highest dollar invoices.

⊟ Cash Receipts by Number
   ▸ Total Number Of Active Customers                  358
   ▸ Total Number Of Cash Receipts                    19,632
   ▸ 80% of Number of Cash Receipts                 16,118
   ▸ Number of Customers                                 14
   ▸ Percentage of Customers                          3.91%
   ▸ Days Sales Outstanding (DSO)                   233.97

⊟ Cash Receipts by Dollar
   ▸ Total Dollar Amount of Receipts     $6,796,696,768.02
   ▸ Top 80% of Dollar Value              $5,550,495,166.83
   ▸ Number of Customers                                  9
   ▸ Percentage of Customers                          2.51%
   ▸ Days Sales Outstanding (DSO)                   214.54

FRAUD DETECTION, RISK ANALYSIS AND COMPLIANCE ASSESSMENT

TECHNICAL FIELD

This disclosure relates to monitoring for and detecting fraud and, more particularly, to detecting potentially fraudulent activity in connection with financial transactions of a company. The disclosure also relates to techniques for performing assessments of risk analysis and assessing compliance with applicable regulations.

BACKGROUND

Fraud can be described as a deception deliberately practiced in order to secure unfair or unlawful gain.

Examples of fraudulent activities include mail fraud, financial statement fraud, vendor fraud, misappropriation of company funds/assets, preparation of fraudulent financial statements, bribery and corruption, kickbacks and secret commissions, fraudulent disbursements/false expense reporting and money laundering.

Detecting instances of fraud perpetrated on a company can be cumbersome and difficult.

SUMMARY

Techniques and systems are disclosed to aid investigators in detecting potentially fraudulent activity, performing risk analysis or assessing compliance with applicable regulations. The techniques and systems enable the investigator to quickly narrow the focus of his or her investigation and to uncover potentially fraudulent activities that might otherwise have been too difficult to detect. The method utilizes data matching and clustering algorithms.

In one aspect, a system includes one or more servers to load accounting and transaction data from an enterprise resource planning system into a common data model and to identify links between entities based on matches in identification data so as to create clusters of linked entities such as individuals or organizations. Reports can be generated with drill-down capabilities to facilitate access to the underlying data and to facilitate identifying actual or possible fraudulent activities.

Various implementations can include one or more of the following features.

For example, the servers can be configured to perform a series of sequential data transformations and to load results of each transformation into a corresponding database table. Two or more entities can be clustered based on links among records for those entities. Relationships among the records can be identified, for example, based on entity identification data across multiple fields in the records or across different entity types.

In a particular implementation, the series of data transformations includes extracting the entity identification data from the common data model database, loading the extracted entity identification data into a first database table, and creating a respective new record for each name listed in the first database table. Next, a first data pre-cleansing process is performed with respect to names in the new records, and the pre-cleansed records are stored in a second database table. An address cleansing process is performed with respect to the records stored in the second database table, and each name entry in the second database table is stored as a personal name or an organization name. A data cleansing process is performed for each record depending on the category to which the corresponding name entry is assigned. Results of the data cleansing process are stored in a third database table. Data in the third database table then is compressed to obtain a single record for each particular entity name, and the compressed data is stored in a fourth database table. A data matching process is performed for the compressed data based on a program selected by a user from among a plurality of stored programs. Results of the data matching process are stored in a fifth database table.

Other implementations are within the scope of the claims.

Various implementations can include one or more of the following advantages.

The web-based fraud detection tool, described in greater detail below, can provide the ability to perform comprehensive analysis, for example, on accounts payable and accounts receivable sub-ledgers. There are many different fraud schemes that can be tested for using the fraud detection tool, which can incorporate various standard analyses that a user can perform. In addition the tool can allow the user to design a customized analysis depending upon the data available.

The fraud detection tool allows users to drill down to the lowest transaction level detail while performing the analysis from an aggregate level.

The tool can incorporate external databases and information from third-party vendors to provide the user with more comprehensive analysis in identifying fraudulent transactions. One such external database is a "Project Hotlist," which includes a project's specific watch lists that can be used to focus and supplement the electronic fraud detection tool analyses. Once populated, the lists can be compared against multiple valid entries and records found in the target ERP system, either directly or via alias values derived from third-party vendor software.

Users have the ability to score transactions across the various analyses to weight individual transactions according to their relevance. The result is a more focussed set of transactions that have a higher probability of being fraudulent and helps focus the resources in the right direction.

The tool allows a user to perform the analysis in real time and export results into various formats (e.g., an Excel spreadsheet).

The fraud detection tool is based on a common data model, which allows for flexibility in being able to incorporate data from other financial systems as well as for multiple accounting periods.

The user interface can provide in-depth literature about each of the fraud areas and schemes and can serve as a knowledge sharing and management portal.

The tool can be used not only to detect fraud, but also can be used to help proactively in risk and fraud assessment. Thus, use of the tool is not limited to investigators, but can also be used by internal audit, fraud risk and compliance specialists.

A large amount of data from disparate sources can be analyzed quickly to uncover entities and transactions that might be related to potentially fraudulent activities. Such analyses can easily narrow the focus of a fraud investigation that might otherwise be unduly burdensome. Additionally, suspicious relationships between various entities that a company deals with may be easily discovered. In particular, relationships may be uncovered that otherwise would have been unduly cumbersome to discover.

A further benefit of certain implementations relates to the volume of data that can be analyzed as a result of the systems database platform. For example, in some implementations, all of the accounting/transaction data may be analyzed as opposed to a sample or portion of the data. In addition, the system's database platform may allow for the comparison of different datasets that would not have been possible in their native applications.

The details of one or more implementations are set forth in the accompanying drawings and the description described below. Other features and advantages will be apparent from the description and drawings, and from the claims.

BRIEF DESCRIPTION OF THE DRAWINGS

FIGS. 4A through 4I are tables referenced in the description of the matching and clustering process.

FIGS. 5 through 37 are examples of user-interface screenshots for a fraud detection system.

Like reference symbols indicate like elements.

DETAILED DESCRIPTION

Figure 1:
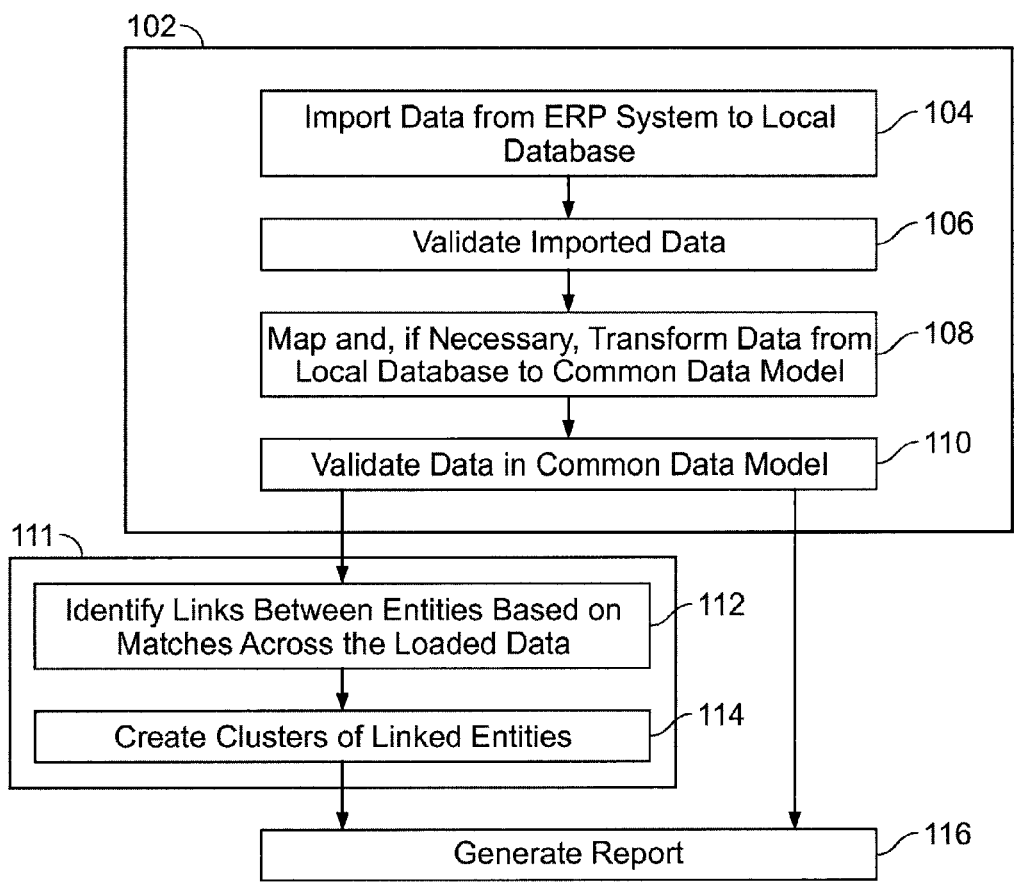
FIG. 1 is a flowchart of a fraud detection method.

FIG. 1 illustrates a method for detecting potentially fraudulent activity and identifying suspicious relationships between various parties that interact with an organization.

The illustrated method includes loading 102 data from an organization's enterprise resource planning (ERP) system to a common data model that defines the generic structures for storage of data which the fraud detection tool uses. In some implementations, the organization's ERP system may include one or more software products that are commercially available, for example, from Oracle Corporation, PeopleSoft, SAP and others. Data loaded from the organization's ERP system can include various financial information, which may be modularized into categories such as payroll, accounts receivable, accounts payable, fixes assets and inventory.

The common data model is a database that defines types of data relevant to detecting possible instances of fraud or identifying suspicious relationships between various parties related to the organization. An example of the information that may be included in a common data model is shown in the entity-relationship diagrams of FIGS. 2A and 2B. Other information also may be relevant and included in the common data model. In a particular implementation, the common data model is implemented as an Oracle® database. Other database software may be used to implement the common data model.

According to the illustrated implementation of FIG. 1, loading the data includes importing 104 the data from the organization's ERP system to a local database. In some implementations, the local database may be adapted simply to store the imported data in a manner that is similar to the manner of storage in the ERP system.

The illustrated method includes optionally validating 106 the imported data. Data validation can include confirming that the local database includes the amount of data and the type of data that was expected to be imported into the local database. For example, a user might visually inspect the data that has been imported into the local database to confirm that a certain number of records have been imported into the local database. If, during that inspection, the user determines that the local database does not include the expected number of records, then the user might choose to reload the data.

Next, the imported data is mapped 108 and, if necessary transformed, into the common data model. The data mapping and transforming can be implemented, for example, using Structured Query Language (SQL) mapping and transform scripts. The data mapping involves mapping a field in the ERP system to the corresponding field in the common data model.

Data transformation may be desirable if, for example, the data stored in the local database is in a form such that it cannot readily be mapped into a particular field in the common data model. As an example, if the local database includes a single data entry with more than one piece of information, the single data entry may need to be transformed into two separate pieces of data each of which then is mapped to a different field in the common data model. Thus, the data transformation step can parse a record from the ERP system to the corresponding fields in the common data model.

Once the imported data is mapped 108 and, if necessary, transformed, into the common data model, the illustrated method includes a second, optional validation 110. That second, optional validation entails a user checking that the data stored in the common data model matches the user's expectations regarding what types of data and how much data should be stored in the common data model.

The data stored in the common data model includes transaction level information as well as entity identification information. Examples of identification information include the entity's name, address, tax identification, social security number, birth date, bank account number, VAT number, gender, username, email address, telephone number and DUN numbers. Transaction scoring data elements and alias data constructs also are stored in the common data model.

After loading 102 the data into the common data model, the illustrated method includes processing 111 the loaded data. Processing 111 the data includes identifying 112 links between entities based on matches or similarities across the loaded data. For example, if an employee's name is "John Doe" and a customer's name is "Doe Construction", a link might be identified between "John Doe" and "Doe Construction" because of a match in the names of those entities (i.e., the word "Doe" appears in both names). Similarly, if "Doe Construction" and "Deer Corporation" share the same telephone number, a link may be identified between "Doe Construction" and "Deer Corporation" because of a match in the phone numbers of those entities.

A process of transliteration can be used to improve the linking of non-English names (e.g., Japanese, Chinese, Greek, etc.). Transliteration involves the rewriting of letters or words from one alphabet to another. In this process, personal names normally spelled in non-English alphabets are transliterated into English. This transliteration process is important because there may be multiple transliterated versions of the same non-English name. The transliteration process can be implemented, for example, using software available from Language Analysis Systems ("LAS"), now owned by IBM. Links also may be created by comparing entities to external databases such as the Project Hotlist.

After identifying 112 matches across the loaded data, the data processing includes creating 114 clusters of linked entities. Based on the example outlined above, a cluster of linked entities might include "John Doe," "Doe Construction" and "Deer Corporation." As indicated above, "John Doe" is linked to "Doe Corporation" by virtue of the word "Doe" appearing in the names of both entries. Additionally, "Doe Construction" is linked to "Deer Corporation" by virtue of a shared phone number. Moreover, "John Doe" is clustered with "Deer Corporation" since both are linked to "Doe Corporation." In the foregoing example, it is possible that a relationship exists between "John Doe" and "Deer Corporation" that, without the matching and clustering processes, might go unnoticed.

The illustrated method also includes generating 116 one or more reports based either on the matching 112 and clustering 114 or simply based on the data that was loaded 102 into the common data model. In a typical implementation, the method includes generating one or more reports based on the loaded data and generating one or more reports based on the matching 112 and clustering 114 processes.

Figures 1, 2A:
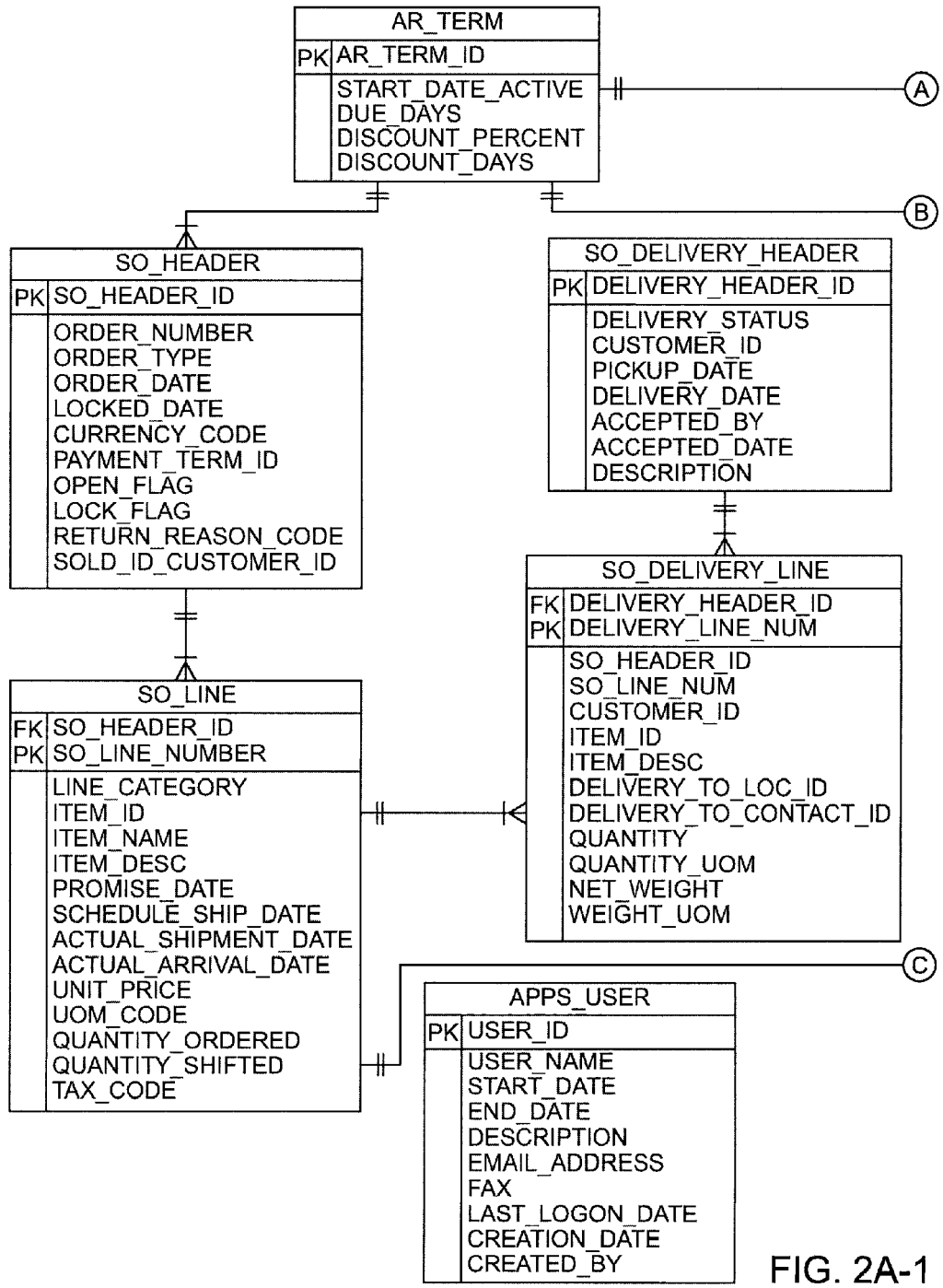
FIGS. 2A and 2B are examples of information included in a common data model.
Figures 2, 2A:
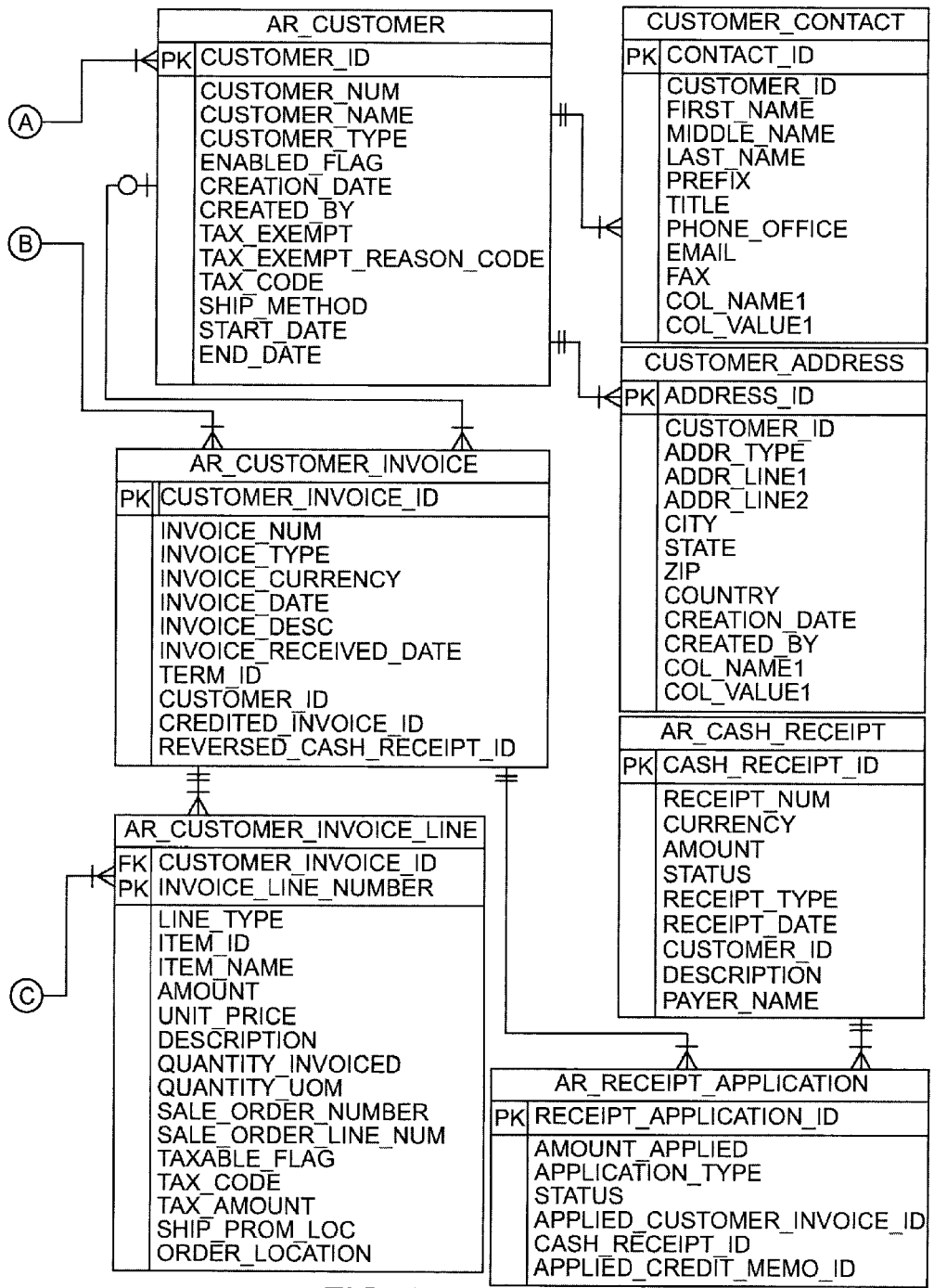
Figures 1, 2B:
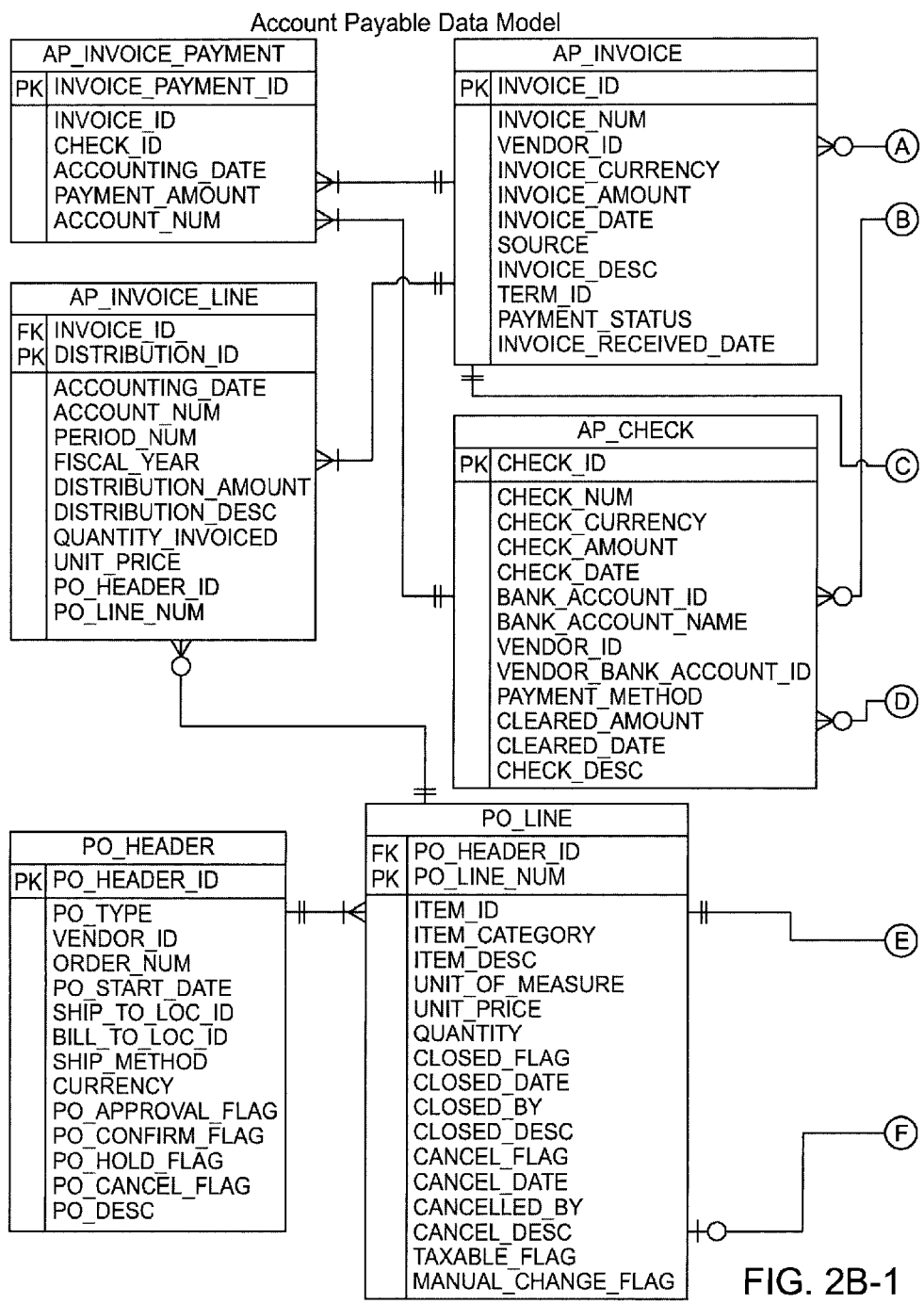
Figures 2, 2B:
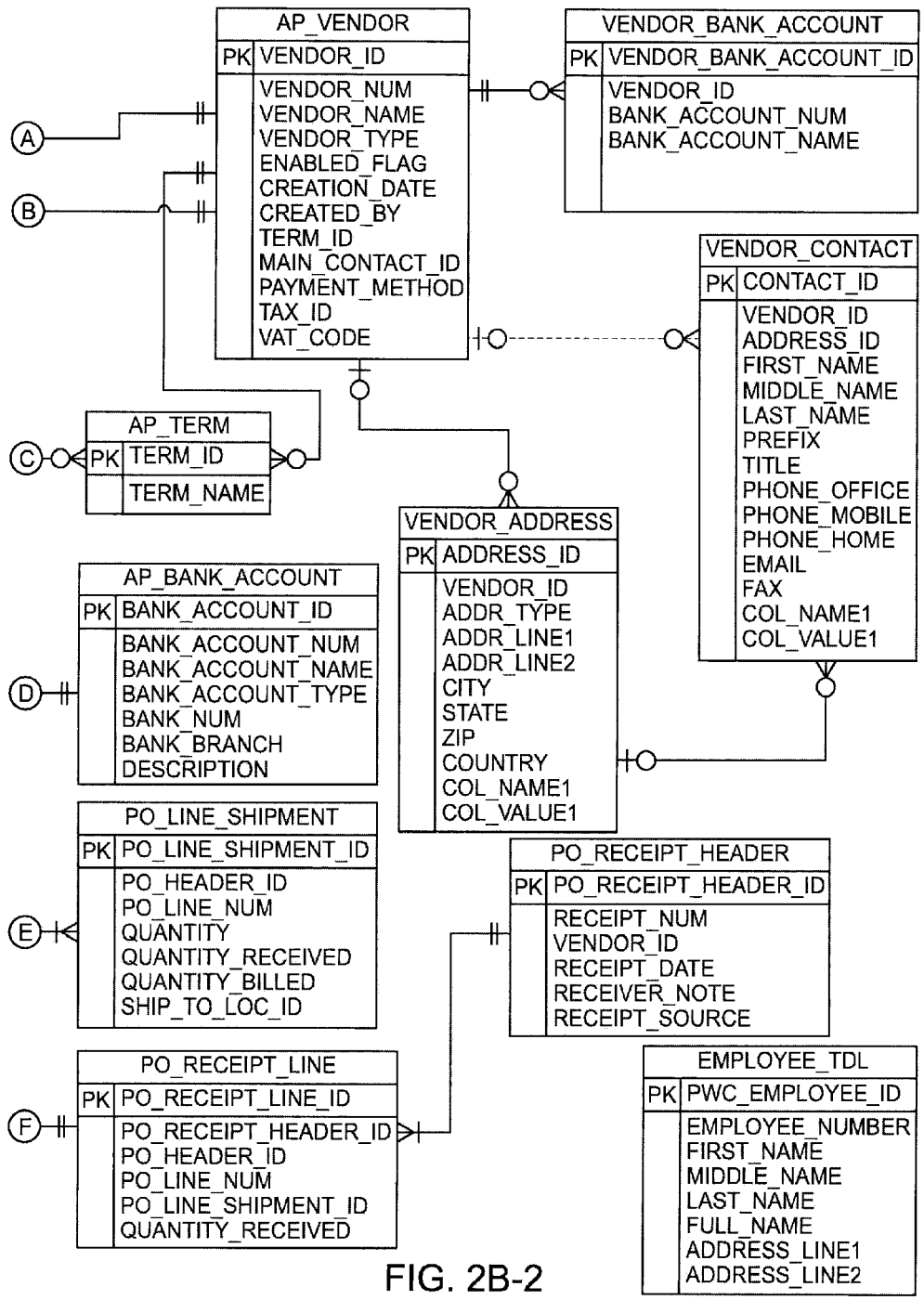

FIGS. 2A and 2B are entity-relationship diagrams that reflect examples of the types of information for particular data categories that can be loaded (at block 102) into the common data model. FIG. 2A is an entity-relationship diagram setting forth data relevant for analyzing potentially fraudulent activities or suspicious relationships based on accounts receivables, sales orders and deliveries information. FIG. 2B is an entity-relationship diagram setting forth data relevant for analyzing potentially fraudulent activities or identifying suspicious relationships based on accounts payables information. Other categories of data and types of data can be loaded into the common data model as well.

Figure 3A:
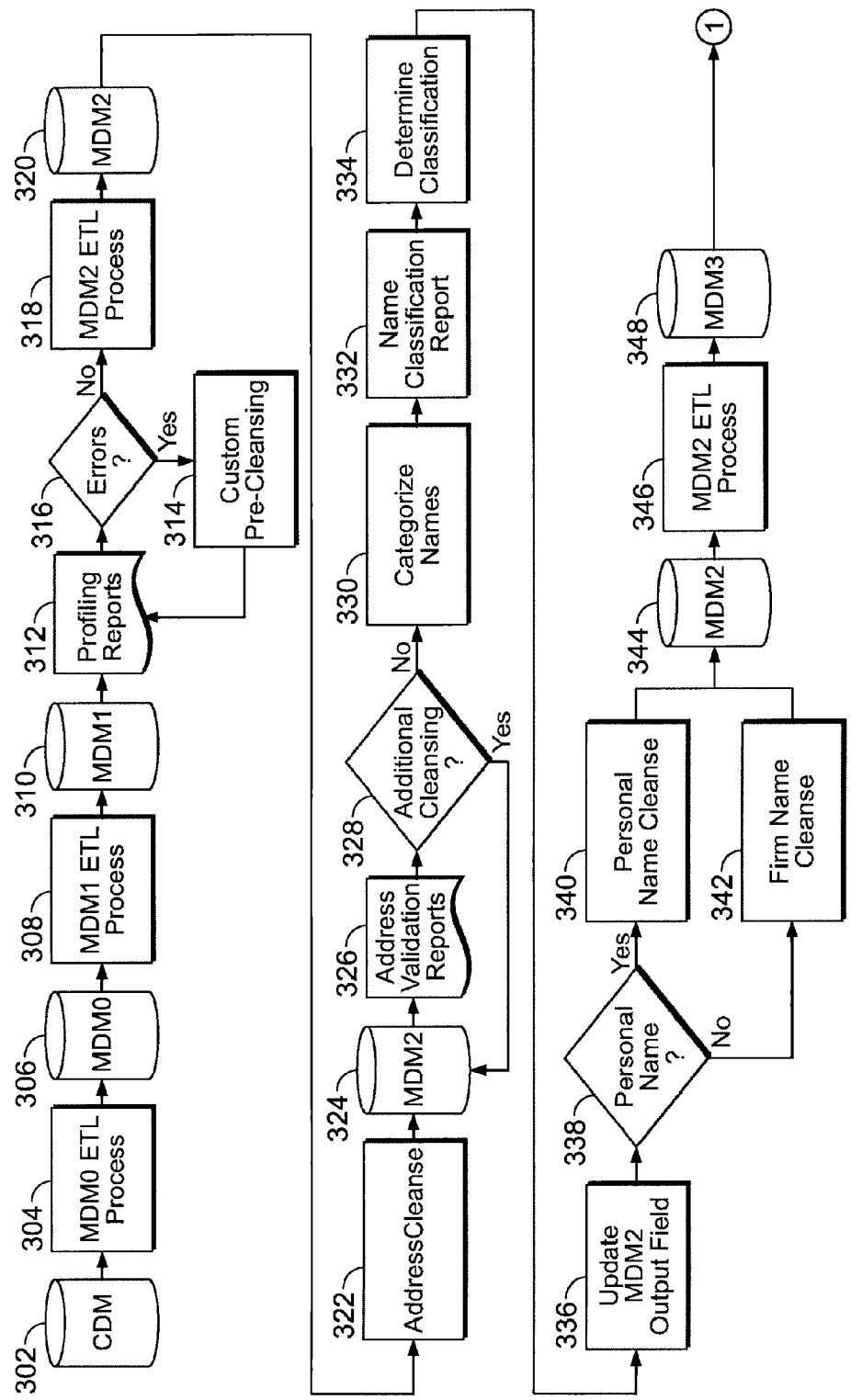
FIGS. 3A and 3B is a flowchart of a matching and clustering process.
Figure 3B:
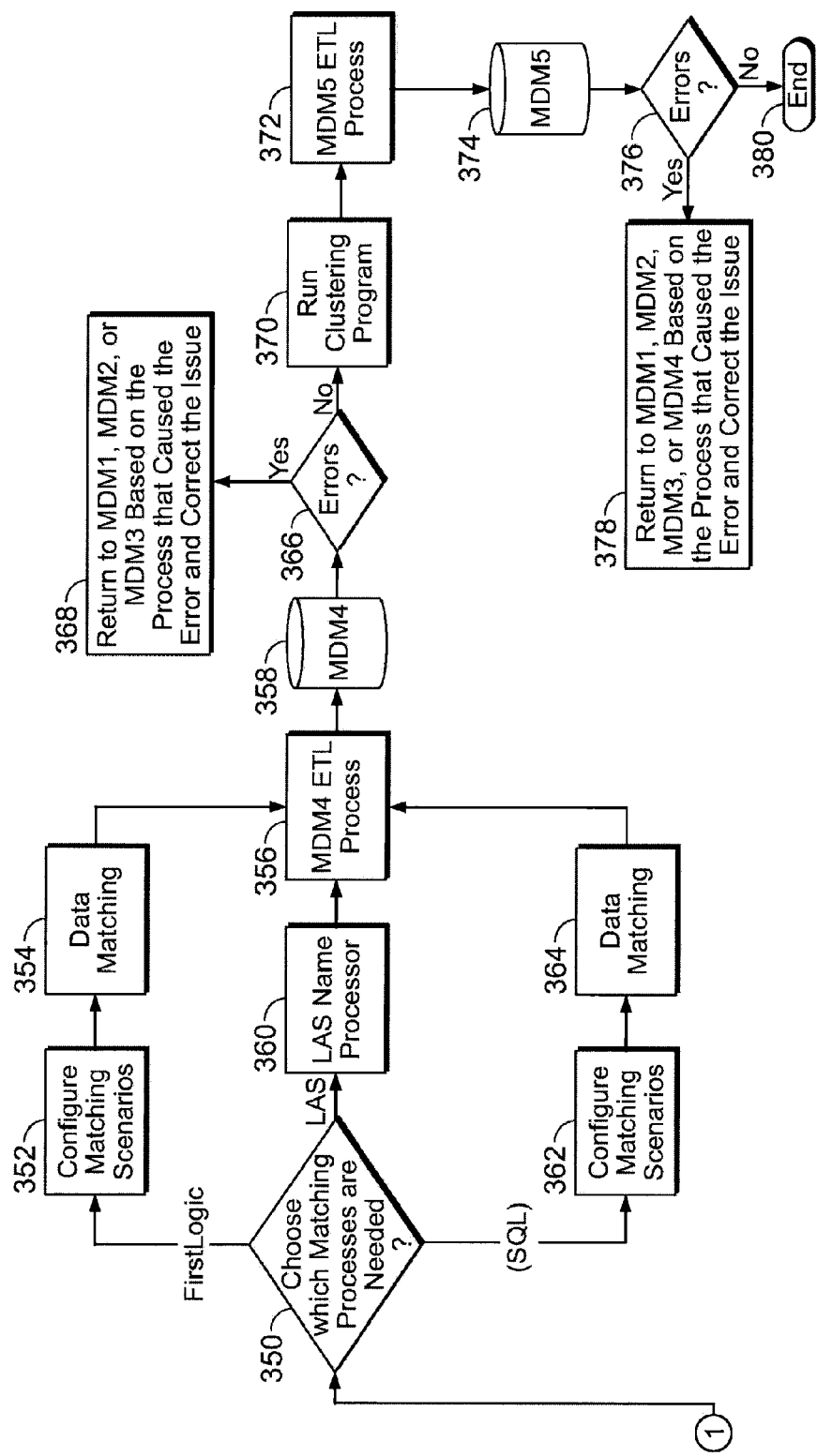

FIGS. 3A and 3B are a flowchart that illustrates details of a particular implementation of the data processing 111 step of FIG. 1. As indicated above, the data processing generally includes identifying links between entities based on data matches across the common data model and creating clusters of linked entities. Other steps are described in detail below.

According to the illustrated implementation, source data first is loaded into a database (e.g., common data model 302) for processing. In other implementations, the data may be loaded directly into an initial matching data module (MDM0).

After the source data is loaded into the common data model 302, the non-accounting identification data is extracted, transformed and loaded (ETL) 304 from the common data model 302 to the MDM0 module. The transaction level information is not extracted from the common data model. In general, the extract function of an ETL process reads data from the common data model and extracts a desired subset of data. The transform function of the ETL process works with the acquired data—using rules or lookup tables, or creating combinations with other data—to convert or pre-cleanse the data to a desired state. Such a transformation may facilitate subsequent identification of matches across the data. Finally, the load function of the ETL process is used to write the resulting data (either all of the subset or just the changes) to the MDM0 module. Data then is extracted 304 from the common data model 302 to the MDM0 module 306.

Each matching data module, such as the MDM0 module 306 as well as other matching data modules discussed below, can be implemented, for example, as a table in a database. The structure of a data model for the MDM0 module 306 is shown in FIG. 4A. FIG. 4A illustrates a data schema or data dictionary that describes the data elements utilized in the fraud detection tool with respect to entities. FIG. 4A includes three columns: "Physical Name" provides the data element name, "Data Type" provides a description of how the data is stored (e.g., as a "NUMBER" or as a variable length character "VARCHAR") and the length of VARCHAR fields, and "Notes" provides more descriptive information about the data element.

Next, a second ETL process 308 is performed from the MDM0 module 306 to another matching data module (MDM1) 310. In one implementation, that ETL process 308 creates a new record for each name in the parsed and unparsed names fields in the MDM0 module 306 and concatenates all parsed names. Additionally, the ETL process 308 performs data pre-cleansing. Examples of such data pre-cleansing include removing periods, inserting spaces before a "(", inserting spaces after a ")", consolidating single characters, e.g., "L L P" into "LLP", trimming spaces before the first word and after the last word in a field, converting multiple contiguous spaces into one space and converting extended ASCII into ASCII characters. The ETL process also clusters exact matches of names and addresses in order to increase the performance of the matching process. Names and addresses are clustered, or grouped together, so that only one instance of a name or address is entered into the matching process. An example structure of the data model for the MDM1 module 310 is shown in FIG. 4B.

The next step in the illustrated method is creating 312 profiling reports. Profiling reports provide a measure of the completeness and type of data that has been entered into the MDM1 module 310. Such reports can help identify corrections or additional pre-cleansing that may be required before processing the data further. In one implementation, the profiling reports include frequency reports (see, e.g., phone frequency report of FIG. 4C), pattern reports (see, e.g., phone pattern report of FIG. 4D), address summary reports (see, e.g., FIG. 4E) and name in address field reports (see, e.g., FIG. 4F). The frequency reports and the pattern reports summarize the information contained in each of the fields that are to be used for matching.

The frequency report of FIG. 4C includes three columns of information. The first column is entitled "phone_office" and identifies various sequences of numbers. The second column is entitled "count" and identifies the number of records in the MDM1 module 310 that include the corresponding sequence of numbers. The third column is entitled "length" and indicates the number of characters contained in the corresponding sequence of numbers.

The pattern report of FIG. 4D includes three columns as well. The first column is entitled "pattern" and identifies various patterns that a particular type of data might follow. The second column identifies exemplary data entries that would follow the corresponding pattern. The third column is entitled "count" and identifies the number of data entries in the MDM1 module 310 that follow each corresponding pattern. Referring to the row identified by the number "54," the data entry "0121/339004" is provided as an example of a data entry that would match the pattern "nnnn/nnnnn." The third column of row "54" indicates that 347 data entries from the MDM1 module 310 follow that same pattern.

An example of an address summary report is shown in FIG. 4E. Each row in the address summary report identifies a pattern of address fields that have been populated (indicated by the letter "Y") and address fields that have not been populated (indicated by a letter "N"). The address summary report also includes a count in the right far column of the report. The count indicates the number of records in the MDM1 module 310 that have an address field population scheme that matches the population scheme set forth by the series of "Y"s and "N"s in the corresponding row. As an example, row 1 of the illustrated report indicates that 39088 data entries in the MDM1 module 310 include at least some data entered into the address fields that correspond to "address 1 flag," "city flag," "state flag," and "postal code flag," but include no data in the address fields that correspond to "address 2 flag," "address 3 flag," "address 4 flag," and "country flag." The address summary report may be adapted so that a user can readily access and view the actual data entries upon which each row of information in the address summary report is based.

FIG. 4F is an example of a name in address field report. The illustrated report includes to columns of data. The first column is entitled "value" and identifies particular words that might be included in address fields. The second column is entitled "count" and identifies the number of times the corresponding word (or value) appears in the address fields. As an example, row 2 of the illustrated report indicates that the value "DBA" appears 1999 times in the address fields of the MDM1 module 310. A report may be generated to provide a detailed list of the data entries that include a particular one of the "values." An example of that report is shown in FIG. 4G, which provides a list of the MDM0 module 306 identification numbers, a portion of the address, and the value that is included in the address. In the illustrated example, the value is "C/O."

Other profiling reports can be generated. For example, reports can be generated to validate the mapping of cities to states and countries.

Referring again to FIG. 3A, the illustrated method includes customized pre-cleansing 314. Customized pre-cleansing can be an automated or manual process. In a typical implementation, customized pre-cleansing modifies the data in the MDM1 module based on the information gathered through generating the profiling reports. In one implementation, a user might review those reports and customize the data pre-cleansing process to address particular concerns about the completeness or usability of the data.

After generating 312 profiling reports and performing customized pre-cleansing 314, a user can scan 316 the data for errors and determine if further changes to the data should be made before proceeding. If so, changes can be made. If not, a data ETL process 318 is conducted from the MDM1 module 310 to another matching data module (MDM2) 320. An example of the structure for the data model for the module MDM2 320 is shown in FIG. 4H.

The illustrated method also includes address cleansing 322. In one implementation, address cleansing involves parsing and standardizing data stored in certain address fields in the MDM2 module. In particular, city names, state names, country names, postal codes, and the like can be parsed and standardized. In a particular implementation, address cleansing 322 is accomplished using a software package from Firstlogic, Inc., now owned by Business Objects SA. New parsed and cleansed fields are then provided (at 324) to the module MDM2.

Another set of address validation reports is generated 326. Those reports can be used as an additional check on parsed address data. A manual review of those reports can be conducted to determine if additional cleansing 328 or other changes need to be made to the data before continuing. If additional cleansing or changes need to be made, semi-automated or manual routines can be executed to update the module MDM2.

If no additional cleansing or changes to the data need to be made, then names are categorized 330. In one implementation, names are categorized using a language analysis software, such as Name Inspector™ from Language Analysis Systems ("LAS"), now owned by IBM. In one implementation, each name data entry in the module MDM2 is categorized as either a personal name, an organization name or an ambiguous name so that the correct cleansing engine will be utilized. The category identified for each name can be saved.

Next, a name classification report is generated 332. This step combines the results of the categorization 330 step with a classification process to determine whether a name is a personal name or a company name. In one implementation, the classification report assigns a score to represent how likely it is that the classification is correct. An example of a classification report is shown in FIG. 4I. The first column of the illustrated report indicates the determination made by the external name recognition system (e.g., LAS software). The second column of the illustrated report indicates the determination made by the internal name recognition system. The third column, entitled "# Org Words" includes information that is relevant only if one and only one of the classification systems classifies the name as an organization's name. In that case, the system considers whether the classification was based on a single word match, or multiple word matches. The fourth column provides suggestions as to how each name should be classified.

The fourth row of data in the illustrated classification report indicates that the external system classified a particular name as belonging to a person, whereas the internal system determined that the name belonged to an organization. In order to resolve the apparent discrepancy, the system considers (in column 3) how many word matches the organization determination was based on. In the particular example shown, the organization classification was based on more than one word match. Therefore, the system suggests that the name belongs to an organization.

The fifth row of data shows a similar set of circumstances, except that the organization classification is based only on a single word match (i.e., not multiple words). In that instance, the suggestion provided in the far left column is for a user to review the data and make an appropriate determination. Additionally, a high, medium or low probability can be provided that the name is an organization's name. A high probability suggests that a less careful review is required, while a low probability might suggest that a more thorough review is in order. After reviewing the classification report, a user can determine 334 the appropriate classification for each name. Next, the illustrated method includes updating 336 the appropriate name type fields for the MDM2 module. That process can be automated.

A determination 338 then is made as to whether names are personal names. If a name is a personal name, then the process includes a personal name cleanse 340. If the name is an organization's name, then the process includes an organization name cleanse 342. The personal name cleanse 340 involves parsing and standardizing personal names using, for example, Firstlogic software. Certain words such as titles (e.g., "Dr.," "Mrs.", "Mr.") can be removed. A list of those words is maintained by the system. Similarly, in an organization name cleanse 342, certain words can be removed, such as "Corp.," and "Inc." Those words also can be stored by the system. The MDM2 module is then updated 344 accordingly and an ETL process 346 is conducted from the MDM2 module to another matching data module (MDM3) 348. The ETL process 346 compresses the data so that there is a single record (rather than multiple records) for each particular entity name.

Next, as shown in FIG. 3B, a user can select 350 one or more matching processes to apply to the data in the MDM3 module. In the illustrated implementation, the available matching processes are based on software packages from Firstlogic, LAS and a third software package. If the user selects Firstlogic software to perform matching, the user configures 352 matching scenarios. For example, the user might specify that the Firstlogic software package should only identify matches if they have a specified minimum degree of similarity. The degree of similarity can be based on objective criteria. The Firstlogic software then performs data matching 354. The Firstlogic software is particularly well adapted to perform name and address matching. Subsequently, an ETL process 356 is implemented to load the matched data into a matching data module (MDM4) 358.

If the user selects 350 the LAS software to perform the matching, the LAS software name processing is initiated 360.

Subsequently, the ETL process 356 is implemented to load the matched data into the MDM4 module 358.

If the user selects another software program to perform data matching, the user configures 362 matching scenarios. Then, data matching 364 is performed by the third software program. In some implementations, the alternative software program has customized software features to enhance the overall matching capabilities of the system. Such features will depend on the particular needs of the system and can be tailored accordingly. In some implementations, the alternative software program is adapted to identify matches based on tax identification numbers, government identification numbers, hire dates, termination dates, birth dates, globally unique identifiers (GUIDS), email addresses, data universal numbering system (DUNS) numbers, account numbers and phone numbers. Subsequently, the ETL process 356 is implemented to load data into the MDM4 module 358.

After the data has been loaded into the MDM4 module 358, that data is checked 366 for errors. In one implementation, the matched data is checked by a user to make sure the matches make sense. For example, if one or more of the matching processes indicated that "AB Ltd." matches "XY Ltd." by virtue of both names including "Ltd.," a user might want to discard that match, since inclusion of "Ltd." in both names probably does not mean those organizations are related to each other. If errors, such as the type identified above, are identified, then the user may prompt the system to return 368 to the MDM1 module, the MDM2 module or the MDM3 module to correct the issue(s) that allowed such an error to occur.

The next step in the illustrated implementation is executing 370 a clustering program. The clustering process facilitates identifying non-obvious relationships among entities that may otherwise be overlooked by only reviewing individual matched pairs. The clustering process can create links among parties (i.e., records) across property types. In some implementations, the clustering process can be customizable by an end user. For example, an end user can instruct the clustering program to cluster records based only on certain types of properties or characteristics, such as names, addresses and telephone numbers only. Furthermore, the clustering program can be customized to identify non-obvious relationships across two or more types of entities (e.g., vendors linked to customers by telephone number) or within the same entity type (e.g., vendors linked to other vendors by telephone number). An ETL process 372 then is used to load data regarding clustering and other data into a matching data module (MDM5) 374.

After the data has been loaded into the MDM5 module 374, the data is checked 376 by a user for errors. If errors are identified, then the user may prompt the system to return 378 one of the modules MDM1, MDM2, MDM3 or MDM4 to correct the issue(s) that allowed such an error to occur. If no errors are found, the process ends 380 and reports can be prepared based on the data stored in the MDM5 module and other data such as the transaction and accounting information stored in the common data model 302.

Figure 5:
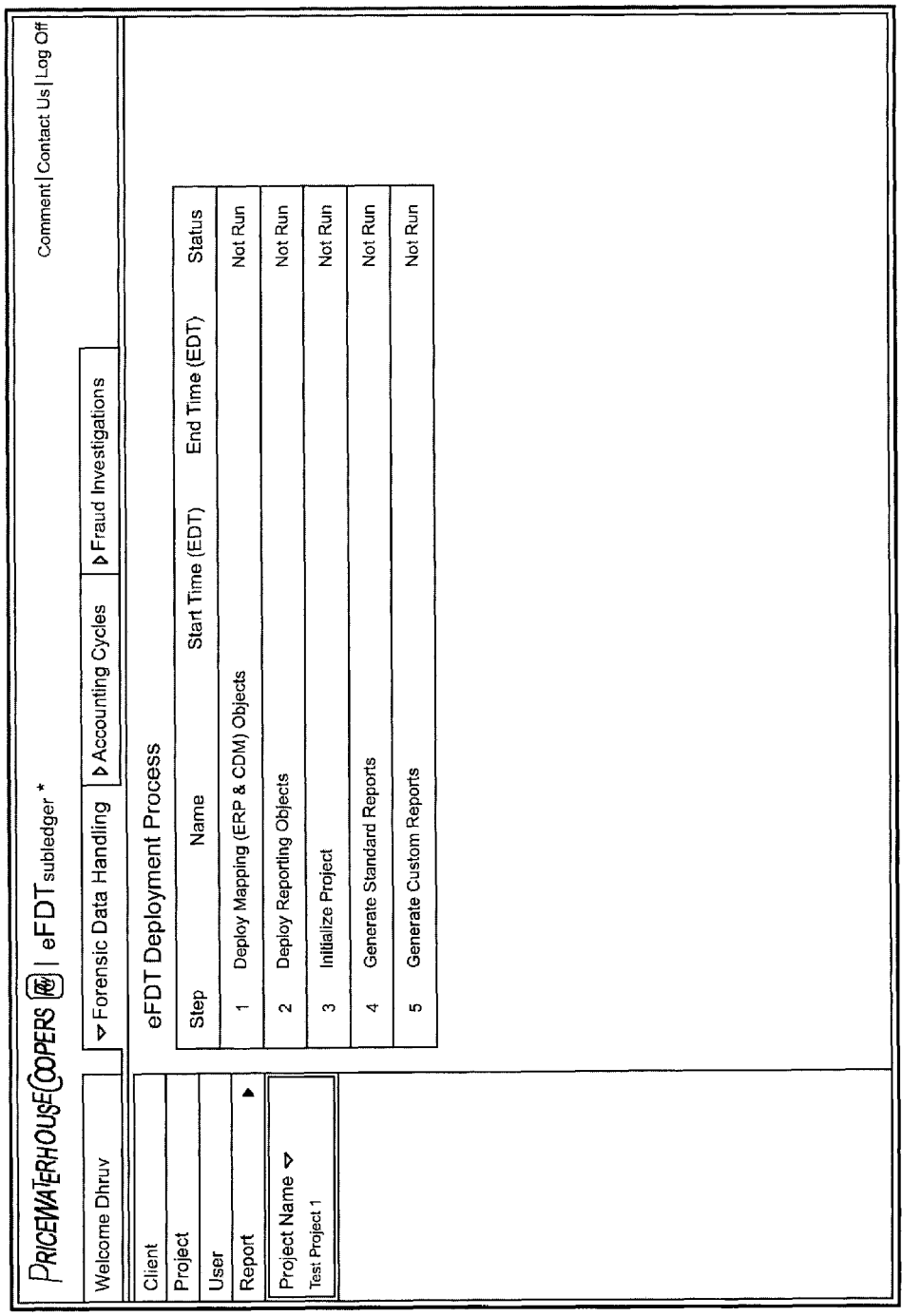

FIG. 5 shows a particular implementation of a screenshot that provides a user an overview of the processes disclosed herein. The screenshot breaks the processes down into five steps—"deploy mapping objects," "deploy reporting objects," "initialize project," "generate standard reports" and "generate custom reports." Columns are provided to indicate start times and end times of each step. In the illustrated implementation, no start times or end times are indicated. A status column also is provided. The status column might indicate, for example, that a status associated with a particular step is "not run," "being run" or "completed." Other status information can be provided as well.

From the illustrated screenshot, a user can select any of the links provided in the "name" column. If a user selects the "deploy mapping (ERP & CDM) objects" link, the system loads the code required to load data from a company's ERP system(s) to a local database. In certain implementations, once the system loads the code, the system enables a user to access the code and customize it so as to interface with particular types of ERP systems.

If a user selects the "deploy reporting objects" link, the system executes a process that creates the programs and data structures necessary to run the standard analysis reports in a particular instance of the system.

If a user selects the "initialize project" link, the system executes a process that populates a staging table with appropriate data. Using a staging table can quicken the generation of reports.

If a user selects the "generate standard reports" link, in one implementation, the system presents a screenshot that provides the user a choice of standard reports that are available, from which the user might select only those that are actually desired. A portion of such a screenshot is shown in FIG. 6.

Figure 6:

FIG. 6 includes a list of standard reports that can be generated that are related to accounts payable information. "Yes" and "no" buttons are provided adjacent each entry on that list. In the illustrated implementation, the only list entry that includes a "yes" is the "check number gaps" entry. If a user advances the process, only a "check number gaps" report will be generated, which might identify gaps in check numbers for a particular account.

Referring again to FIG. 5, if a user selects the "generate custom report" link, in one implementation, the system presents a screenshot that enables a user to select the type of custom report the user wants to generate. An example of such a screenshot is shown in FIG. 7.

The screenshot of FIG. 7 includes lists of custom reports related to categories: accounts payable, payroll and revenue. Each category includes one or more custom reports that are available to be generated. "Yes" and "no" buttons are provided adjacent each custom report entry. In illustrated implementation, the only list entry that includes a "no" is the "unusual customer trends (Based on Sales and Return Amounts)" entry. If a user advances the process with the illustrated selections, reports for every other indicated custom report will be generated.

Figure 8A:
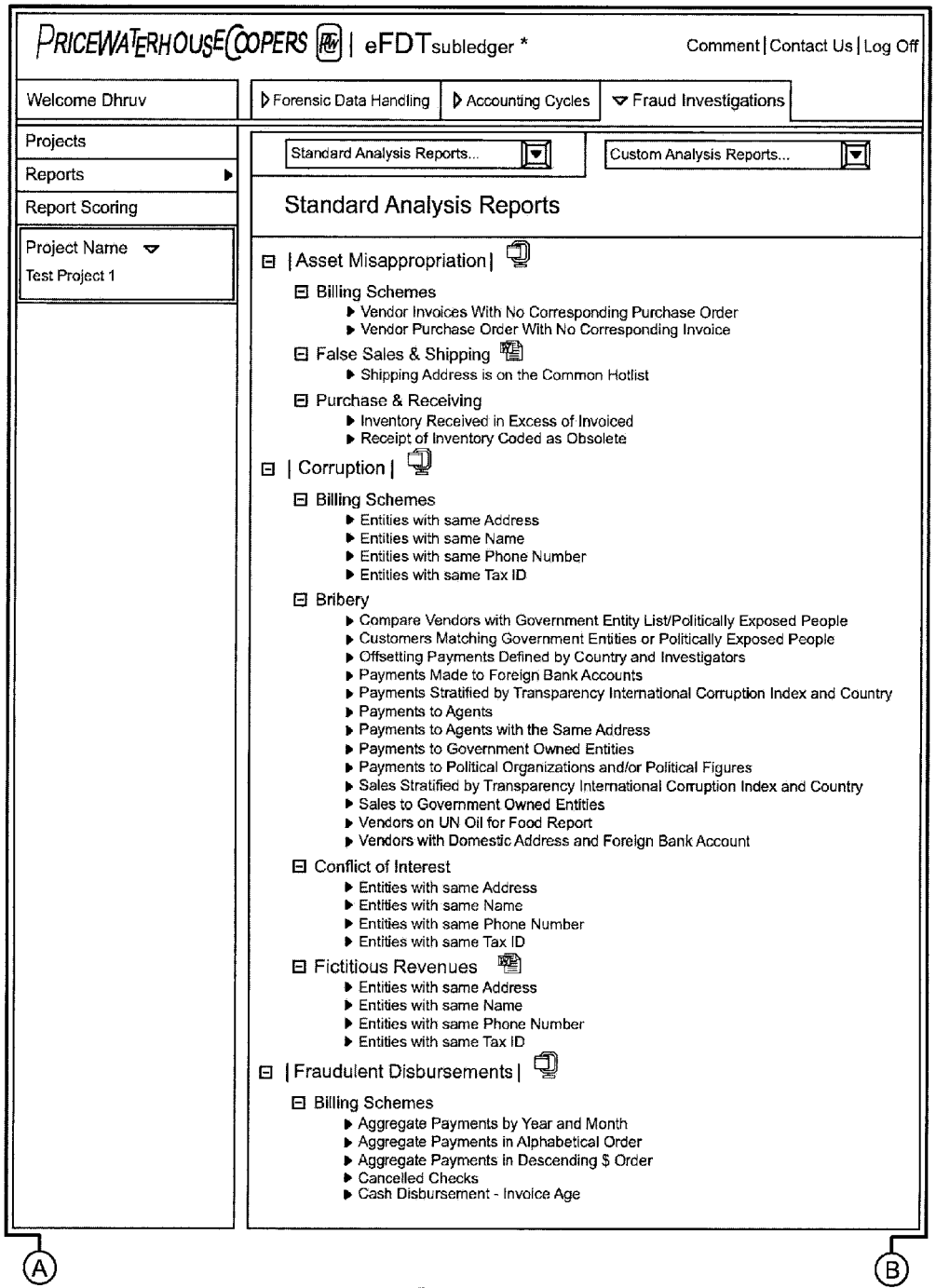
Figure 8B:
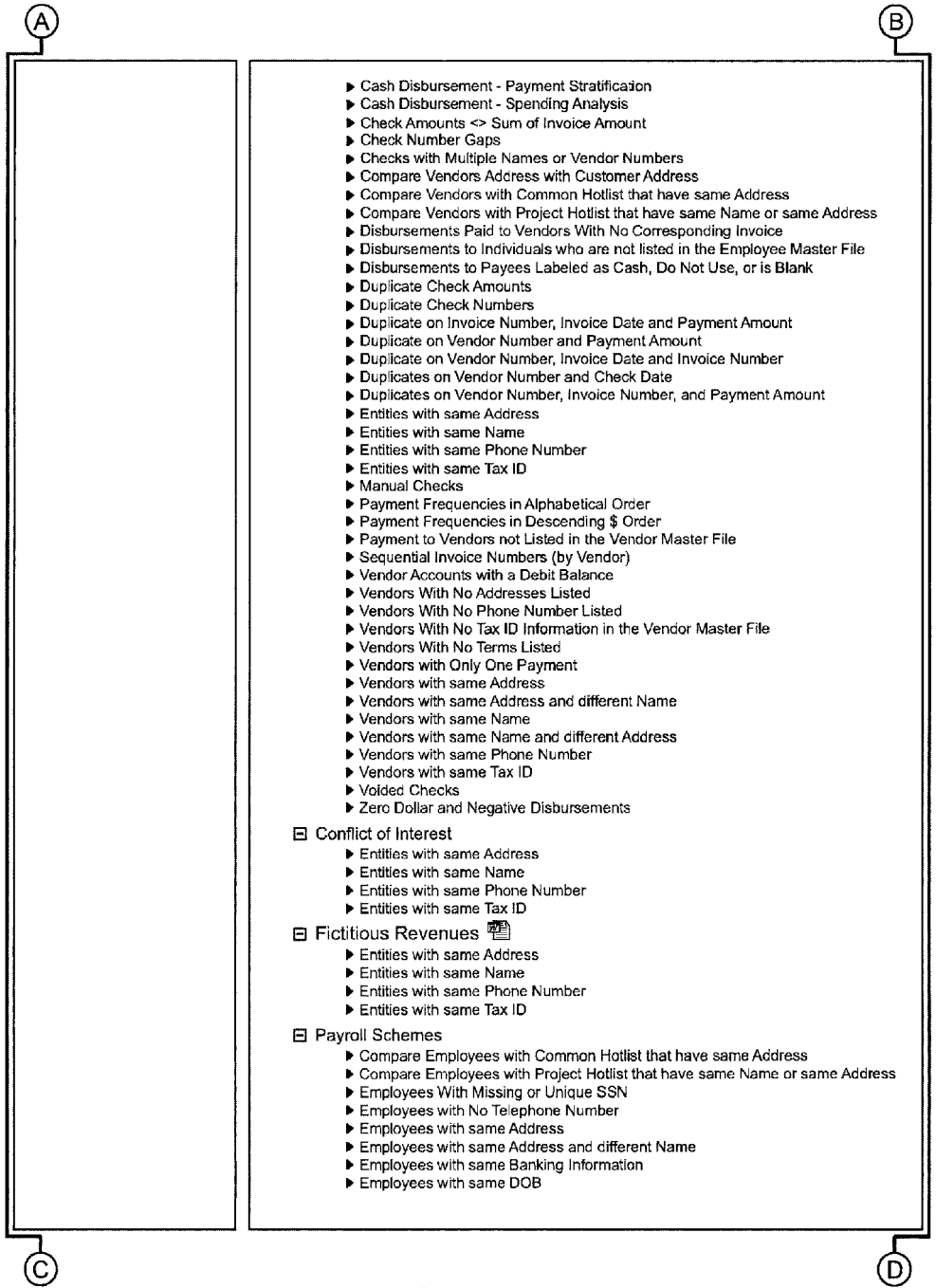
Figure 8C:
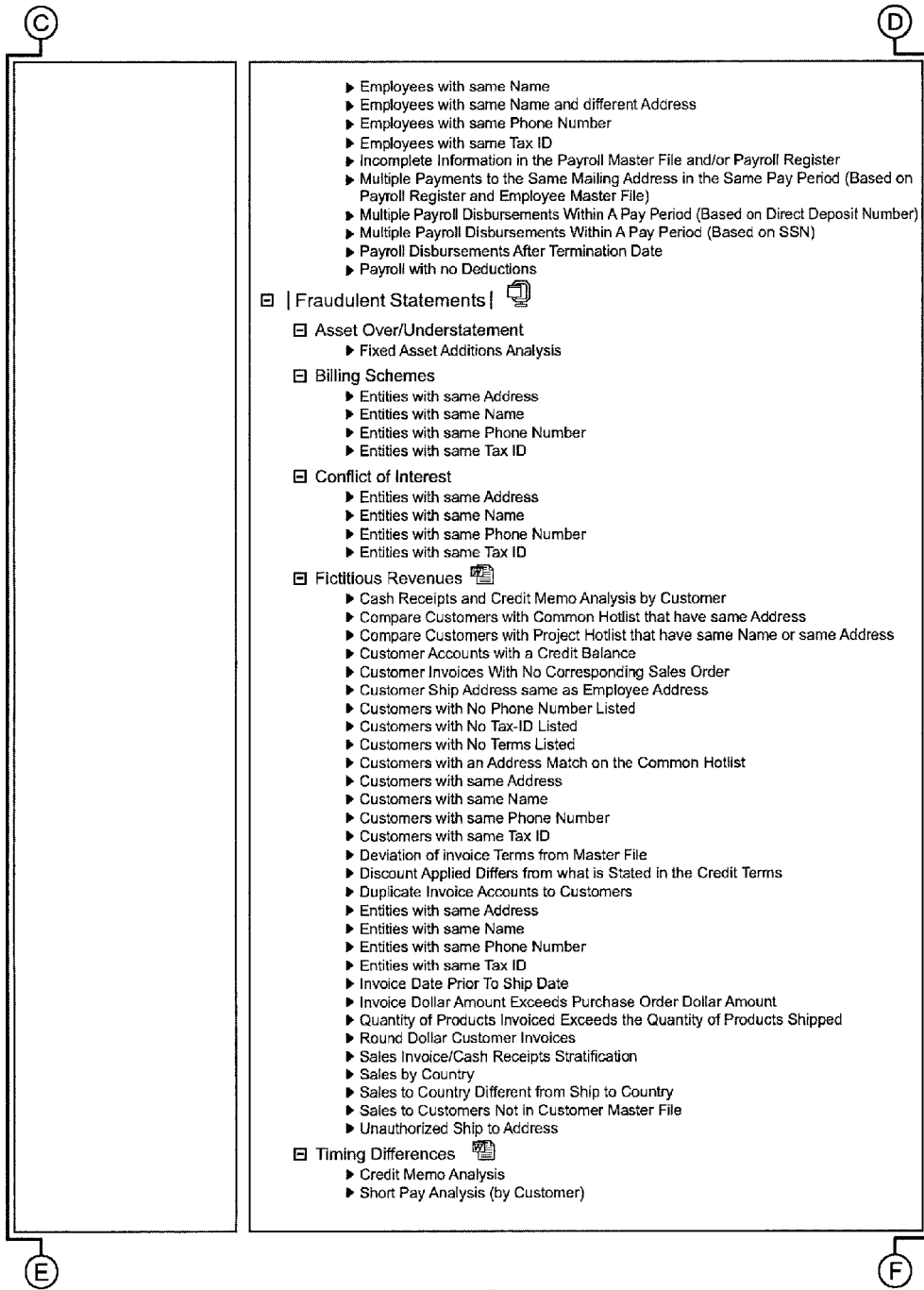
Figure 8D:
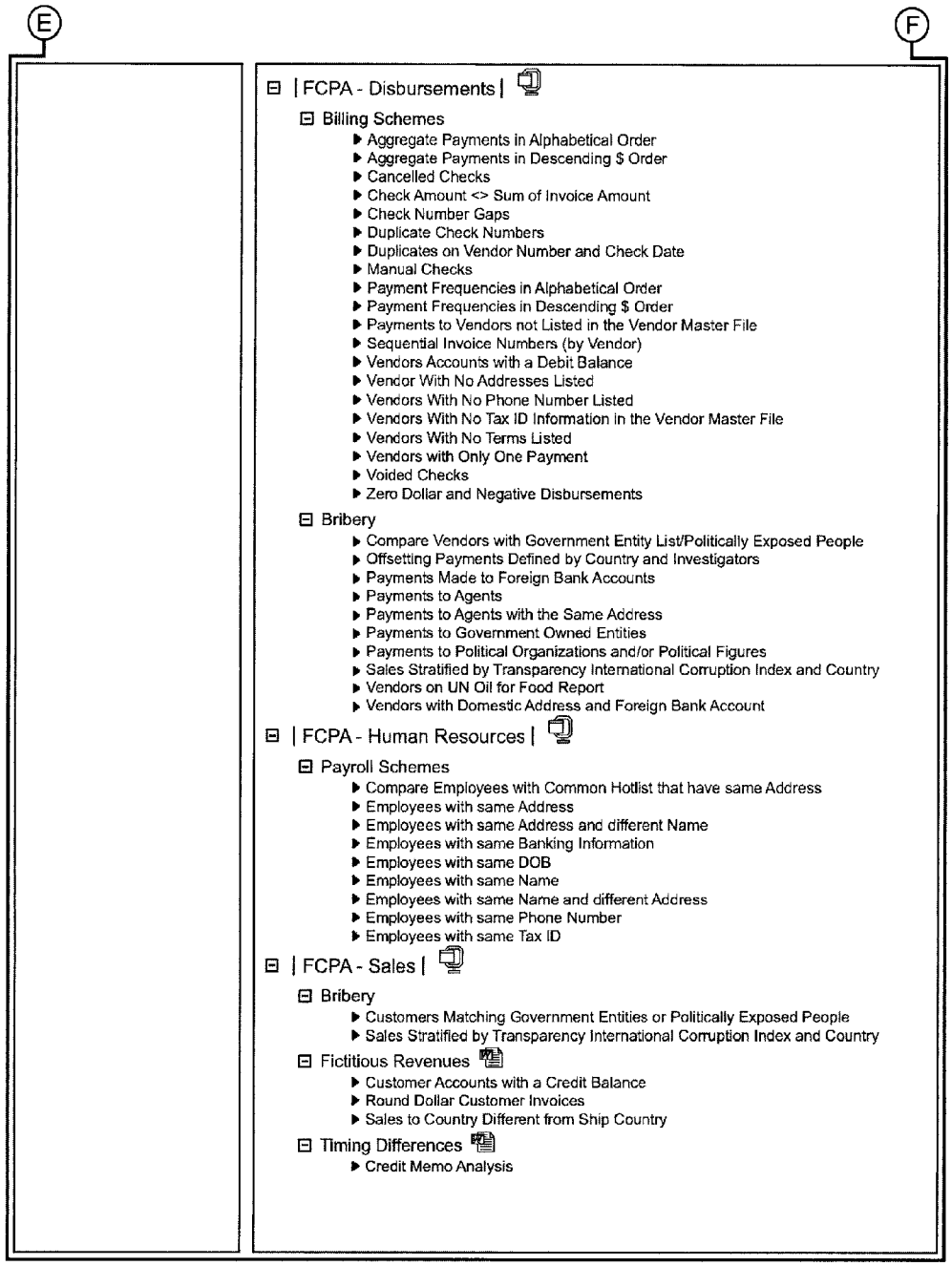

Once the system has generated reports, those reports can be accessed through one or more screens. For example, the screenshots of FIGS. 8A-8E show a listing of standard analysis reports that are available for viewing according to a particular implementation. The illustrated list is organized categorically to facilitate locating reports that are relevant to a user's particular concerns. For example, one list entry (see FIG. 8B) is "fraudulent disbursements." Under that heading, the listing "billing schemes" appears. According to the illustrated implementation, billing schemes is considered to be a category of fraudulent disbursements. Referring now to FIG. 8C, a subheading underneath "billing schemes" is "vendors with no addresses listed." "Vendors with no addresses listed" is treated, according to the illustrated list, as suspect parties with respect to potentially fraudulent billing schemes.

Each entry in the illustrated list that has a sideways arrow to its left is a link to a report that includes that title. Some of those reports are dependent on the matching and clustering process discussed earlier (see FIGS. 3A and 3B). For example, the report entitled "entities with same name" (see FIG. 8A) is dependent on the matching and clustering process. Other reports provide accounting information that is independent of the matching and clustering process. For example, the report entitled "aggregate payments in alphabetical order" (see FIG. 8B) is not dependent on the matching and clustering process.

A Microsoft® Word® icon appears adjacent certain of the entries. If a user selects one of those icons, a Word® document is presented to the user to explain the significance of the reports that are associated with the associated entry. For example, such an icon is provided adjacent to the "false sales and shipping" icon. If a user selects that icon, the system provides a Word® document that provides an overview of the concerns related to the topic of false sales and shipping. In some implementations, the document provides a detailed descriptions of all available reports associated with a given topic and an explanation of how to use those reports in an efficient manner. In certain implementations, the system can be used as an educational tool by its users or to manage the workflow steps for using the reports. For instance, the system can be linked to or interact with other sources of information such as manual specifications, which give the fraud detection tool a sense of "workflow."

Some implementations generate different reports than the reports that are shown in the illustrated screen shots. The accounting data in the reports is obtained from the CDM database.

FIGS. 9A-9F show exemplary reports that are generated by the system and that can be accessed through the screenshots of FIGS. 8A-8E.

FIG. 9A shows a report that identifies possible duplicate vendor disbursements that have matching invoice numbers, invoice dates and payment amounts. The report includes a first column of vendor numbers and a second column of corresponding vendor names. The report might be used, for example, to help identify check tampering. A user might access this report by selecting the "duplicate on invoice number, invoice date and payment amount" link on FIG. 8B.

FIG. 9B shows a report that identifies vendors with no addresses listed. The report includes a first column with a vendor number and a second column with corresponding vendor names. A user might access this report by selecting the "vendors with no addresses listed" link on FIG. 8C.

FIG. 9C shows a report that identifies vendors with no terms listed. The report includes a first column with vendor numbers and a second column with corresponding vendor names. A user might access this report by selecting the "vendors with no terms listed" link shown in the screenshot of FIG. 8C.

FIG. 9D shows a report that provides a list of zero dollar and negative vendor payments and their respective information. This analysis might provide insight into atypical transactions that warrant further inquiry and the possible billing schemes that could result from such payments. A user might access this report by selecting the "zero dollar and negative disbursements" link in FIG. 8C.

FIG. 9E shows a report that provides a list of vendors that have only one payment made on the check register file. A user might access this report by selecting the "vendors with only one payment" link in FIG. 8C.

Figure 10:

FIG. 10 is a screenshot that includes a list of custom analysis reports that have been generated. The custom reports that are listed on the illustrated list typically include functionality that enables a user to manipulate the data being presented. For example, a custom report can include functionality that enables a user to drill down for additional details related to a particular analysis. Additionally, a custom report can include functionality that enables a user to specify search parameters, such as ranges of data values to be considered. Each entry in the illustrated list that has a sideways arrow to its left is a link to a report that includes that title. Some of those reports are dependent on the matching and clustering process. Other reports provide accounting information that is independent of the matching and clustering process.

In some implementations, the list of custom reports also can include a Microsoft® Word® icon adjacent certain of the entries. If a user selects one of those icons, a Word® document is presented to the user to explain the significance of the analysis associated with corresponding entry. In some implementations, the Word® document provides an overview of the concerns related to the associated topic and detailed descriptions of all available reports associated with a given topic and an explanation of how to use those reports in an efficient manner.

Some implementations generate custom reports different from the custom reports that are shown in the illustrated screen shots.

Figure 11:
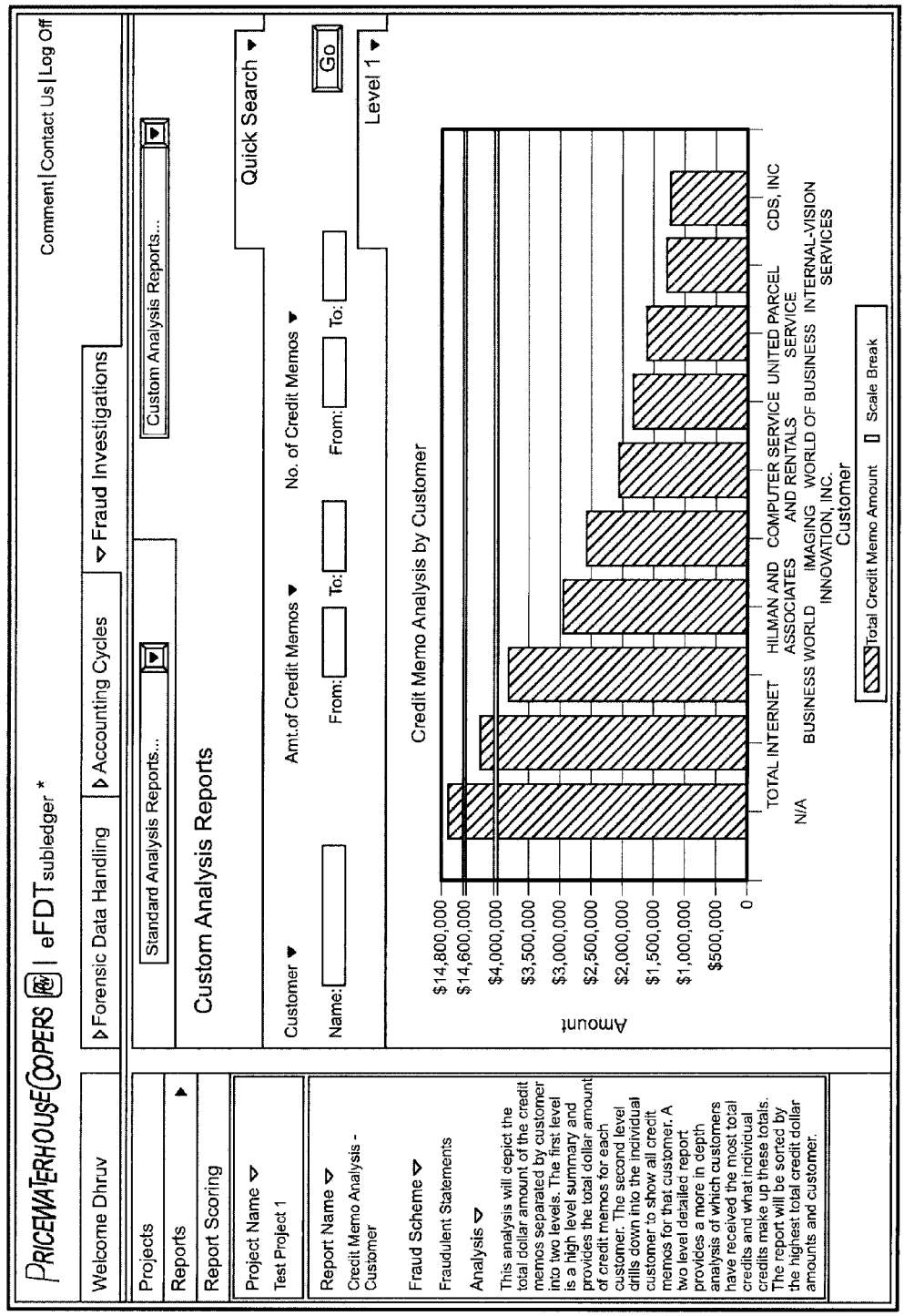

FIG. 11 is an example of a custom report. In particular, the illustrated custom report is a first level of a credit memo analysis that includes a bar graph depicting the total dollar amount of credit memos for each customer. Three search boxes enable a user to customize the bar graph to show particular data only. Those search boxes are entitled "customer," "amt. of credit memos" and "no. of credit memos." If, for example, the user specifies that the "amt. of credit memos" should range from $3,000,000 to $15,000,000, then the system generates a new bar graph that includes only three bars, one bar for "N/A," one bar for "Total Internet" and one bar for "Business World." All other bars will be deleted from the graph. That is because only the bars that are associated with "N/A," "Total Internet" and "Business World" represent credit amounts that fall within the specified range of $3,000,000 to $15,000,000.

The illustrated custom report also includes functionality that enables a user to drill down to a second, more detailed level of credit memo analysis information. That second level shows all credit memos for a particular customer. In one implementation, a user can access that second level by clicking on one of the bars in the bar graph of FIG. 11. As an example, if a user clicks on the bar associated with the customer "Computer Service and Rentals," in one implementation, the system presents a screen with similar information as is shown in FIG. 12.

Figure 12:
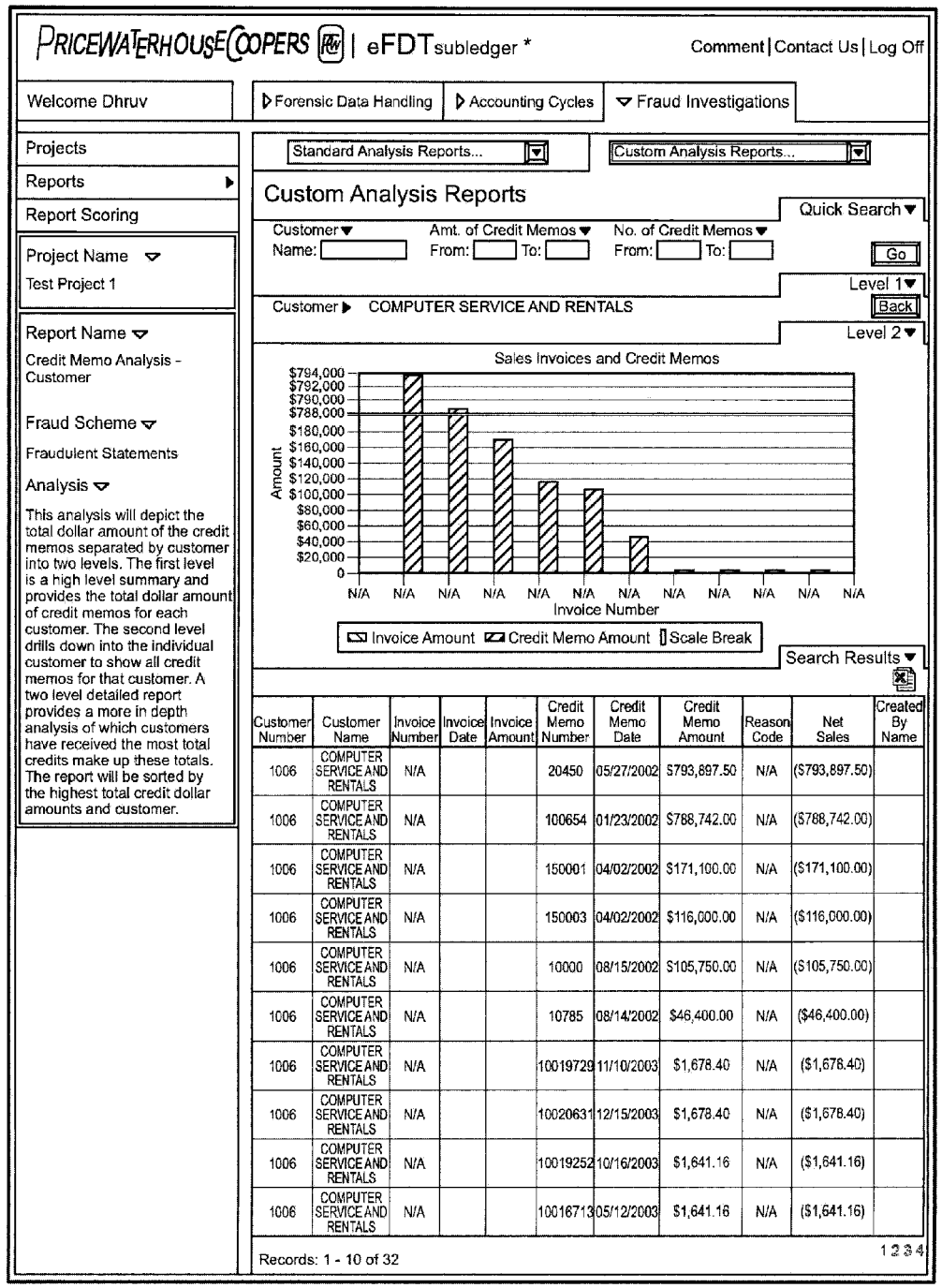

FIG. 12 includes a bar graph and a table, each of which includes related data. The bar graph's x-axis is invoice numbers and the bar graph's y-axis is amounts. Each bar is associated with a particular invoice number. Although each invoice number is identified as "N/A," typically, each invoice number would be unique. The screenshot of FIG. 12 also includes three search boxes that enables a customer to selectively manipulate the data being presented in the bar graph and the table so as to readily arrive at the most relevant data presented.

The screenshot of FIG. 12 includes a Microsoft® Excel® icon at the right side of the screen about mid-page. If a user selects that icon, the system exports the data from the illustrated table to an excel spreadsheet.

FIGS. 13-37 are screenshots that include examples of custom reports that, according to one implementation, can be generated by the system. In certain implementations, one or more of the illustrated custom reports features drill down capabilities to access additional details about the information represented by those reports. In some cases, the user can drill down through multiple levels (e.g., three or more) to obtain increasingly detailed information about selected transactions or entities. In certain implementations, one or more of the illustrated custom reports includes functionality that enables a user to export data to external programs, such as Microsoft® Excel®.

Figure 13:
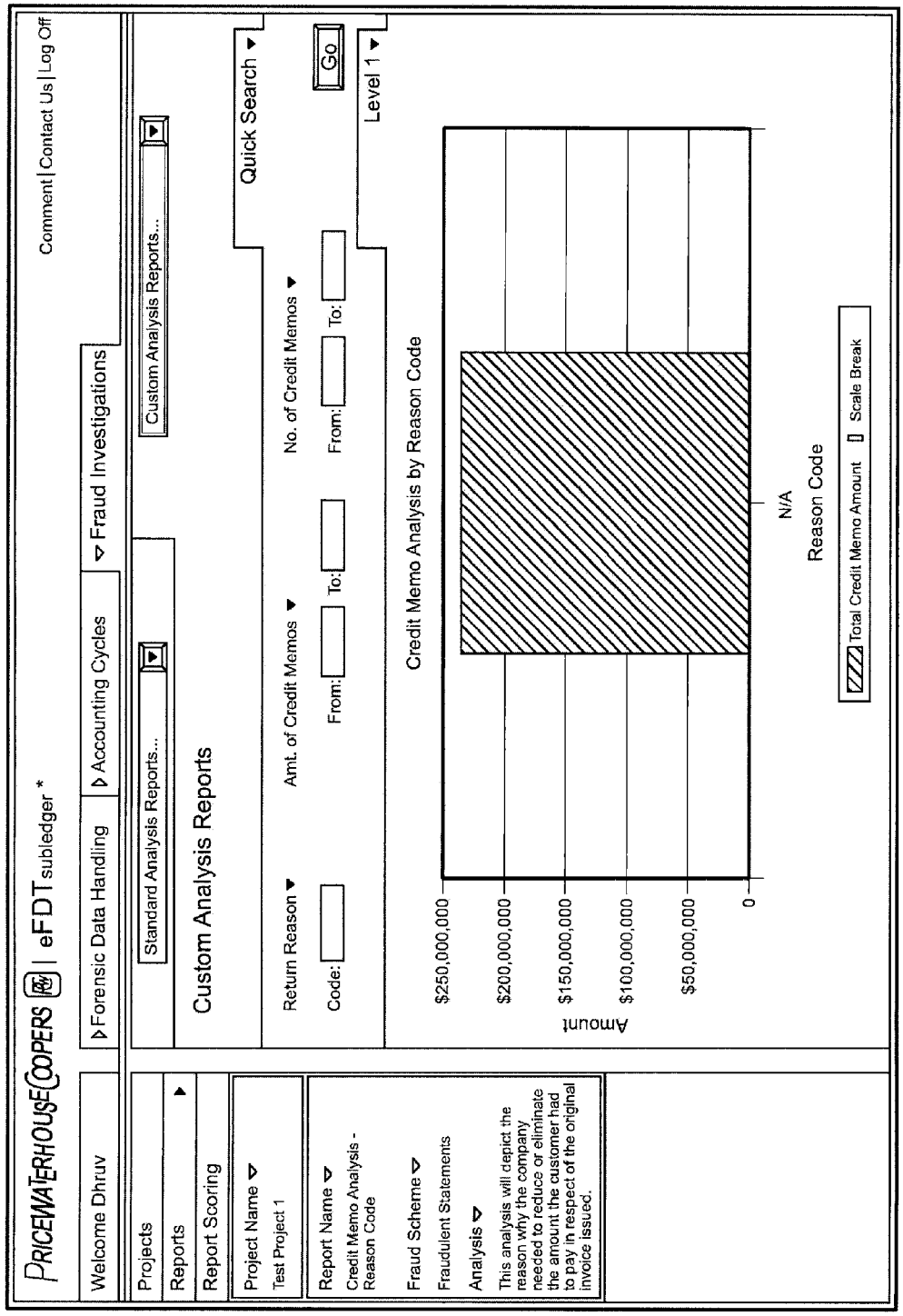

FIG. 13 illustrates a custom report that includes a bar graph providing a credit memo analysis by reason code. That analysis might identify the reason why a company needed to reduce or eliminate the amount the customer had to pay with respect of the original issued invoice. The illustrated custom report includes functionality that enables a user to manipulate the bar graph and table to show only data associated with a particular return reason, to show only data that relates to credit memos in a specified amount range, or to show only data related to customers having a specified number of credit memos.

Figure 14:
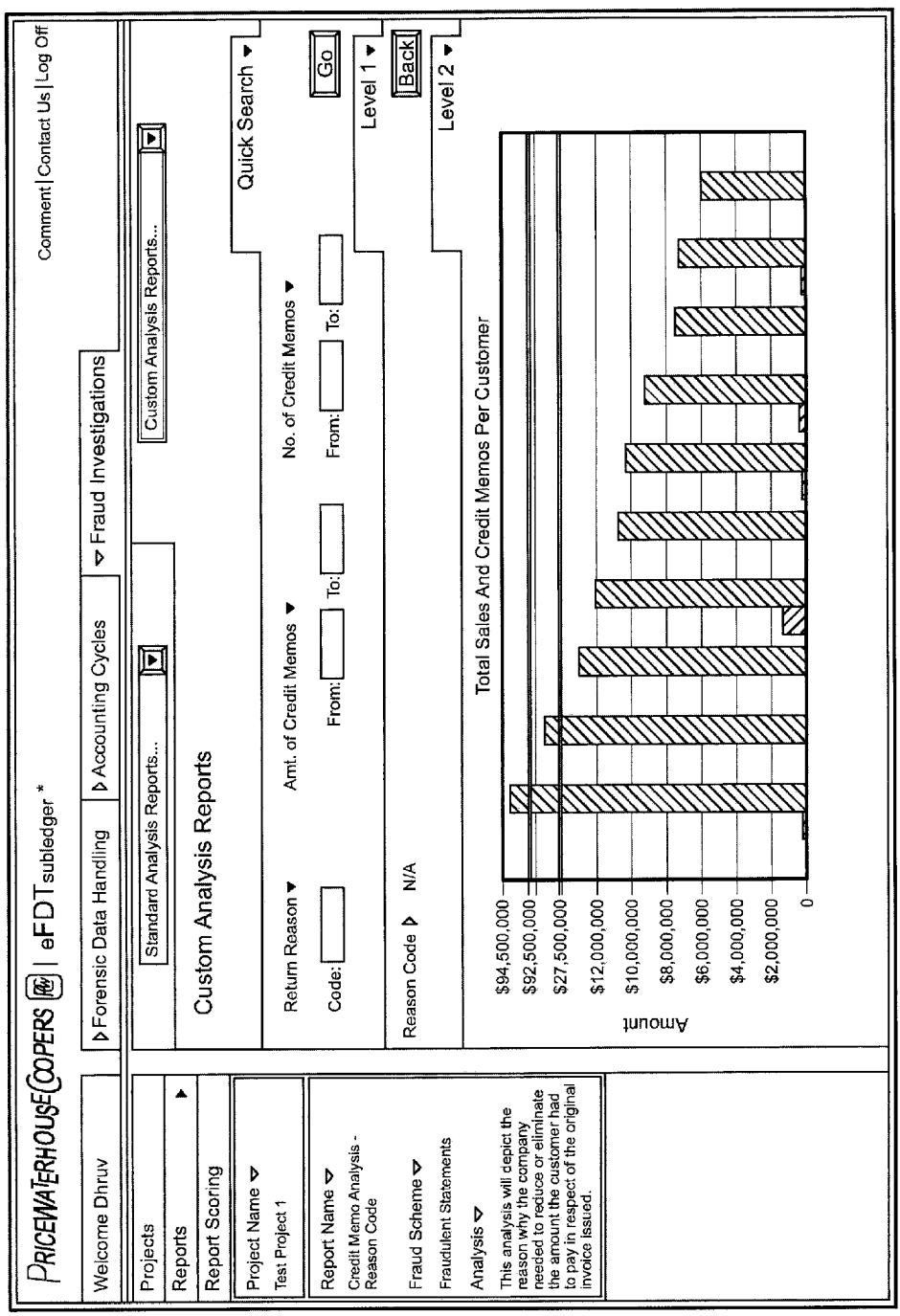

FIG. 14 illustrates a custom report that includes a bar graph providing an indication of total sales and credit memos per customer. In the illustrated bar graph, the x-axis identifies customers and the y-axis identifies amounts. Certain customers have two bars associated with them. In those cases, one bar corresponds to that customer's total sales and the other bar corresponds to that customer's credit memos. The illustrated custom report includes functionality that enables a user to manipulate the bar graph and table to show only data associated with a particular return reason, to show only data that relates to credit memos in a specified amount range, or to show only data related to customers having a specified number of credit memos.

Figure 15:
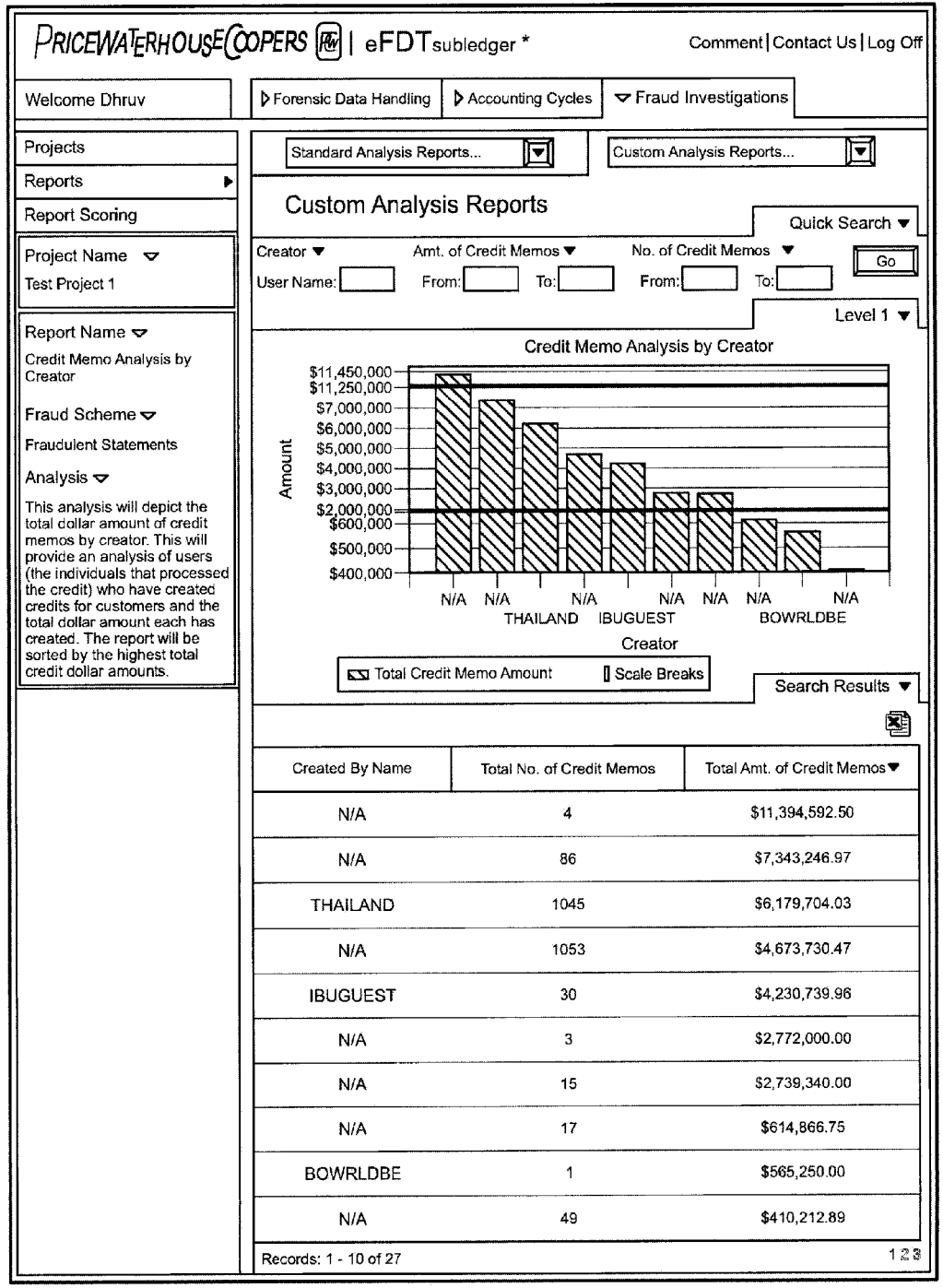

FIG. 15 illustrates a custom report that includes a bar graph and a table for analyzing credit memos by creator. In the illustrated bar graph, the x-axis identifies creators and the y-axis identifies amounts. The illustrated table also includes that information as well as indicating the total number of credit memos. Generally, the illustrated report provides an analysis of creators of credit for customers and the total dollar amount each has created. The illustrated custom report includes functionality that enables a user to manipulate the bar graph and table to show only data associated with a particular creator or creators, to show only data that relates to credit memos in a specified amount range, or to show only data related to customers having a specified number of credit memos. If a user, for example, selects the bar associated with Thailand, the system presents a screenshot that is similar to the screenshot of FIG. 16.

Figure 16:
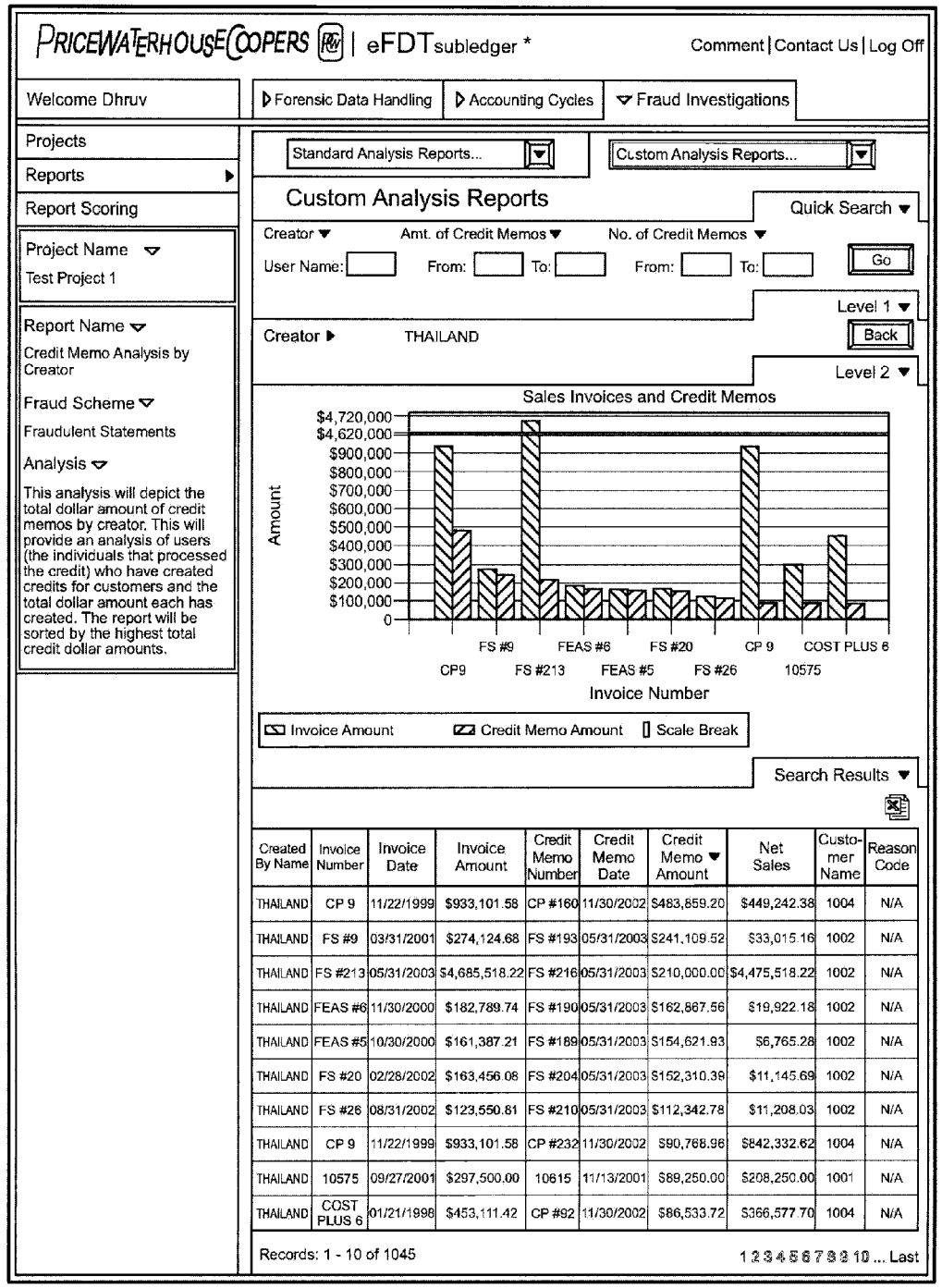

FIG. 16 illustrates a custom report that includes a bar graph and a table for analyzing sales invoices and credit memos for a particular creator, in this case, Thailand. In the illustrated bar graph, the x-axis identifies invoice numbers and the y-axis identifies amounts. Two bars are associated with each invoice number. One bar relates to invoice amount and the other bar relates to credit memo amount. The illustrated table identifies the creator's name, invoice number, invoice date, invoice amount, credit memo number, credit memo date, credit memo amount, net sales, customer name and reason code. Generally, the illustrated report provides an analysis of creators of credit for customers and the total dollar amount each has created. The illustrated custom report includes functionality that enables a user to manipulate the bar graph and table to show only data associated with a particular creator or creators, to show only data that relates to credit memos in a specified amount range, and/or to show only data related to customers having a specified number of credit memos.

Figure 17:
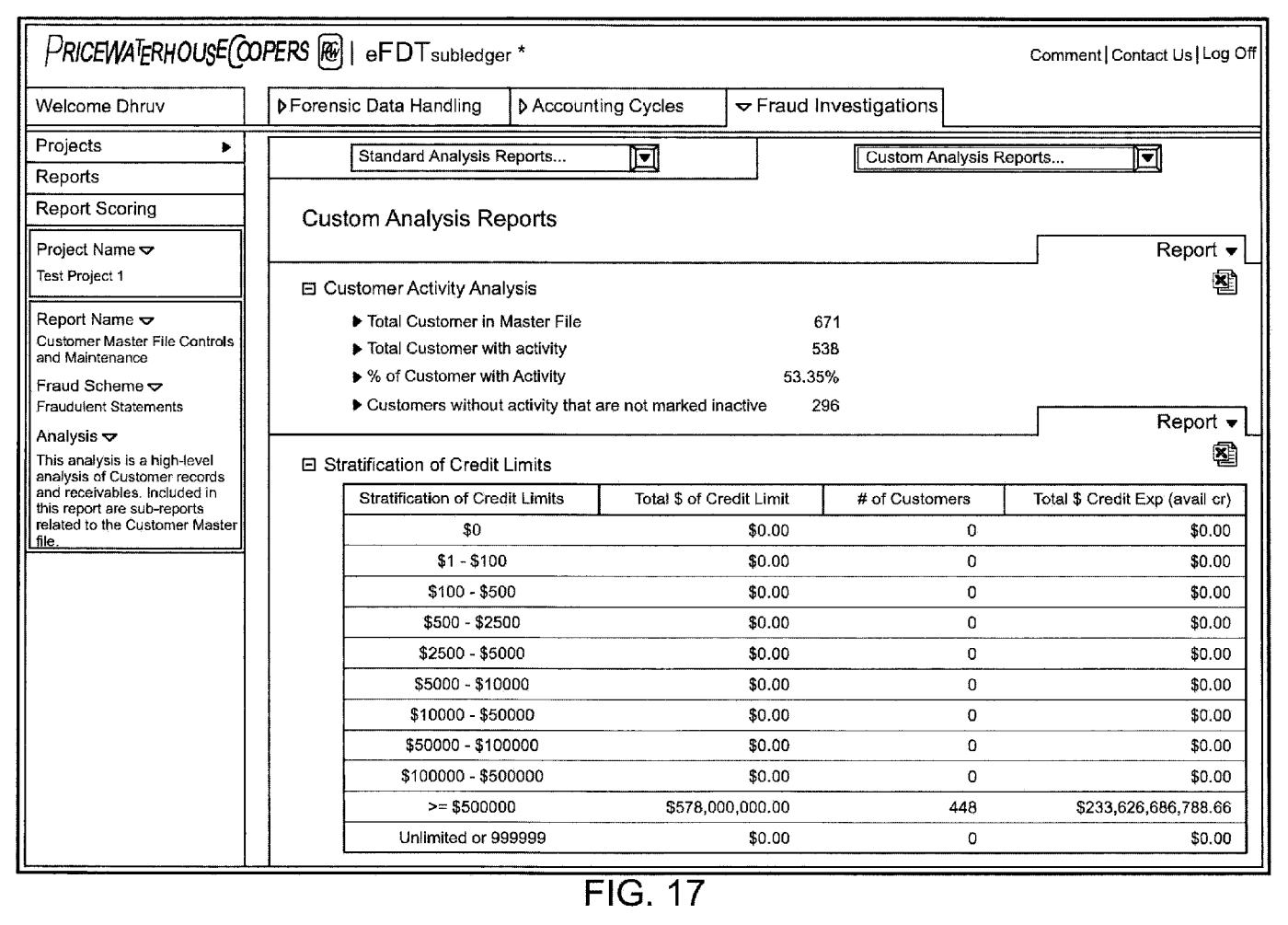

FIG. 17 illustrates a custom report that includes a customer activity analysis and a stratification of credit limits analysis that provide a high level analysis of customer records and receivables. The customer activity analysis indicates the total customers in the master file, the total customers with activity, the percentage of customers with activity and the customers without activity that are not marked inactive. The stratification of credit limits analysis is a table that includes a stratification of credit limits column, a total $ of credit limit column, a number of customers column and a total $ credit exp (available credit) column. In some implementations, drill down functionality is enabled in the illustrated report.

Figure 18:
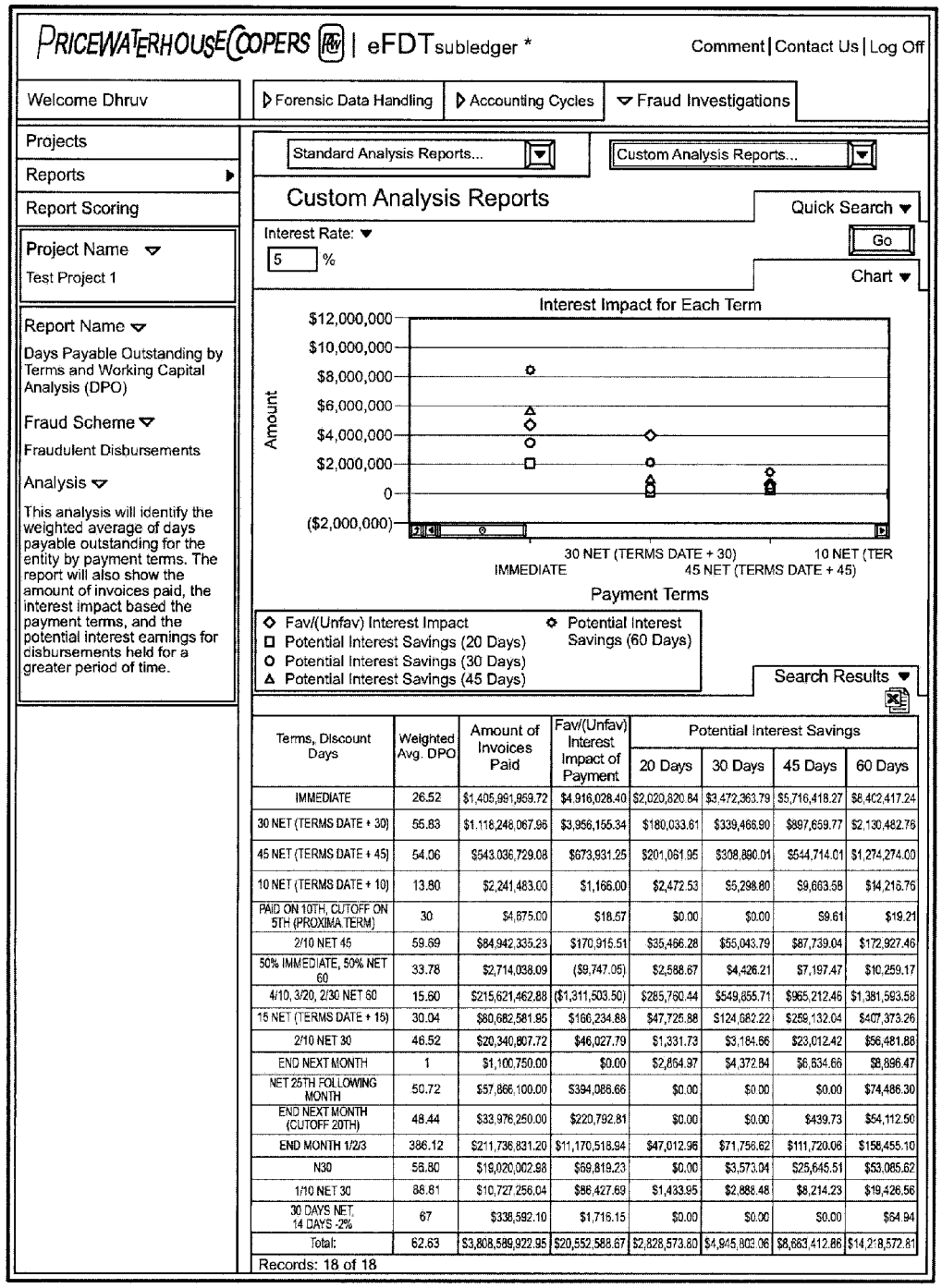

FIG. 18 is a custom analysis report that enables a user to determine the interest impact for each payment term. In particular, the analysis summarizes and identifies the weighted average of days payable outstanding ("DPO") contained in the accounts payable ("AP") sub-ledger for the company by payment terms. The report includes a graph and a table. The graph has an x-axis that indicates payment terms and a y-axis that indicates the amount. The graph also indicates the interest impact associated with each table entry by assigning an appropriate symbol to each entry. The table includes a terms, discount days column, a weighted average DPO column, an amount of invoices paid column, a favourable/(unfavourable) interest impact of payment column, and a group of columns indicating potential interest savings associated with various terms. In some implementations, drill down functionality is enabled in the illustrated report.

Figure 19:
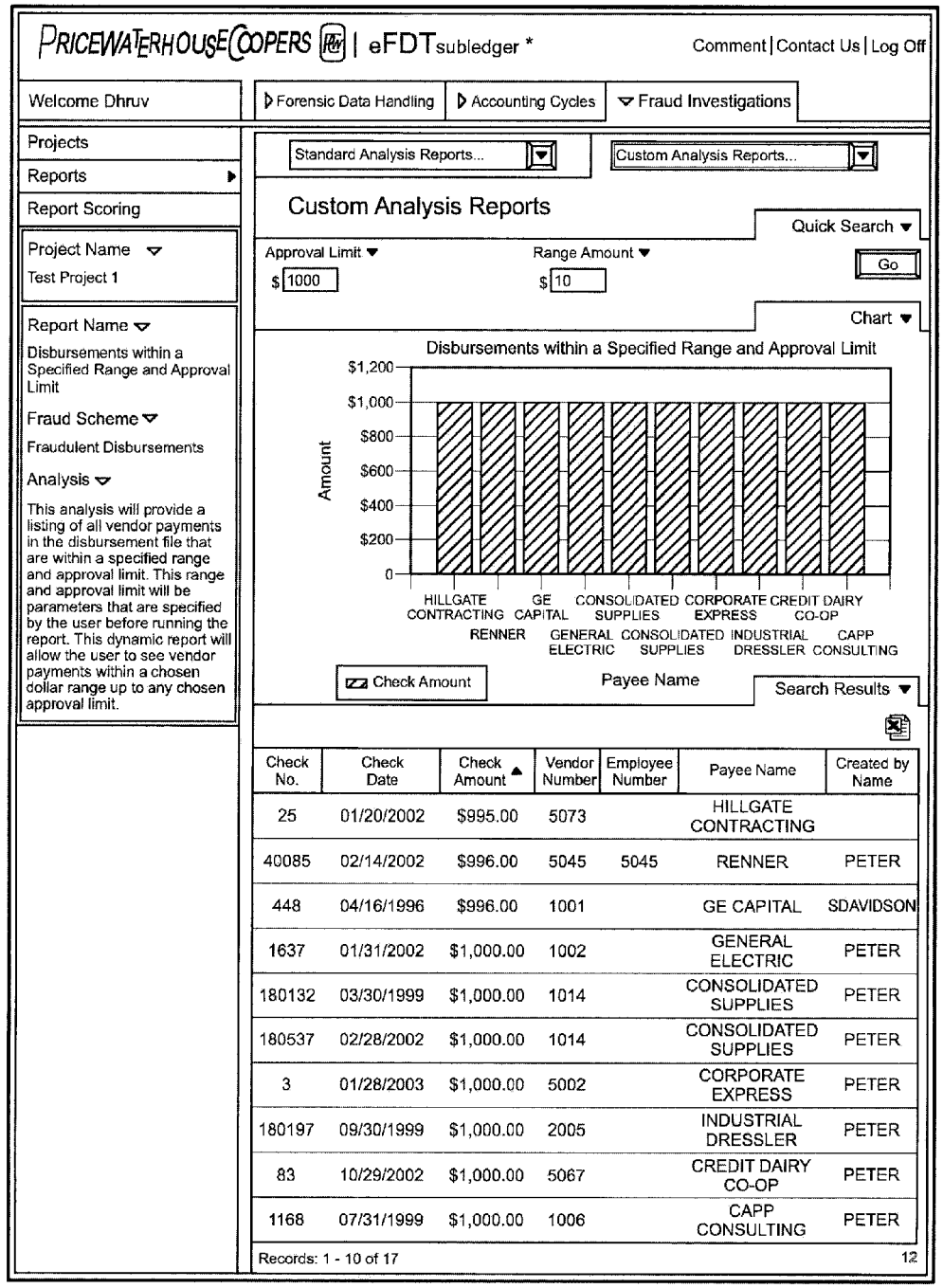

FIG. 19 is a custom analysis report directed to analyzing disbursements within a specified range and approval limit. In one implementation, the range and approval limit are specified by a user before generating the report. The range and approval limits can be modified using the boxes provided. The report includes a bar graph and a table. The x-axis of the bar graph indicates payee names and the y-axis indicates amounts. The table includes columns for check numbers, check dates, check amounts, vendor numbers, employee numbers, payee names and created by names. In some implementations, the illustrated report includes drill down capabilities.

Figure 20:
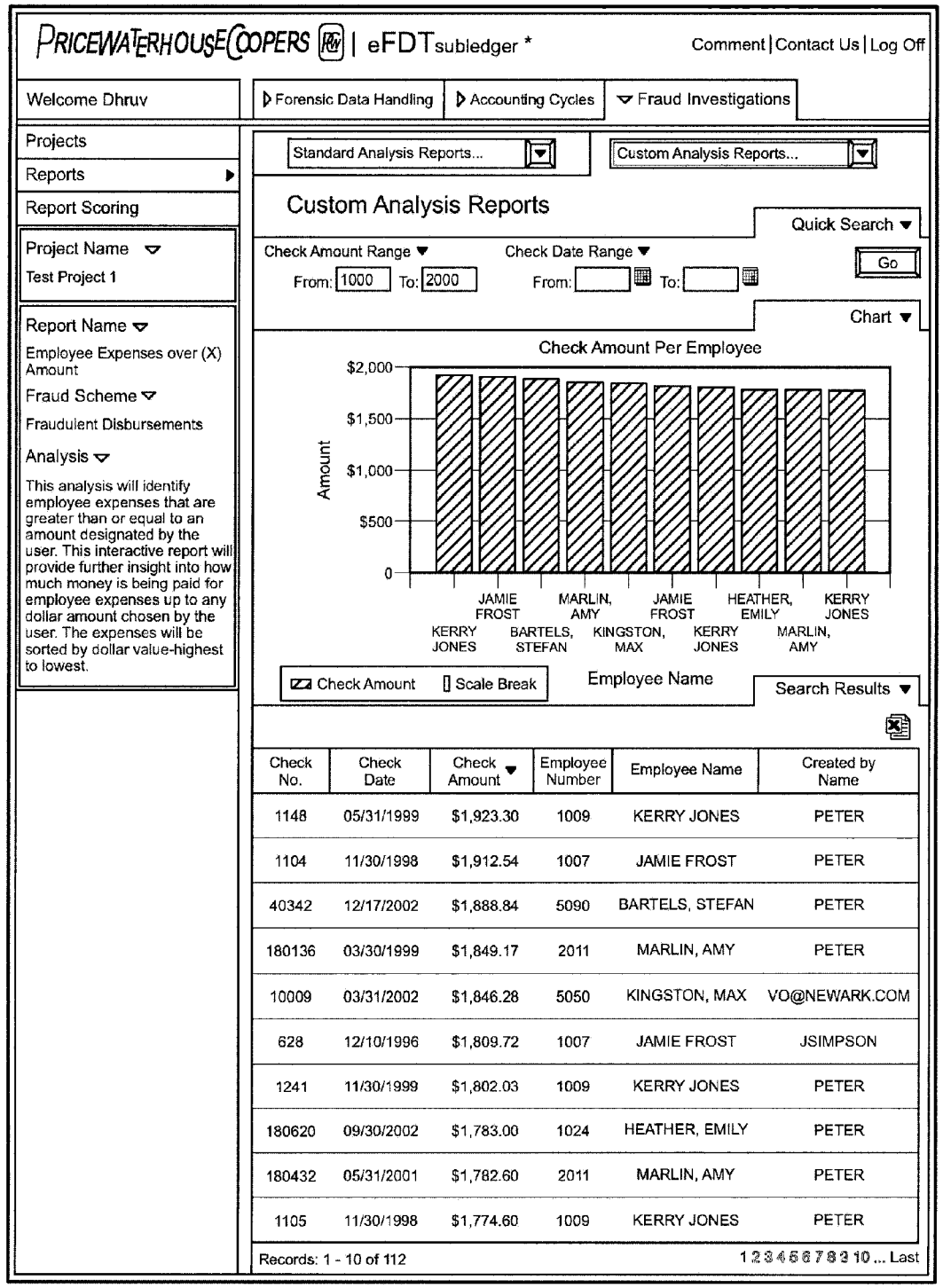

FIG. 20 is a custom analysis report directed to analyzing check amounts per employee. The report includes functionality that enables a user to specify a check amount range and a check date range to customize the report according to desired parameters. The report includes a bar graph and a table. The x-axis of the bar graph indicates employee names and the y-axis indicates amounts. The table includes columns for check numbers, check dates, check amounts, employee numbers, employee names and created by names. In some implementations, the illustrated report includes drill down capabilities.

Figure 21:
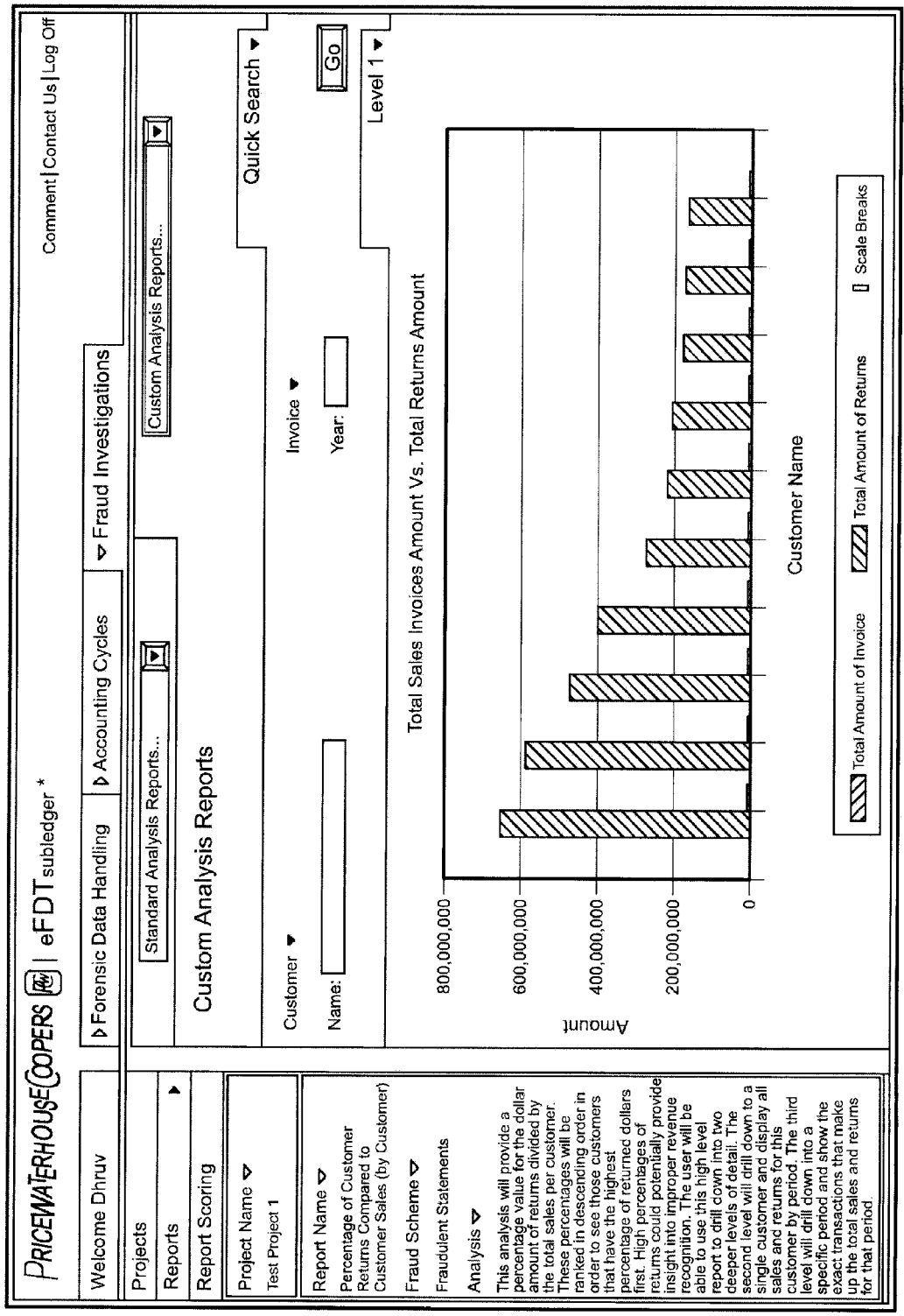
Figure 22:
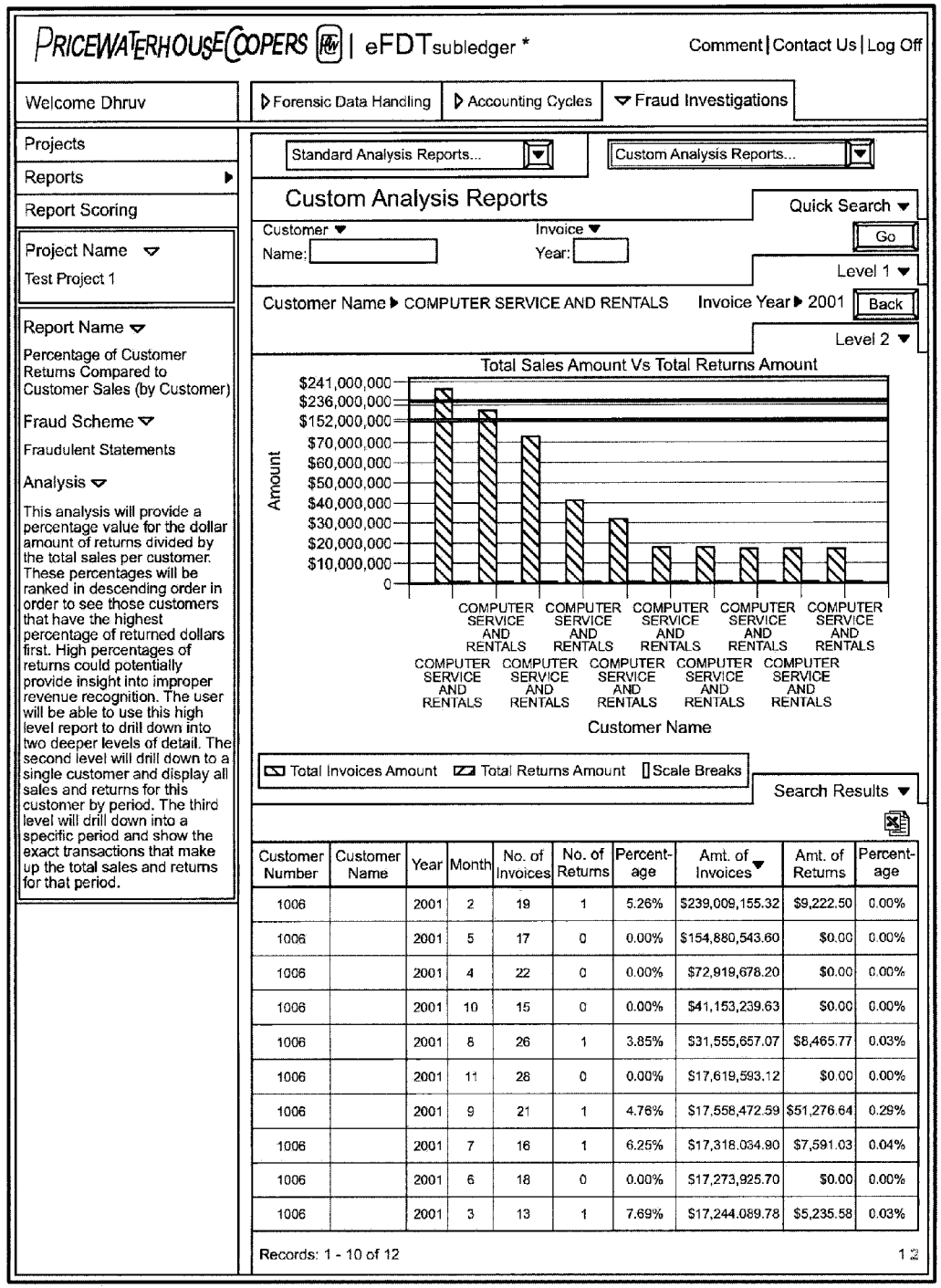
Figure 23:

FIGS. 21, 22 and 23 are custom analysis reports directed to analyzing total sales invoice amounts vs. total returns amounts. The report of FIG. 21 includes a bar graph. The bar graph has an x-axis that indicates customer names and a y-axis that indicates amounts. Two bars are associated with each customer. A first bar indicates a total amount of invoices for that customer and a second bar indicates a total amount of returns for that customer. Functionality is provided that enables a user to customize the bar graph to show only particular customers or to show only invoices for a specified year. FIG. 21 includes functionality that enables a user to drill down to more detailed information about a given customer. In one implementation, if a user selects one of the bars associated with the customer, Computer Service and Rentals, the system presents a screen shot that is similar to the screenshot of FIG. 22.

The screenshot of FIG. 22 includes a bar graph and a table. The bar graph has an x-axis indicating total sales dollars by month and a y-axis indicating customer name and month. Two bars correspond to each month. One of the bars indicates total invoices for that month and the other bar indicates total returns for that month. The table has columns for customer numbers, customer names, year, month, number of invoices for each month, number of returns for each month, a corresponding percentage, amount of invoices, amount of returns, and a corresponding percentage. The illustrated report provides a percentage value for the dollar amount of returns divided by the total sales per customer. Those percentages can be ranked in descending order in order to list those customers that have the highest percentage of returned dollars first. High percentages of returns could potentially provide insight into improper revenue recognition.

FIG. 22 includes functionality that enables a user to drill down to more detailed information about a given customer. In one implementation, if a user selects one of the bars associated with a particular month, for example month 2, the system presents a screen shot that is similar to the screenshot of FIG. 23.

FIG. 23 is a report that includes a bar graph. The bar graph shows the exact transactions that make up the total sales and returns for month two. The x-axis of the bar graph indicates the invoices and returns, and the y-axis of the bar graph indicates associated amounts. The illustrated graph indicates the activities of a single customer within a single month. The illustrated graph also contains two horizontal lines that correspond to the changing of the scale of the data on the x-axis to facilitate the display of a wide range of data on a single graph.

Figure 24:
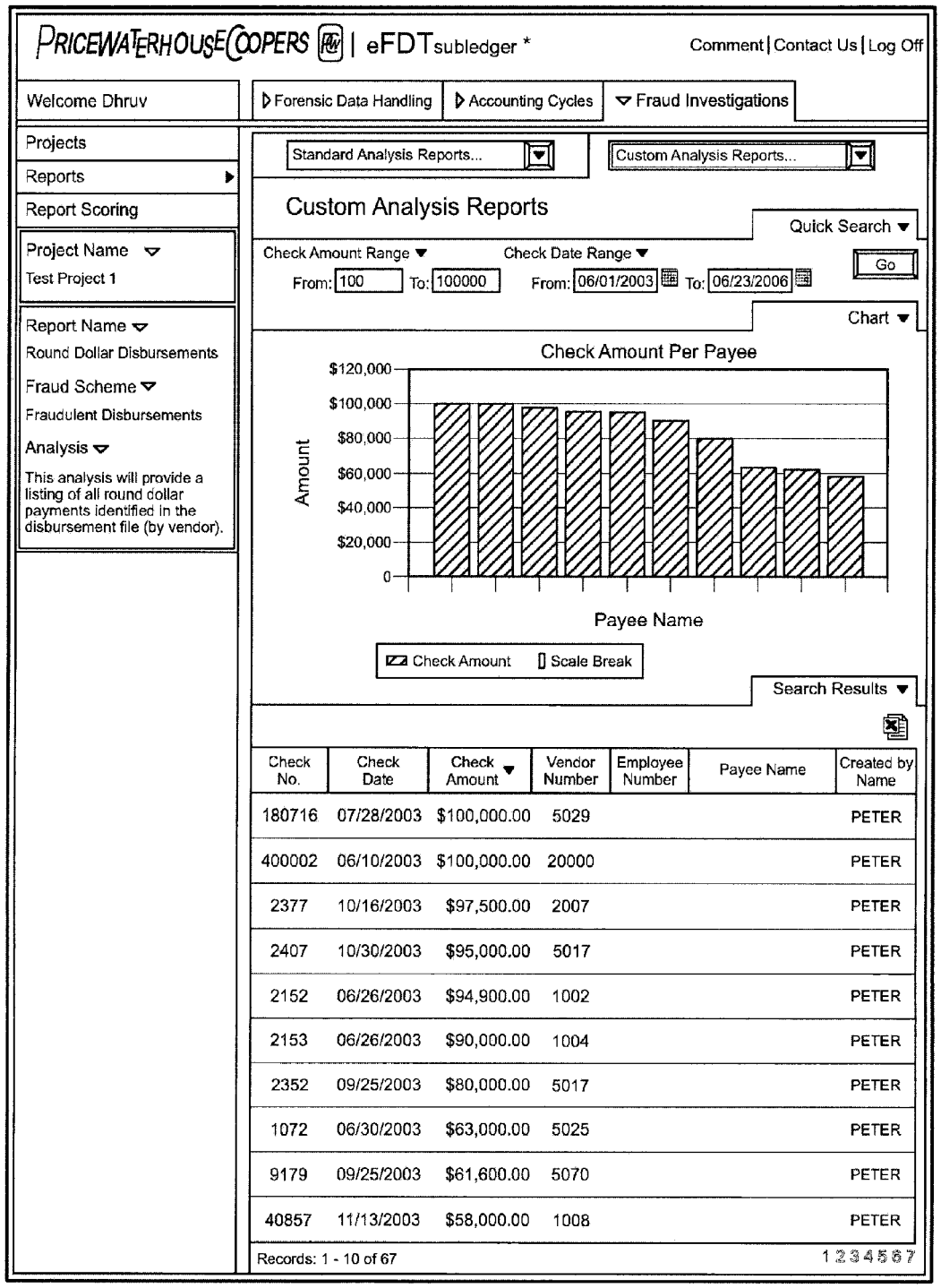

FIG. 24 is a custom analysis report that identifies all round dollar payments in the disbursement files (by customer). The custom report has a bar graph and a table. The bar graph's x-axis indicates payee names and the bar graph's y-axis indicates amounts. The table includes columns that indicate check numbers, check dates, check amounts, vendor numbers, employee numbers, payee names and created by names. The illustrated report includes functionality that enables a user to customize the graph and table to show only data related to checks within specified amount and date ranges. In some implementations, the illustrated report also includes drill down capability.

Figure 25:
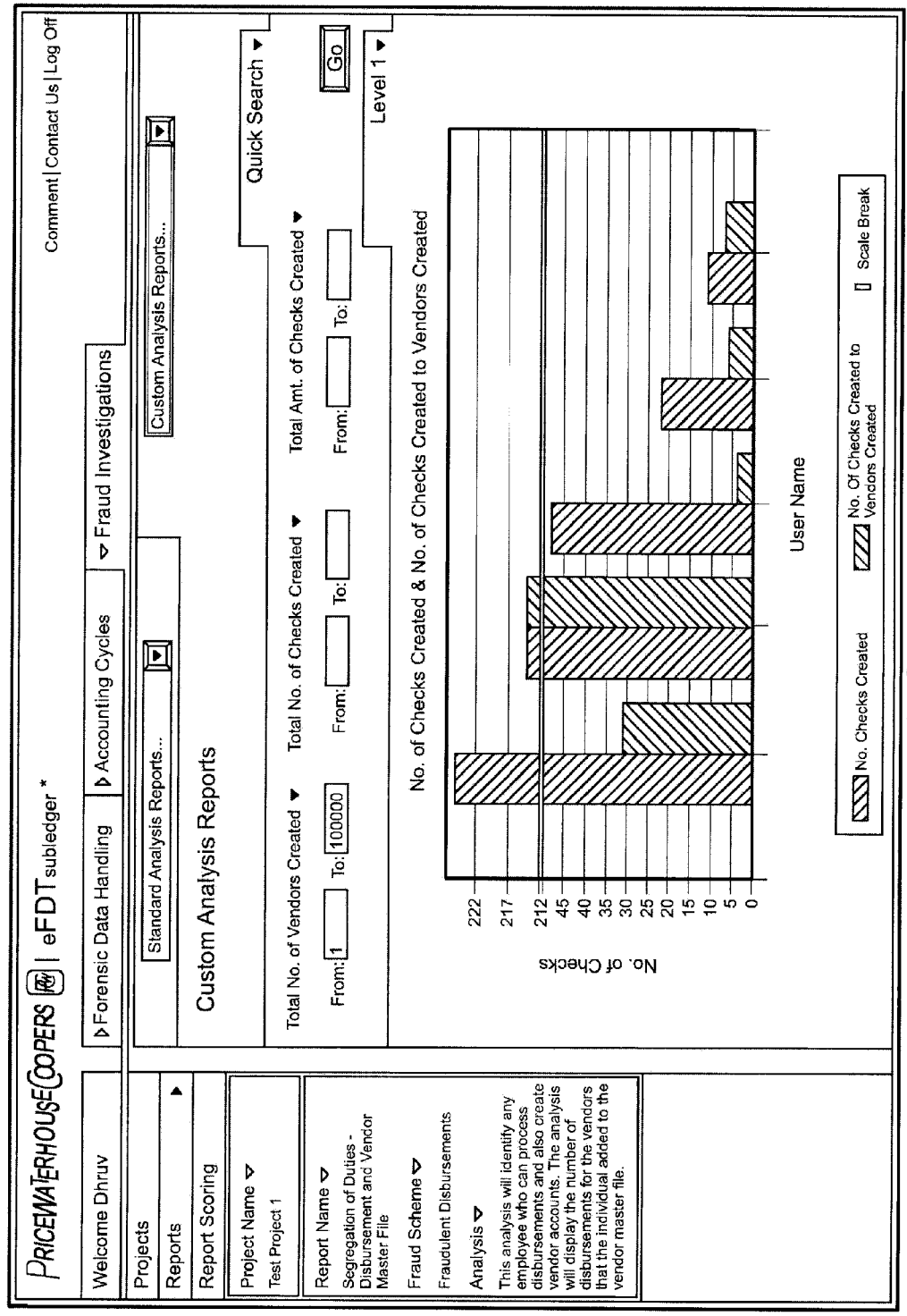
Figure 26:
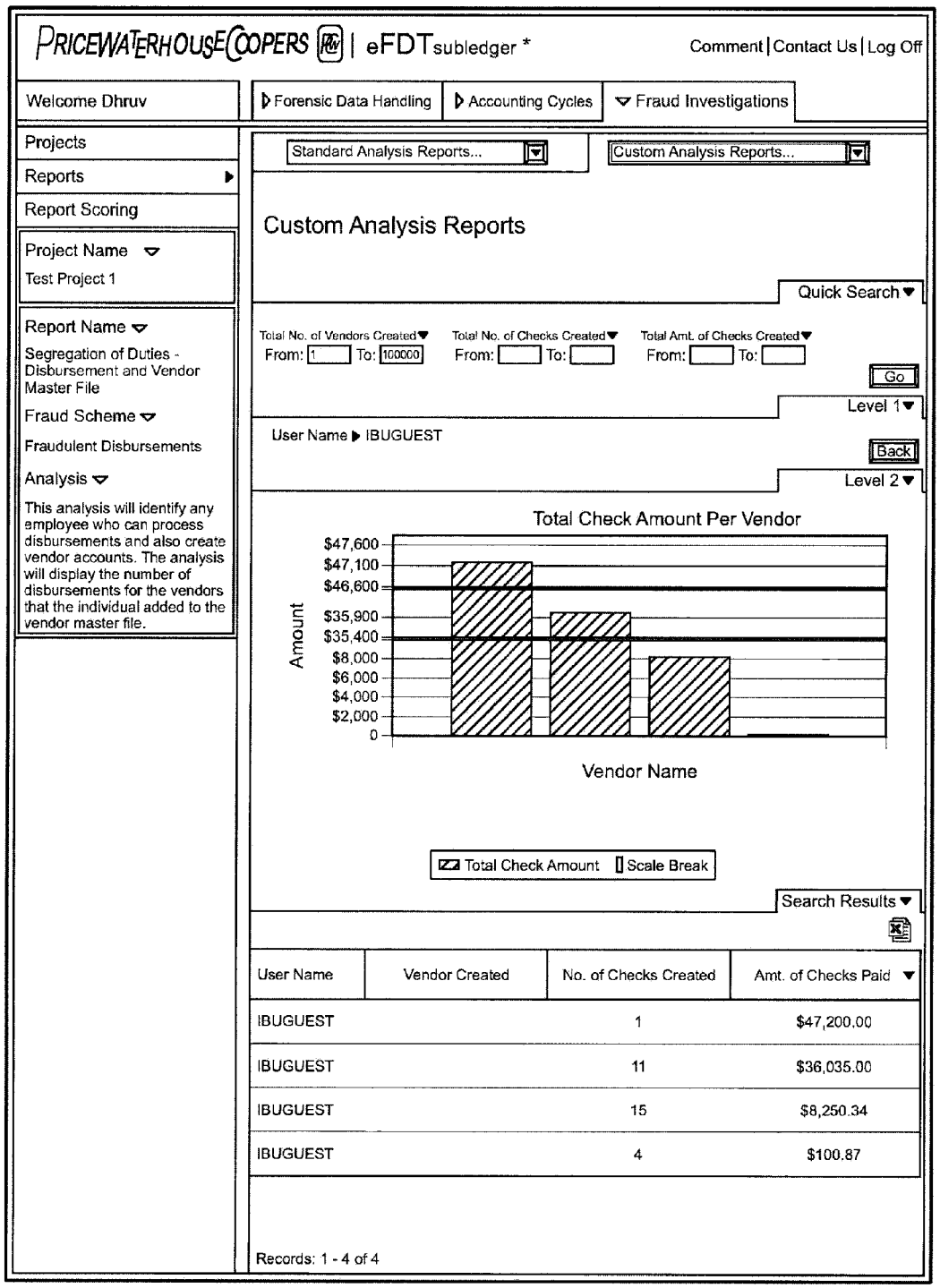
Figure 27:
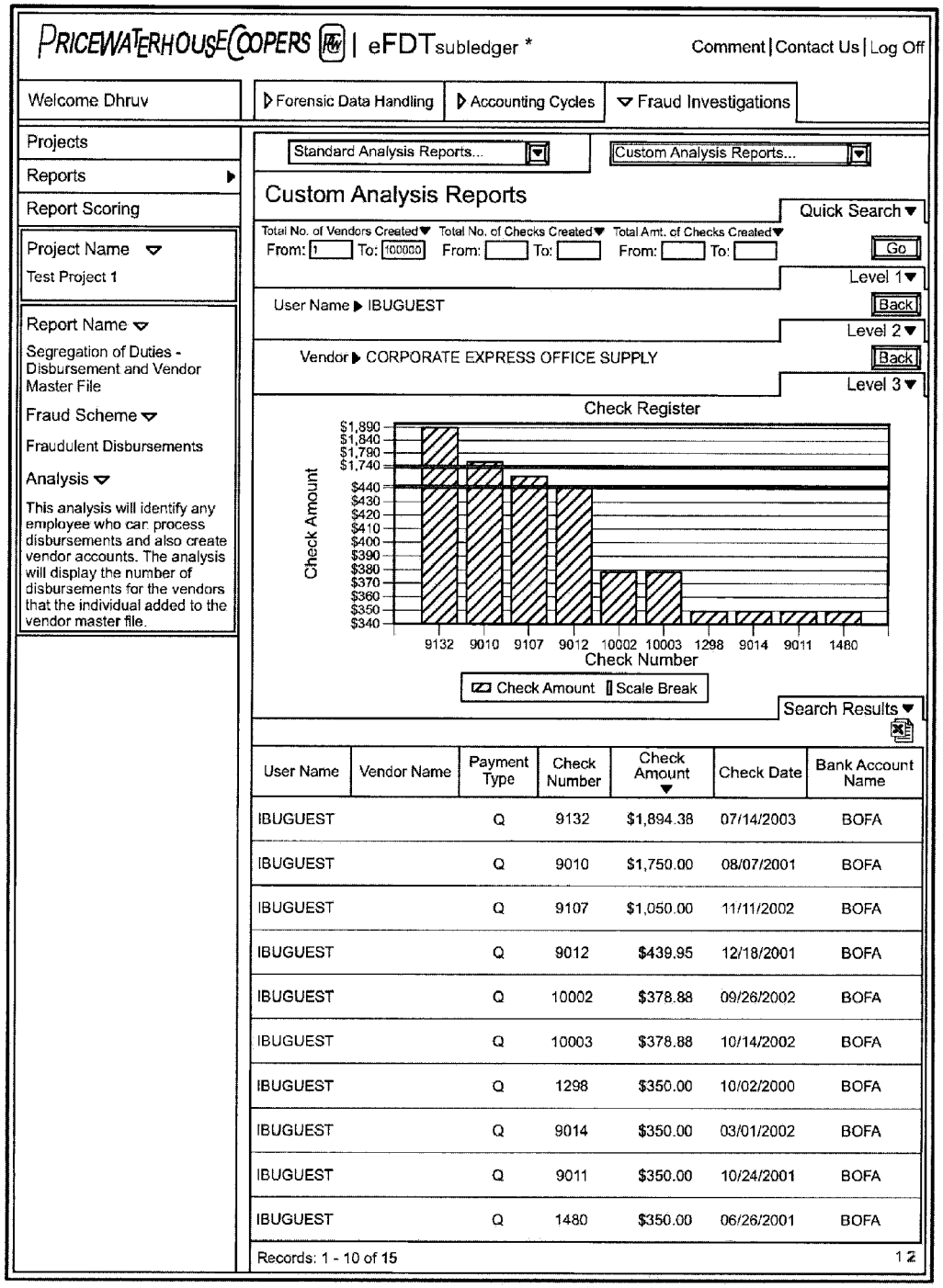

FIGS. 25, 26 and 27 are custom analysis reports that identify employees who can process disbursements and create vendor accounts. The report of FIG. 25 includes a bar graph. The x-axis of that bar graph identifies users and the y-axis of that bar graph indicates numerical values. Two bars are associated with each user. One of the bars indicates the number of checks created by that vendor. The other bar indicates the number of checks created to vendors created. The illustrated report includes functionality that enables a user to customize the bar graph so that it includes only data that falls within a specified ranges for total number of vendors created, total number of checks created or a total amount of checks created. The report of FIG. 25 also includes functionality that enables a user to drill down to more detail information. If, for example, a user clicks on one of the bars associated with user Ibuguest, then the system presents the screenshot of FIG. 26.

FIG. 26 includes a bar graph and a table showing data related to user Ibuguest. The bar graph includes vendor names as its x-axis and amounts as its y-axis. The table includes columns that show user names, vendors created, number of checks created and amounts of checks paid. The report includes functionality that enables a user to customize the bar graph and table to include of data that is related to specified ranges for total number of vendors created, total number of checks created and/or total amounts of checks created. FIG. 26 includes functionality that enables a user to drill down for more information about the user's interactions with a particular one of the named vendors. If, for example, a user clicks on one of the bars associated with a particular vendor (e.g., Corporate Express Office Supply), the system presents the screenshot of FIG. 27.

The screenshot of FIG. 27 includes a bar graph and a table illustrating data related to both user Ibuguest and vendor Corporate Express Office Supply. The bar graph's x-axis identifies check numbers and the bar graph's y-axis identifies amounts. The table includes columns that identify user names, vendor names, payment types, check numbers, check amounts, check dates and bank account names.

Figure 28:
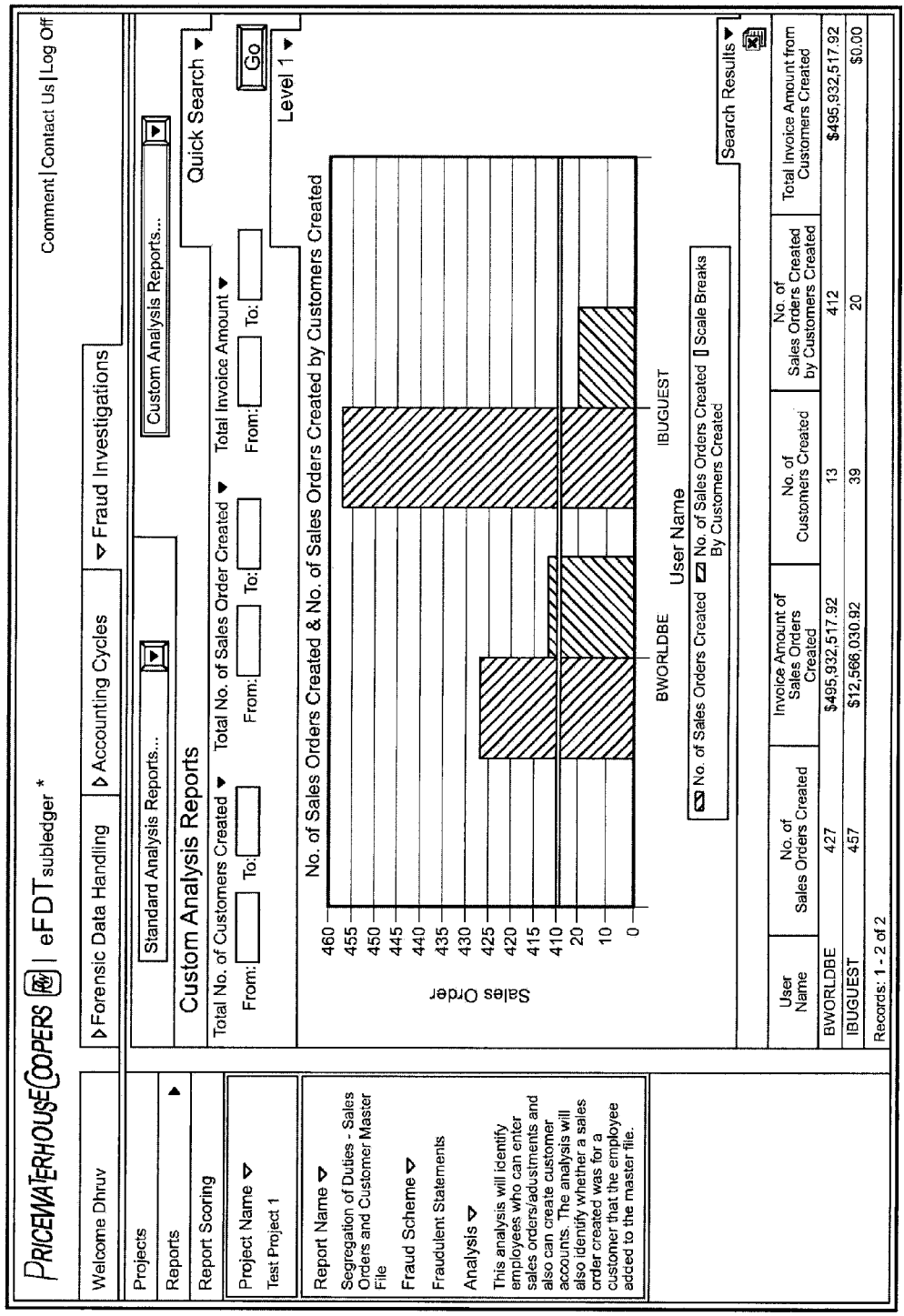
Figure 29:
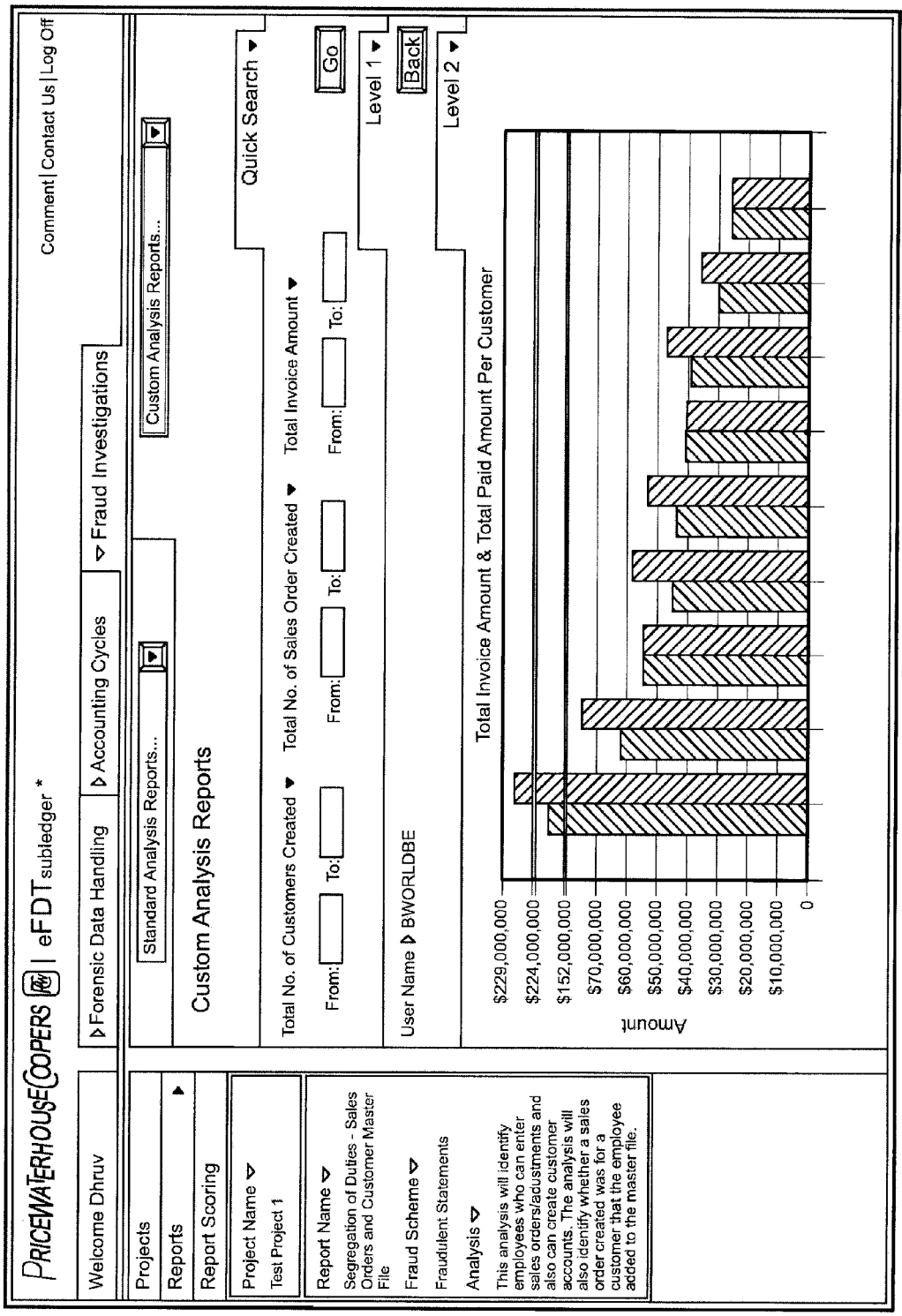

FIGS. 28 and 29 are custom reports that identify employees who can enter sales orders/adjustments and also can create customer accounts. The analysis identifies whether a sales order created was for a customer that the employee added to the master file. The report of FIG. 28 includes a bar graph and a table. The bar graph's x-axis indicates user names and the bar graph's y-axis indicates sales orders. Two bars are associated with each user. One of the bars indicates the number of sales orders created. The other one of the bars indicates the number of sales orders created by customers created. The table includes columns that identify user names, numbers of sales orders created, invoice amounts of sales orders created, numbers of customers created, numbers of sales orders created by customers created and total invoice amounts from customers created. The report includes functionality that enables a user to customize the data being presented to include only that data which falls within specified ranges of total numbers of customers created, total number of sales orders created and/or total invoice amounts. The illustrated report also includes functionality that enables a user to drill down for additional information. If, for example, a user clicks on a bar associated with a particular user (e.g., Bworldbe), the system presents a report similar to that shown in FIG. 29.

FIG. 29 is a custom analysis report that includes a bar graph with data related to user, Bworldbe. The graph's x-axis lists total invoice amount by customer, and the y-axis indicates amounts. The report includes functionality that enables a user to customize the report so as to reflect only data that relates to a specified range of total number of customers created, total number of sales orders created and/or total invoice amounts.

Figure 31:
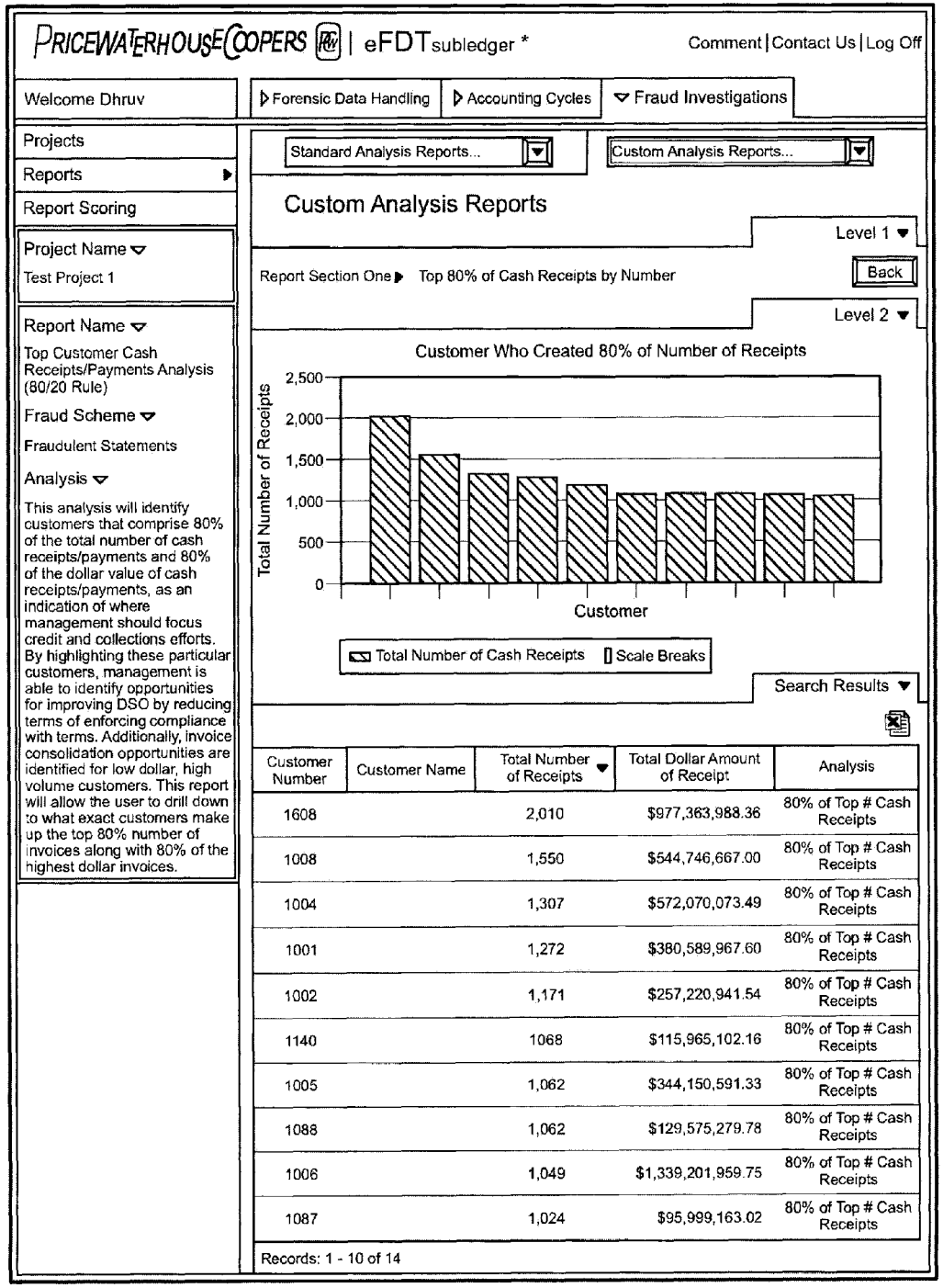
Figure 32:
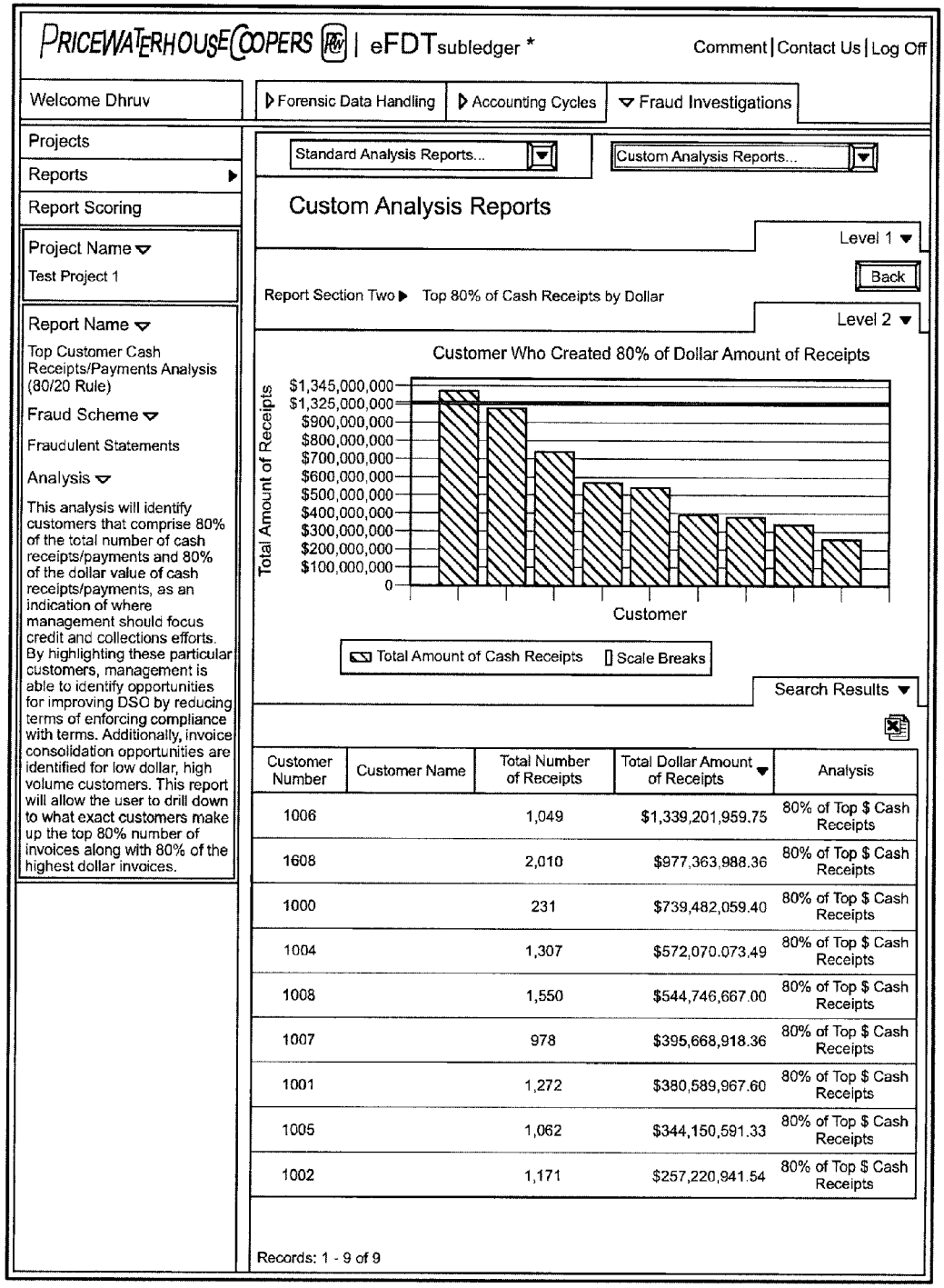

FIGS. 30, 31 and 32 are custom analysis reports that identify customers that comprise 80% of the total number of cash receipts/payments and 80% of the dollar value of cash receipts/payments. Such information can provide an indication of where a user should focus credit and collection efforts. By highlighting the particular customers, the user might be able to identify opportunities for improving DSO by reducing terms or enforcing compliance with terms. Additionally, invoice consolidation opportunities might be identified for low dollar, high volume customers.

The report of FIG. 30 includes data related to cash receipts by number and cash receipts by dollar. The data related to cash receipts by number includes total number of active customers, total number of cash receipts, 80% of number of cash receipts, number of customers, percentage of customers and days sales outstanding. The cash receipts by dollar data includes total dollar amount of receipts, top 80% of dollar value, number of customers, percentage of customers and days sales outstanding. The illustrated report includes functionality that enables a user to drill down to access the additional data illustrated in FIGS. 31 and 32.

FIG. 31 is a screenshot of a report that includes a bar graph and a table that show customers who created 80% of the number of receipts. The x-axis of the bar graph indicates customers and the y-axis of the bar graph indicates total number of receipts. The bar graph shows only those customers who created 80% of the number of receipts. The table includes columns showing customer numbers, customer names, total numbers of receipts, total dollar amounts of receipts and analysis.

FIG. 32 is a screen shot that shows customers who created 80% of the dollar amounts of receipts. The illustrated report includes types of data that are similar to the types of data shown in FIG. 31.

Figure 33:
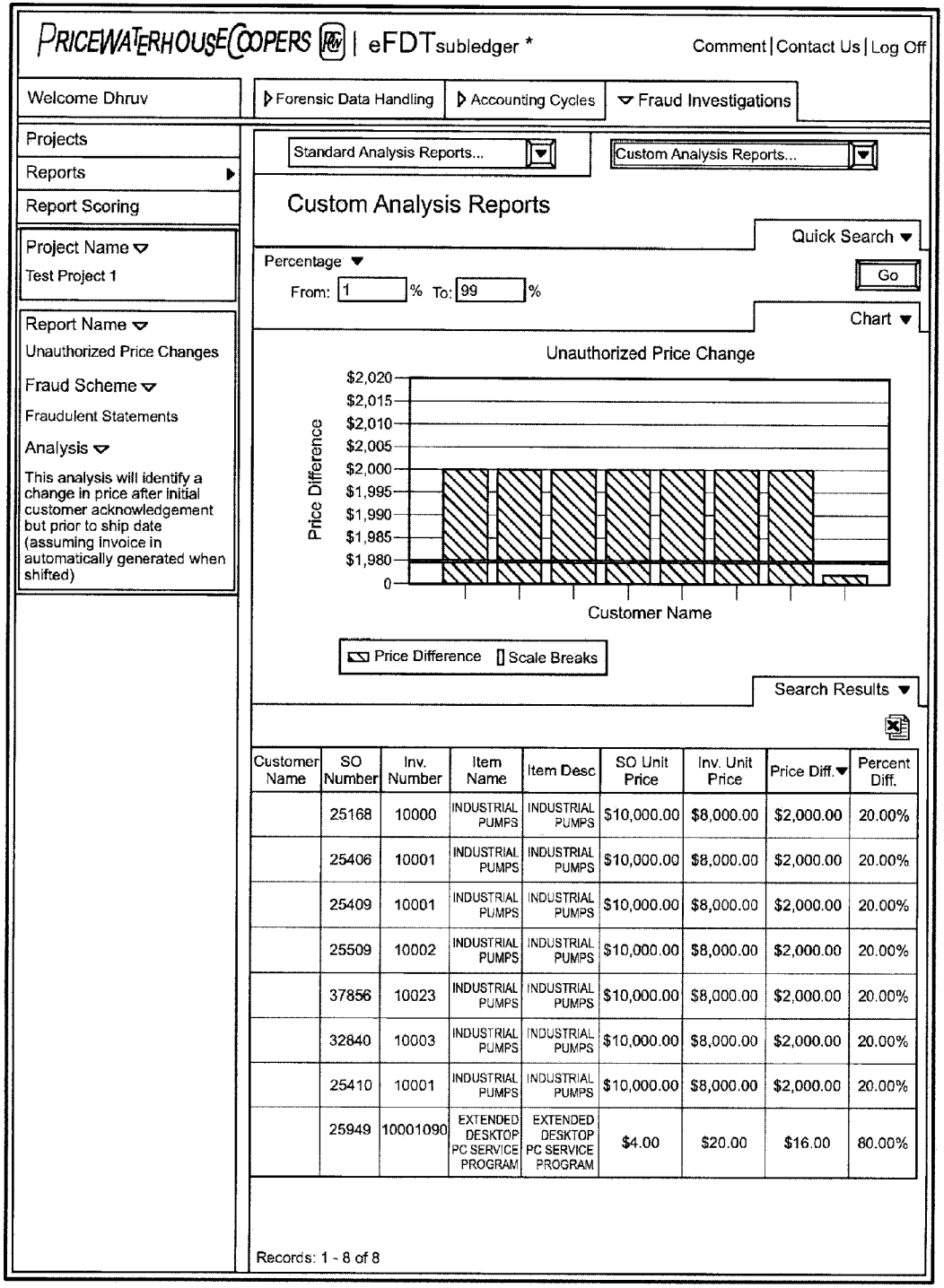

FIG. 33 is a screenshot of a report that identifies a range in price after initial customer acknowledgement, but prior to the ship date, assuming an invoice is automatically generated when shipped. The illustrated report includes a bar graph and a table. The bar graph's x-axis indicates customer names and the y-axis indicates price differences. The table includes columns directed to customer names, SO numbers, invoice numbers, item names, item descriptions, SO unit prices, invoice unit prices, price differences and percentage price differences. The illustrated report include functionality that enables a user to customize the report by specifying a range of percentages, to which the data presented will be limited. In certain implementations, the report includes functionality that enables a user to drill down to additional levels of data.

Figure 34:
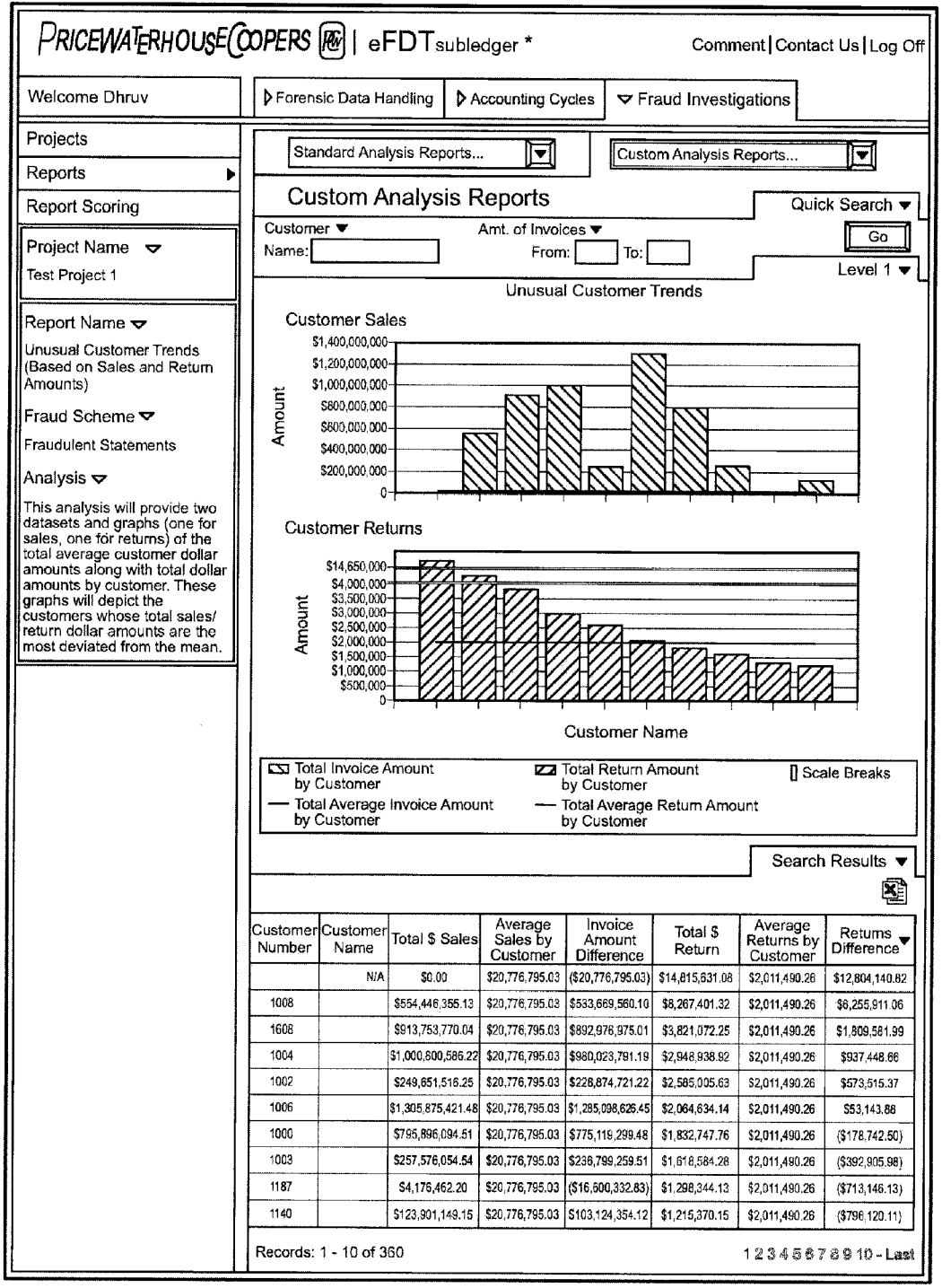

FIG. 34 is a custom analysis report that helps identify unusual customer trends based on sales and returns amounts. The analysis provided in that report provides two data sets and graphs (one for sales and one for returns) of the total average customer dollar amounts along with total dollar amounts by customer. The report depict the customers whose total sales/returns dollar amounts are most deviated from the mean.

The illustrated report includes an upper graph, a lower graph and a table. The upper graph is related to customer sales and identifies customer names on its x-axis and amounts on its y-axis. The lower graph is related to customer returns and identifies customer names on its x-axis and amounts on its y-axis. The table includes columns that indicate customer numbers, customer names, total dollar amount of sales, average sales by customer, invoice amount difference, total dollar amount return, average returns by customer and returns difference. In some implementations, the report includes functionality that enables a user to drill down to additional levels of detail.

Figure 35:
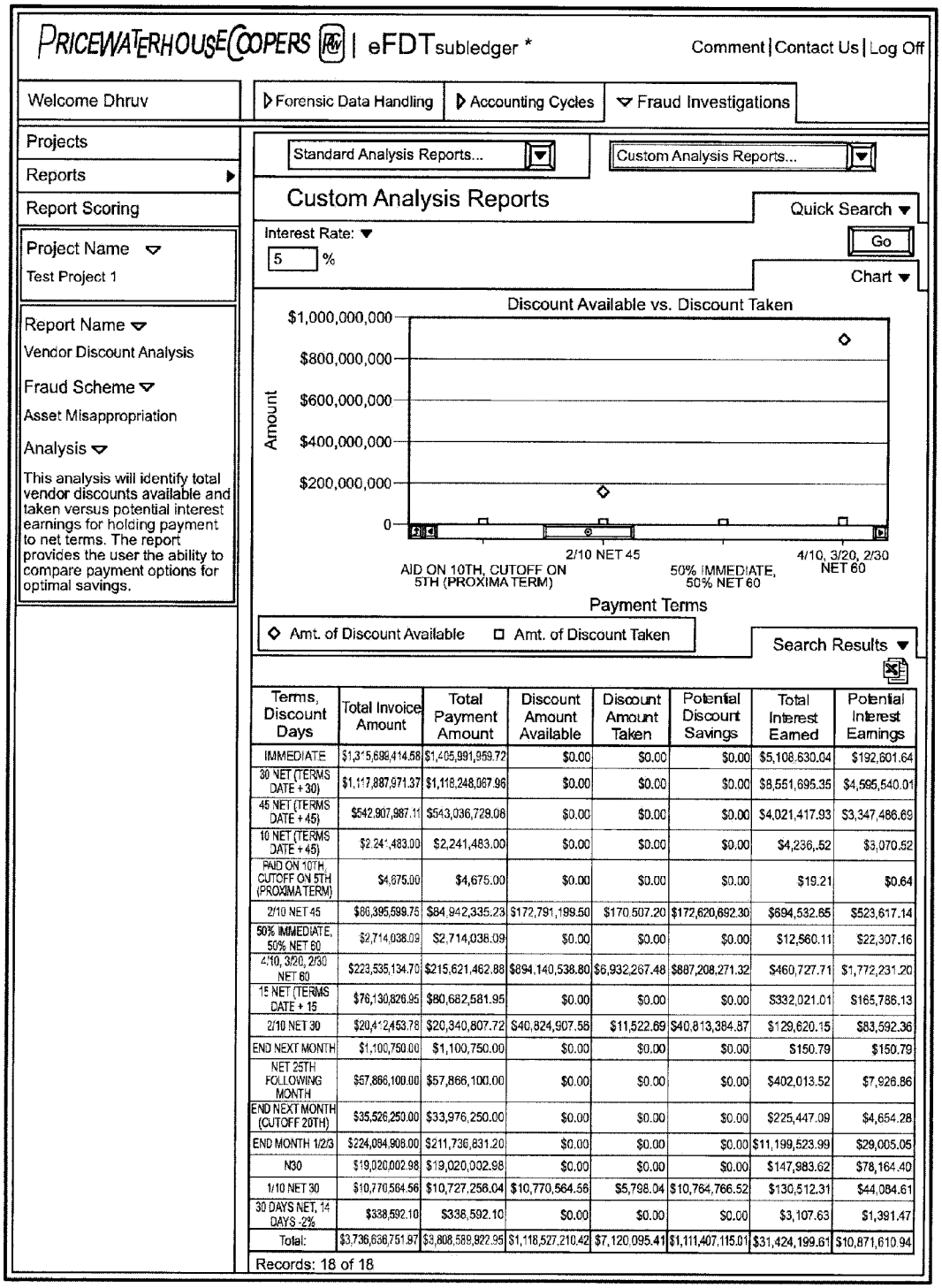

FIG. 35 is a screenshot of a report that provides a vendor discount analysis. The analysis identifies total vendor discounts available and taken vs. potential interest earnings for holding payment to net terms. The report enables a user to compare payment options for optimal savings. The illustrated report includes a bar graph and a table. The bar graph includes an axis that identifies payment terms and a y-axis that identifies amounts. The table includes columns directed to terms (discount days), total invoice amounts, total payment amounts, discount amounts available, discount amounts taken, potential discount savings, total interest earned and potential interest earnings.

The illustrated report includes functionality that enables a user to customize the report to specify an interest rate. In some implementations, the illustrated report includes functionality that enables a user to drill down to additional levels of detail.

Figure 36:
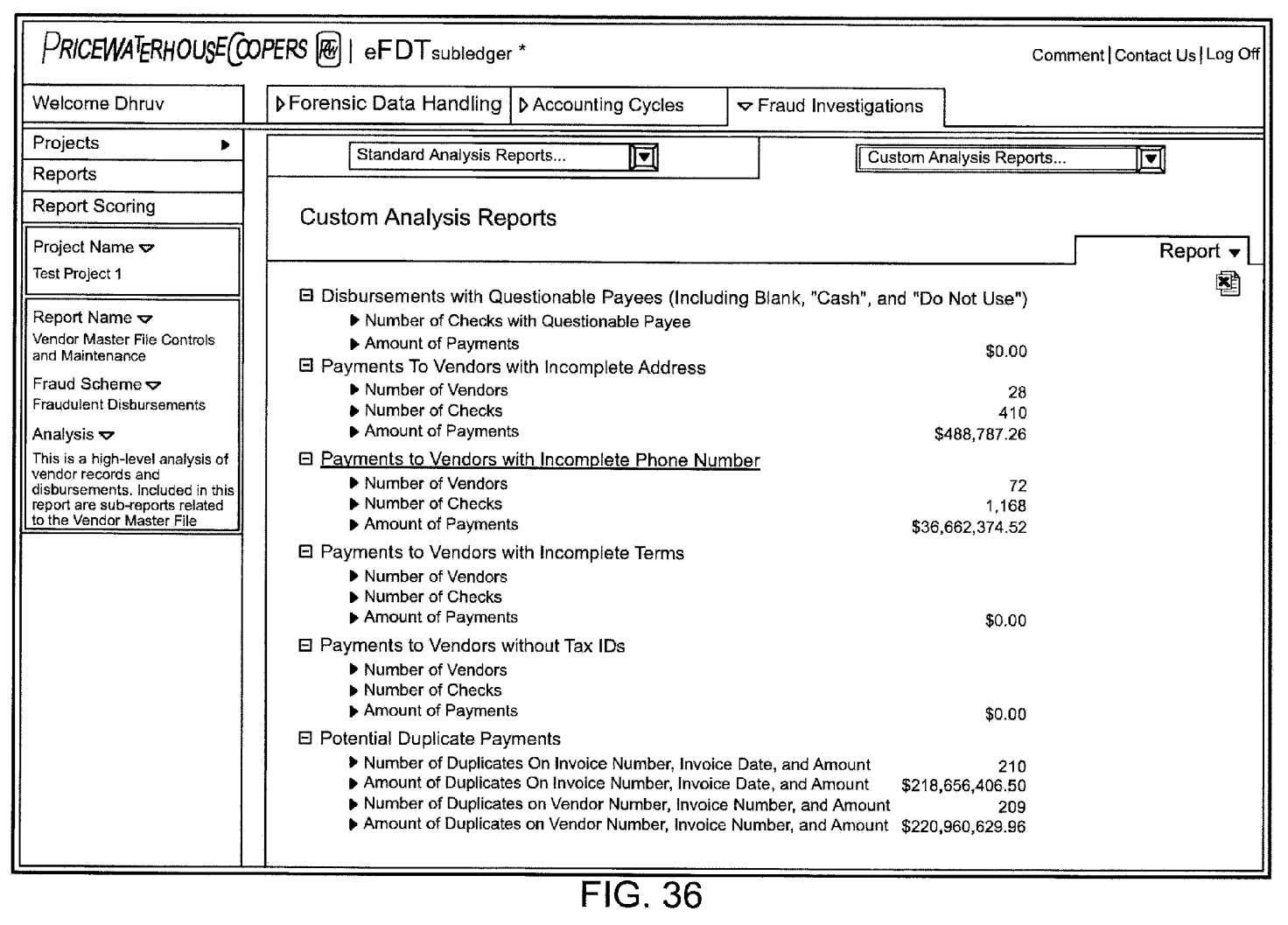

FIG. 36 is a screenshot of a custom analysis report that provides a high-level of analysis of vendor records and disbursements. In particular, the report includes data related to the following categories: disbursements with questionable payees (including blank, "cash" and "do not use"), payments to vendors with incomplete address, payments to vendors with incomplete phone numbers, payments to vendors with incomplete terms, payment to vendors without tax identification numbers and potential duplicate payments.

In some implementations, the illustrated report includes functionality that enables a user to drill down to additional levels of detail.

Figure 37:
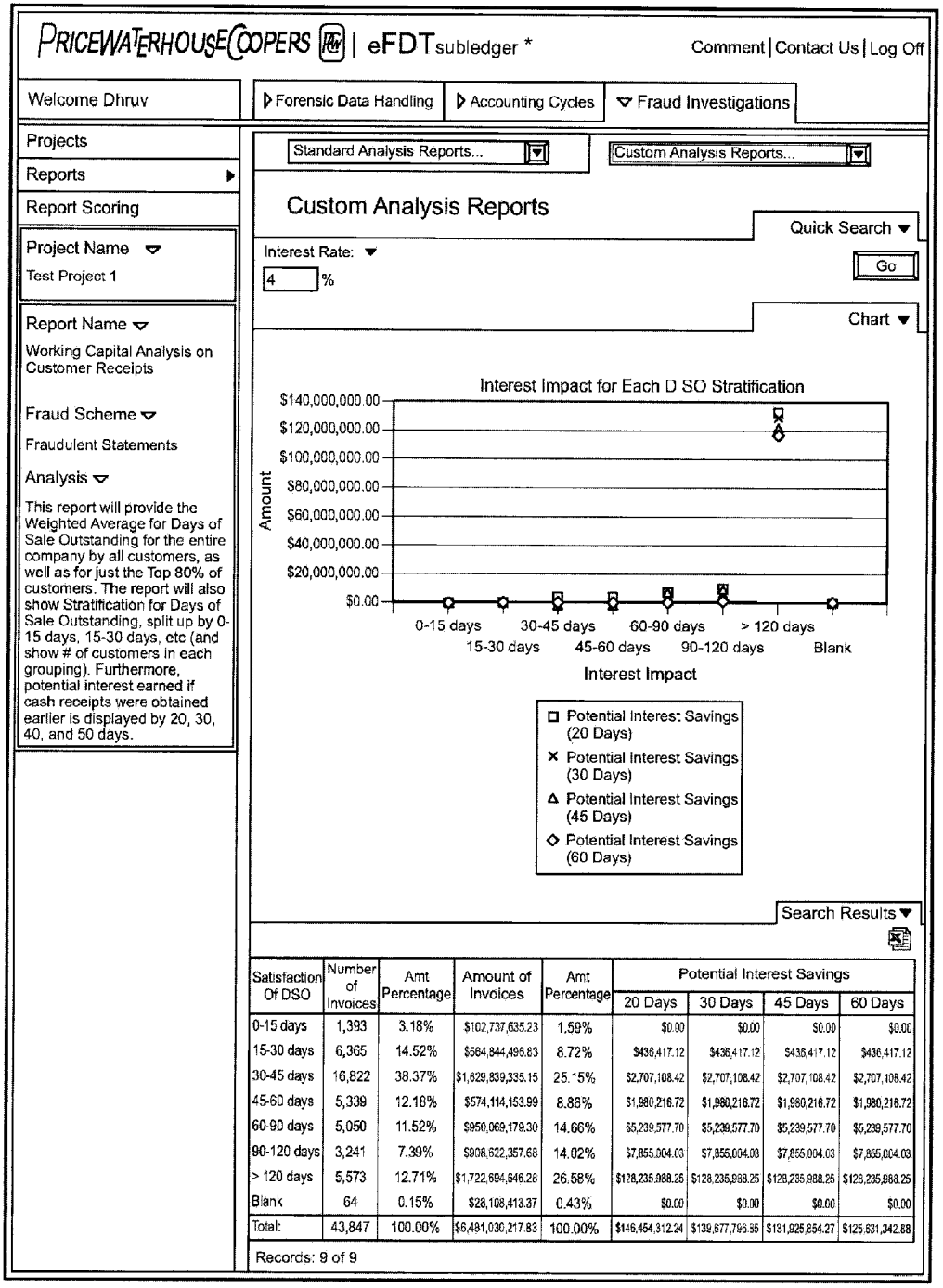

FIG. 37 is a screenshot of a report that indicates interest impact for each DSO stratification. The illustrated report includes a bar graph and a table. The bar graph's x-axis identifies ranges of days and its y-axis identifies amounts. Various shapes on the bar graph indicate potential interest savings at different times. The table includes columns directed to stratifications of DSO, numbers of invoices, number percentages, amounts of invoices, amount percentages, and columns directed to potential interest savings. The illustrated report includes functionality that enables a user to specify an interest rate. In some implementations, the illustrated report includes functionality that enables a user to drill down to additional levels of detail.

Various features of the system may be implemented in hardware, software, or a combination of hardware and software. For example, some features of the system may be implemented in computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

Figure 38:
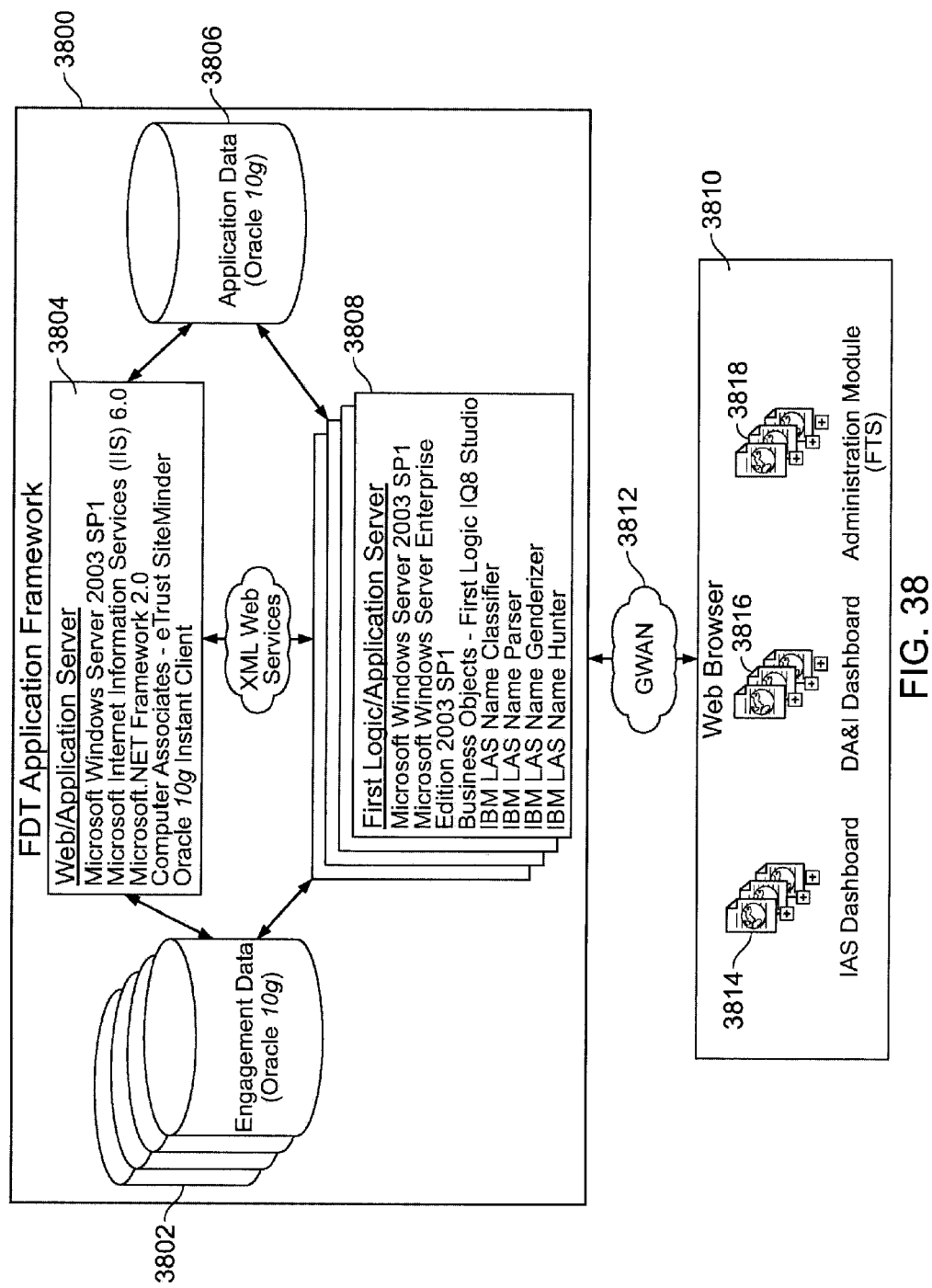
FIG. 38 illustrates an example of a system architecture.

The system architecture may include one or more servers and databases. FIG. 38 shows the system architecture associated with a particular implementation of a system for carrying out the disclosed methods. The illustrated system architecture includes an application framework 3800 with an engagement data database server 3802, a web/application server 3804, an application database server 3806 and a Firstlogic application server 3808. The application framework 3800 is coupled to a web browser 3810 via a global wide area network (GWAN) 3812. The web browser 3810 includes an Internet application server (IAS) dashboard 3814, a dispute analysis and investigations (DA&I) dashboard 3816 and an administration module 3818.

A number of implementations have been described. Nevertheless, a number of modifications are possible. For example, in certain implementations, the data from the ERP system can be loaded directly into the common data model— thereby skipping mapping and transformation steps 104 and 106. Various types of data validation can be performed at various times during the process. Many different types of reports (standard and custom) can be generated and many ways of report customization can be enabled. The particular information included in a common data model can differ from that disclosed herein. The particular appearance of the various screenshots as well as the drill-down capabilities of the reports can vary.

Accordingly, other implementations are within the scope of the claims.

What is claimed is:

1. A computer-implemented method comprising:
   loading transaction-related data from an enterprise resource planning system to a common data model database, wherein the transaction-related data includes accounting data and entity identification data;
   searching for matches between identification data entries in the common data model database, including performing a series of sequential data transformations and loading results of each transformation into a corresponding database table, wherein performing a series of sequential data transformations and loading results of each transformation into a corresponding database table includes:
  extracting the entity identification data from the common data model database;
  loading the extracted entity identification data into a first database table;
  creating a respective new record for each name listed in the first database table;
  performing a first data pre-cleansing process with respect to names in the new records;
  storing the pre-cleansed records in a second database table;
  performing an address cleansing process with respect to the records stored in the second database table;
  categorizing each name entry in the second database table as a personal name or an organization name;
  performing a data cleansing process for each record depending on the category to which the corresponding name entry is assigned and storing results of the data cleansing process in a third database table;
  compressing data in the third database table to obtain a single record for each particular entity name and storing the compressed data in a fourth database table; and
  performing a data matching process for the compressed data based on a program selected by a user from among a plurality of stored programs, and storing results of the data matching process in a fifth database table;
  identifying a link between two or more records for the loaded data based on one or more matches between identification data for the entities corresponding to those records; and
  clustering two or more entities based on links among records for those entities.

2. The method of claim 1 wherein clustering two or more entities includes identifying relationships among the records based on entity identification data across multiple fields in the records.

3. The method of claim 1 wherein clustering two or more entities includes identifying relationships among the records based on entity identification data across different entity types.

4. The method of claim 1 wherein creating respective new records for names in the first database table includes creating a new record for each parsed and unparsed name field in the first database table and concatenating names from the parsed name fields.

5. The method of claim 1 wherein the first data pre-cleansing process includes at least one of the following: removing periods, inserting a space before or after parentheses, consolidating single characters, trimming spaces before the first word and after the last word in a field, converting multiple contiguous spaces into one space, or converting extended ASCII into ASCII characters.

6. The method of claim 1 wherein storing the pre-cleansed records in a second database includes clustering names and addresses so that only one instance of a particular name or address is stored in the second database.

7. The method of claim 1 wherein performing an address cleansing process with respect to the records stored in the second database table includes parsing and standardizing data stored in address fields.

8. The method of claim 1 wherein clustering two or more entities is performed with respect to records stored in the fifth database table.

9. The method of claim 8 wherein the clustering is based on user-specified features of the records stored in the fifth database table.

10. The method of claim 1 wherein loading the data includes mapping a field in the enterprise resource planning system to a corresponding field in the common data model database.

11. The method of claim 10 wherein loading the data includes mapping the data to the common data model database using a SQL mapping script.

12. The method of claim 10 wherein loading the data includes transforming data in the enterprise resource planning system to a format appropriate to the common data model database.

13. The method of claim 12 wherein transforming the data includes parsing data in a field in the enterprise resource system into separate parts and mapping at least one part of the data to a corresponding field in the common data model database.

14. The method of claim 12 including pre-cleansing the entity identification data before searching for matches.

15. The method of claim 14 wherein pre-cleansing the identification data includes performing specified operations on the entity identification data so that entries appear in accordance with a standardized format.

16. The method of claim 15 wherein pre-cleansing the entity identification data includes at least one of removing or inserting spaces or periods from data in name or address fields.

17. The method of claim 15 wherein pre-cleansing the identification data includes converting extended ASCII characters into ASCII characters.

18. The method of claim 15 including generating a report indicating the frequency with which particular sequences of characters appear in specified fields for entity identification data that are to be used during the searching for matches.

19. The method of claim 15 including generating a report indicating the frequency with which entries in specified fields for entity identification data correspond to one or more specified patterns.

20. The method of claim 14 wherein pre-cleansing the entity identification data includes parsing and standardizing the format of entity identification data in the loaded data.

21. The method of claim 14 further including categorizing entries in name fields of the loaded data to indicate whether a name entry is a personal name or a company name.

22. The method of claim 21 including generating a score indicative of how likely a name entry has been categorized correctly.

23. The method of claim 22 including performing a pre-cleansing process for names categorized as personal names, and performing a different pre-cleansing process for names categorized as company names.

24. The method of claim 10 including generating a table that contains a single record for each entity identified as a separate entity.

25. The method of claim 1 including generating a report based on the loaded data for the clustered entities.

26. The method of claim 25 including displaying the report in a format that enables a user to drill down to obtain additional data related to the linked records.

27. The method of claim 26 including providing a user interface that enables the user to drill down through three or more levels of data.

28. The method of claim 25 including providing a user interface that enables a user to customize types of data to be presented in the report.

29. The method of claim 25 wherein the report includes information based on at least one of accounts payable data, accounts receivable data, payroll data, fixed assets data or inventory data.

30. The method of claim 29 wherein the report includes individual transaction-level information.

31. The method of claim 1 including providing a user interface that enables a user to score transactions across different analyses to weight individual transactions according to their relevance.

32. The method of claim 1 including organizing and presenting the transaction-related data according to fraud risk area.

33. The method of claim 1 including providing one or more hyperlinks that enable a user to access and interact with other sources of related information.

34. The method of claim 1 wherein identifying a link includes comparing identification data loaded into the common data model to alias information held in an external database.

35. A fraud monitoring and detection system comprising:
a common data model database; and
one or more servers configured to:
load transaction-related data from an enterprise resource planning system to the common data model database, wherein the transaction-related data includes accounting data and entity identification data;
search for matches between identification data entries in the common data model database, including performing a series of sequential data transformations and loading results of each transformation into a corresponding database table, wherein performing a series of sequential data transformations and loading results of each transformation into a corresponding database table includes:
extracting the entity identification data from the common data model database;
loading the extracted entity identification data into a first database table;
creating a respective new record for each name listed in the first database table;
performing a first data pre-cleansing process with respect to names in the new records;
storing the pre-cleansed records in a second database table;
performing an address cleansing process with respect to the records stored in the second database table;
categorizing each name entry in the second database table as a personal name or an organization name;
performing a data cleansing process for each record depending on the category to which the corresponding name entry is assigned and storing results of the data cleansing process in a third database table;
compressing data in the third database table to obtain a single record for each particular entity name and storing the compressed data in a fourth database table; and
performing a data matching process for the compressed data based on a program selected by a user from among a plurality of stored programs, and storing results of the data matching process in a fifth database table;
identify a link between two or more records in the loaded data based on one or more matches between identification data for the entities corresponding to those records; and
cluster two or more entities based on links among records for those entities.

36. The system of claim 35 wherein the one or more servers are configured to identify relationships among the records based on entity identification data across multiple fields in the records.

37. The system of claim 35 wherein the one or more servers are configured to identify relationships among the records based on entity identification data across different entity types.

38. The system of claim 35 wherein, as part of creating respective new records for names in the first database table, the one or more servers create a new record for each parsed and unparsed name field in the first database table and concatenate names from the parsed name fields.

39. The system of claim 35 wherein the one or more servers are configured to perform at least one of the following as part of the first data pre-cleansing process: remove periods, insert a space before or after parentheses, consolidate single characters, trim spaces before the first word and after the last word in a field, convert multiple contiguous spaces into one space, or convert extended ASCII into ASCII characters.

40. The system of claim 35 wherein, as part of storing the pre-cleansed records in a second database, the one or more servers cluster names and addresses so that only one instance of a particular name or address is stored in the second database.

41. The system of claim 35 wherein, as part of performing an address cleansing process with respect to the records stored in the second database table, the one or more servers parse and standardize data stored in address fields.

42. The system of claim 35 wherein the one or more servers are configured to perform clustering of two or more entities with respect to records stored in the fifth database table.

43. The system of claim 42 wherein the one or more servers are configured to perform the clustering based on user-specified features of the records stored in the fifth database table.

44. The system of claim 35 wherein the one or more servers are configured to map a field in the enterprise resource planning system to a corresponding field in the common data model database as part of loading the transaction-related data to the common data model.

45. The system of claim 44 wherein the one or more servers are configured to map the data to the common data model database using a SQL mapping script.

46. The system of claim 44 wherein the one or more servers are configured to transform data in the enterprise resource planning system to a format appropriate to the common data model database.

47. The system of claim 46 wherein the one or more servers are configured to parse data in a field in the enterprise resource system into separate parts and to map at least one part of the data to a corresponding field in the common data model database.

48. The system of claim 44 wherein the one or more servers are configured to pre-cleanse the entity identification data before searching for matches.

49. The system of claim 48 wherein the one or more servers are configured to perform specified operations on the entity identification data so that, as part of the pre-cleansing, entries appear in accordance with a standardized format.

50. The system of claim 49 wherein the one more servers are configured to remove or inserting spaces or periods from data in name or address fields as part of the pre-cleansing.

51. The system of claim 49 wherein the one or more servers are configured to convert extended ASCII characters into ASCII characters as part of the pre-cleansing.

52. The system of claim 49 wherein the one or more servers are configured to generate a displayable report indicating the frequency with which particular sequences of characters appear in specified fields for entity identification data that are to be used during the search for matches.

53. The system of claim 49 wherein the one or more servers are configured to generate a displayable report indicating the frequency with which entries in specified fields for entity identification data correspond to one or more specified patterns.

54. The system of claim 48 wherein the one or more servers are configured to parse and standardize the format of entity identification data in the loaded data as part of the pre-cleansing.

55. The system of claim 48 wherein the one or more servers are configured to categorize entries in name fields of the loaded data to indicate whether a name entry is a personal name or a company name.

56. The system of claim 55 wherein the one or more servers are configured to generate a score indicative of how likely a name entry has been categorized correctly.

57. The system of claim 56 wherein the one or more servers are configured to perform a pre-cleansing process for names categorized as personal names, and to perform a different pre-cleansing process for names categorized as company names.

58. The system of claim 44 wherein the one or more servers are configured to generate a table that contains a single record for each entity identified as a separate entity.

59. The system of claim 35 wherein the one or more servers are configured to generate a report based on the loaded data for the clustered entities.

60. The system of claim 59 wherein the one or more servers are configured to display the report in a format that enables a user to drill down to obtain additional data related to the linked records.

61. The system of claim 60 including a user interface that enables the user to drill down through three or more levels of data.

62. The system of claim 59 including a user interface that enables a user to customize types of data to be presented in the report.

63. The system of claim 59 wherein the report includes information based on at least one of accounts payable data, accounts receivable data, payroll data, fixed assets data or inventory data.

64. The system of claim 63 wherein the report includes individual transaction-level information.

65. The system of claim 35 including a user interface that enables a user to score transactions across different analyses to weight individual transactions according to their relevance.

66. The system of claim 35 wherein the one or more servers are configured to present the transaction-related data according to fraud risk area.

67. The system of claim 35 including one or more links that enable a user to access and interact with other sources of related information.

68. The system of claim 35 wherein as part of identifying a link, the one or more servers compare identification data loaded into the common data model to alias information held in an external database.

69. An article comprising a machine-readable medium that stores machine-executable instructions for causing a machine to:
load transaction-related data from an enterprise resource planning system to a common data model database, wherein the transaction-related data includes accounting data and entity identification data;
search for matches between identification data entries in the common data model database, including performing a series of sequential data transformations and loading results of each transformation into a corresponding database table, wherein performing a series of sequential data transformations and loading results of each transformation into a corresponding database table includes:
extracting the entity identification data from the common data model database;
loading the extracted entity identification data into a first database table;
creating a respective new record for each name listed in the first database table;
performing a first data pre-cleansing process with respect to names in the new records;
storing the pre-cleansed records in a second database table;
performing an address cleansing process with respect to the records stored in the second database table;
categorizing each name entry in the second database table as a personal name or an organization name;
performing a data cleansing process for each record depending on the category to which the corresponding name entry is assigned and storing results of the data cleansing process in a third database table;
compressing data in the third database table to obtain a single record for each particular entity name and storing the compressed data in a fourth database table; and
performing a data matching process for the compressed data based on a program selected by a user from among a plurality of stored programs, and storing results of the data matching process in a fifth database table;
identify a link between two or more records in the loaded data based on one or more matches between identification data for the entities corresponding to those records; and
cluster two or more entities based on links among records for those entities.

70. The article of claim 69 including machine-executable instructions for causing the machine to identify relationships among the records based on entity identification data across multiple fields in the records.

71. The article of claim 69 including machine-executable instructions for causing the machine to identify relationships among the records based on entity identification data across different entity types.

72. The article of claim 69 including machine-executable instructions for causing the machine to create a new record for each parsed and unparsed name field in the first database table and concatenate names from the parsed name fields, as part of creating respective new records for names in the first database table.

73. The article of claim 69 including machine-executable instructions for causing the machine to perform at least one of the following as part of the first data pre-cleansing process: remove periods, insert a space before or after parentheses, consolidate single characters, trim spaces before the first word and after the last word in a field, convert multiple contiguous spaces into one space, or convert extended ASCII into ASCII characters.

74. The article of claim 69 including machine-executable instructions for causing the machine to cluster names and addresses so that only one instance of a particular name or address is stored in the second database, as part of storing the pre-cleansed records in a second database.

75. The article of claim 69 including machine-executable instructions for causing the machine to parse and standardize data stored in address fields, as part of performing an address cleansing process with respect to the records stored in the second database table.

76. The article of claim 69 including machine-executable instructions for causing the machine to perform clustering of two or more entities with respect to records stored in the fifth database table.

77. The article of claim 76 including machine-executable instructions for causing the machine to perform the clustering based on user-specified features of the records stored in the fifth database table.

78. The article of claim 69 including machine-executable instructions for causing the machine to map a field in the enterprise resource planning system to a corresponding field in the common data model database as part of loading the transaction-related data to the common data model.

79. The article of claim 78 including machine-executable instructions for causing the machine to map the data to the common data model database using a SQL mapping script.

80. The article of claim 78 including machine-executable instructions for causing the machine to transform data in the enterprise resource planning system to a format appropriate to the common data model database.

81. The article of claim 80 including machine-executable instructions for causing the machine to parse data in a field in the enterprise resource system into separate parts and to map at least one part of the data to a corresponding field in the common data model database.

82. The article of claim 78 including machine-executable instructions for causing the machine to pre-cleanse the entity identification data before searching for matches.

83. The article of claim 82 including machine-executable instructions for causing the machine to perform specified operations on the entity identification data so that, as part of the pre-cleansing, entries appear in accordance with a standardized format.

84. The article of claim 83 including machine-executable instructions for causing the machine to remove or insert spaces or periods from data in name or address fields as part of the pre-cleansing.

85. The article of claim 83 including machine-executable instructions for causing the machine to convert extended ASCII characters into ASCII characters as part of the pre-cleansing.

86. The article of claim 83 including machine-executable instructions for causing the machine to generate a displayable report indicating the frequency with which particular sequences of characters appear in specified fields for entity identification data that are to be used during the search for matches.

87. The article of claim 83 including machine-executable instructions for causing the machine to generate a displayable report indicating the frequency with which entries in specified fields for entity identification data correspond to one or more specified patterns.

88. The article of claim 82 including machine-executable instructions for causing the machine to parse and standardize the format of entity identification data in the loaded data as part of the pre-cleansing.

89. The article of claim 82 including machine-executable instructions for causing the machine to categorize entries in name fields of the loaded data to indicate whether a name entry is a personal name or a company name.

90. The article of claim 89 including machine-executable instructions for causing the machine to generate a score indicative of how likely a name entry has been categorized correctly.

91. The article of claim 90 including machine-executable instructions for causing the machine to perform a pre-cleansing process for names categorized as personal names, and to perform a different pre-cleansing process for names categorized as company names.

92. The article of claim 78 including machine-executable instructions for causing the machine to generate a table that contains a single record for each entity identified as a separate entity.

93. The article of claim 69 including machine-executable instructions for causing the machine to generate a report based on the loaded data for the clustered entities.

94. The article of claim 93 including machine-executable instructions for causing the machine to display the report in a format that enables a user to drill down to obtain additional data related to the linked records.

95. The article of claim 94 including machine-executable instructions for causing the machine to present a user interface that enables the user to drill down through three or more levels of data.

96. The article of claim 93 including machine-executable instructions for causing the machine to present a user interface that enables a user to customize types of data to be presented in the report.

97. The article of claim 93 wherein the report includes information based on at least one of accounts payable data, accounts receivable data, payroll data, fixed assets data or inventory data.

98. The article of claim 97 wherein the report includes individual transaction-level information.

99. The article of claim 69 including machine-executable instructions for causing the machine to present a user interface that enables a user to score transactions across different analyses to weight individual transactions according to their relevance.

100. The article of claim 69 including machine-executable instructions for causing the machine to present the transaction-related data according to fraud risk area.

101. The article of claim 69 including machine-executable instructions for causing the machine to present one or more hyperlinks that enable a user to access and interact with other sources of related information.

102. The article of claim 69 including machine-executable instructions for causing the machine to compare identification data loaded into the common data model to alias information held in an external database, as part of identifying a link.

* * * * *

UNITED STATES PATENT AND TRADEMARK OFFICE
CERTIFICATE OF CORRECTION

| | | |
|---|---|---|
| PATENT NO. | : 7,940,899 B2 | Page 1 of 1 |
| APPLICATION NO. | : 11/545021 | |
| DATED | : May 10, 2011 | |
| INVENTOR(S) | : John C. Moorman, III et al. | |

It is certified that error appears in the above-identified patent and that said Letters Patent is hereby corrected as shown below:

Col. 20, line 20, claim 14, "claim 12" should be --claim 10--.

Signed and Sealed this
Nineteenth Day of July, 2011

David J. Kappos
*Director of the United States Patent and Trademark Office*